(12) United States Patent  
Chandler

(10) Patent No.: US 11,624,176 B1  
(45) Date of Patent: Apr. 11, 2023

(54) WATER DRAIN MANAGEMENT APPARATUS

(71) Applicant: Vista Water Group, LLC, Ashland, OH (US)

(72) Inventor: James W. Chandler, Ashland, OH (US)

(73) Assignee: Vista Water Group, LLC, Ashland, OH (US)

( * ) Notice: Subject to any disclaimer, the term of this patent is extended or adjusted under 35 U.S.C. 154(b) by 20 days.

(21) Appl. No.: 17/375,852

(22) Filed: Jul. 14, 2021

Related U.S. Application Data

(63) Continuation-in-part of application No. 15/841,543, filed on Dec. 14, 2017, now Pat. No. 11,105,076, which is a continuation-in-part of application No. 15/351,543, filed on Nov. 15, 2016, now abandoned.

(60) Provisional application No. 62/436,863, filed on Dec. 20, 2016, provisional application No. 62/256,917, filed on Nov. 18, 2015.

(51) Int. Cl.
| | |
|---|---|
| *E03C 1/122* | (2006.01) |
| *E03C 1/182* | (2006.01) |
| *F16L 41/03* | (2006.01) |
| *E03C 1/284* | (2006.01) |

(52) U.S. Cl.  
CPC .......... *E03C 1/1222* (2013.01); *E03C 1/1225* (2013.01); *E03C 1/182* (2013.01); *E03C 1/284* (2013.01); *F16L 41/03* (2013.01)

(58) Field of Classification Search  
CPC ...... E03C 1/1222; E03C 1/1225; E03C 1/182; E03C 1/184; F16L 41/03  
See application file for complete search history.

(56) References Cited

U.S. PATENT DOCUMENTS

| | | | | |
|---|---|---|---|---|
| 788,803 | A * | 5/1905 | Walker | E03C 1/122 |
| | | | | 285/125.1 |
| 3,894,302 | A * | 7/1975 | Lasater | E03C 1/1225 |
| | | | | 285/129.2 |
| 4,811,431 | A * | 3/1989 | Kraverath | F16L 27/047 |
| | | | | 285/261 |
| 6,684,415 | B1 * | 2/2004 | Kozono | E03C 1/1225 |
| | | | | 137/512 |
| 7,290,557 | B1 * | 11/2007 | Bowman | E03C 1/12 |
| | | | | 137/216 |

(Continued)

*Primary Examiner* — Zachary T Dragicevich  
*Assistant Examiner* — James A Linford  
(74) *Attorney, Agent, or Firm* — Ralph E. Jocke; Walker & Jocke

(57) ABSTRACT

A water drain management apparatus used in clinical facility (43) or other facility includes a manifold plumbing fitting (32, 272, 384). The fitting includes a plurality of drain outlet connections for water discharge devices (40, 42, 222, 226, 230, 234). Such water discharge devices may include devices such as autoclaves, sterilizers, cleaners, washers, filters, humidifiers, condensing devices and other devices used in the facility. A plurality of drain fitting openings in the body of the fitting are connectable to respective water discharge devices, and openings that are not utilized are closable with plugs. Some manifold fittings (272, 344, 384, 482) include an air gap opening (288, 360, 392, 530). These configurations provide an air gap that prevents contamination due to back flow of water within the fitting reaching water discharge devices or the body inlet of the manifold fitting.

28 Claims, 47 Drawing Sheets

(56) References Cited

U.S. PATENT DOCUMENTS

2014/0167404 A1* 6/2014 Wilson .................... F16L 41/03
285/125.1

* cited by examiner

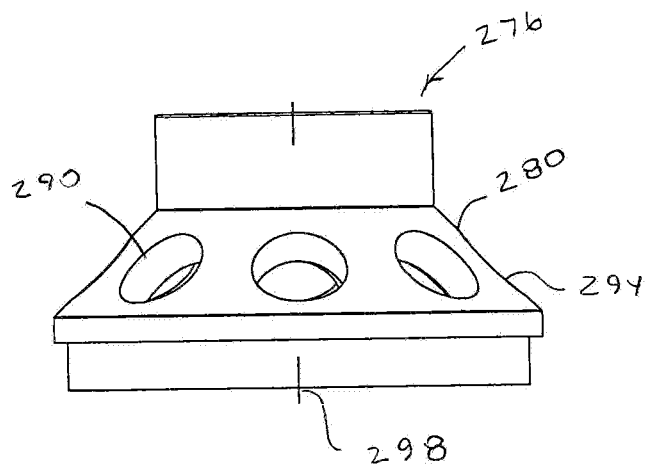
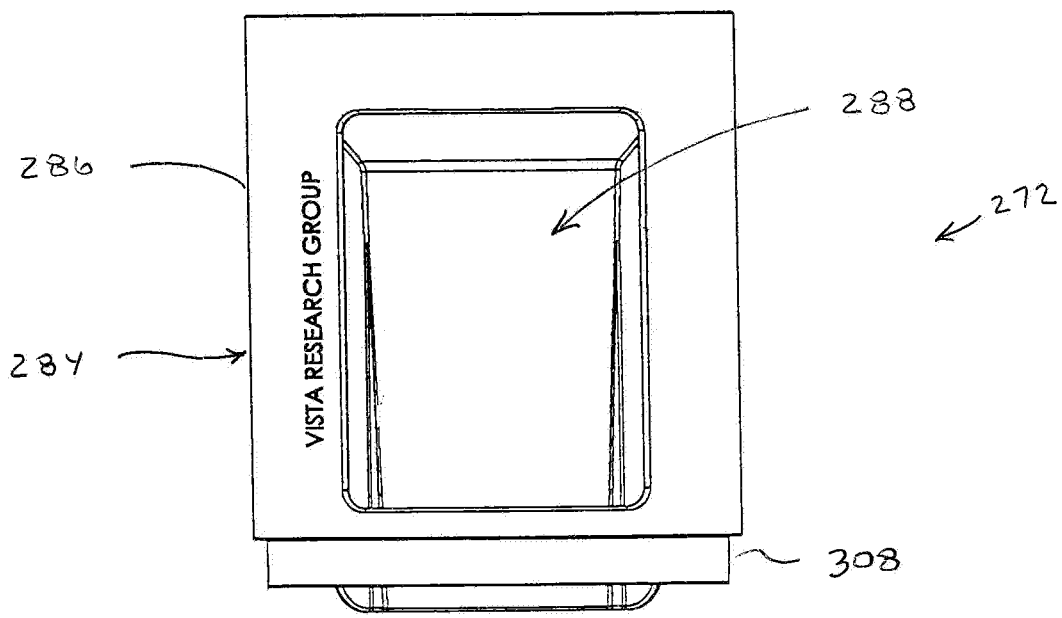
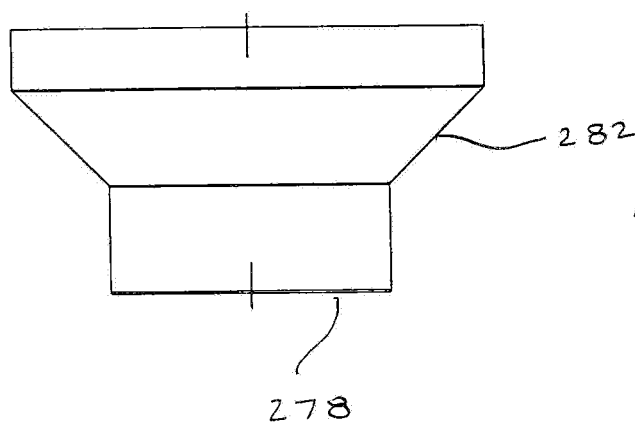
FIG 19

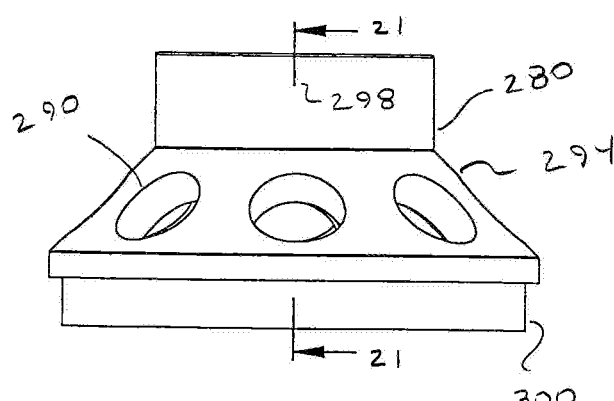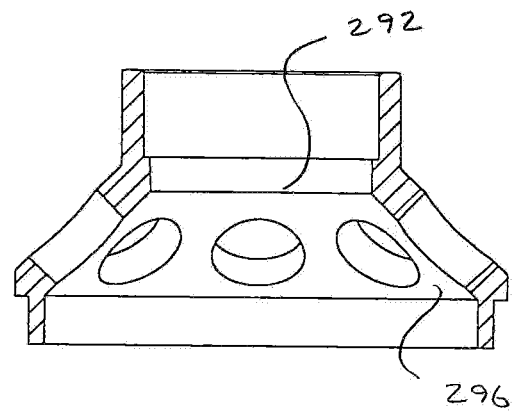
FIG 20  FIG 21
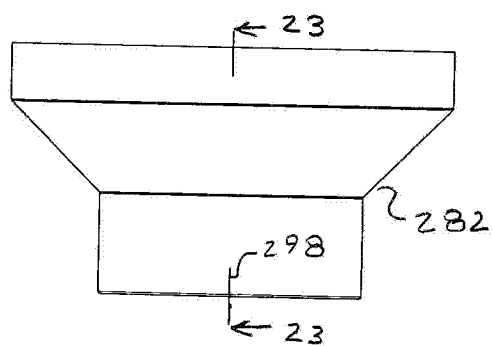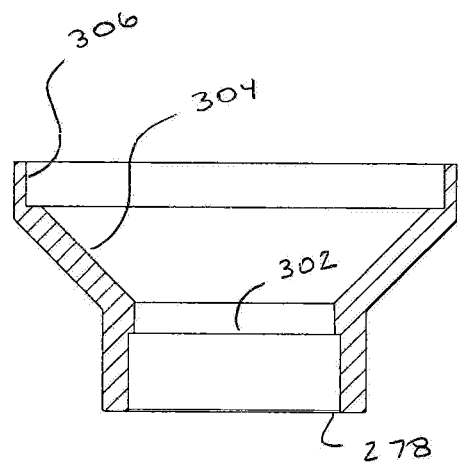
FIG 22  FIG 23

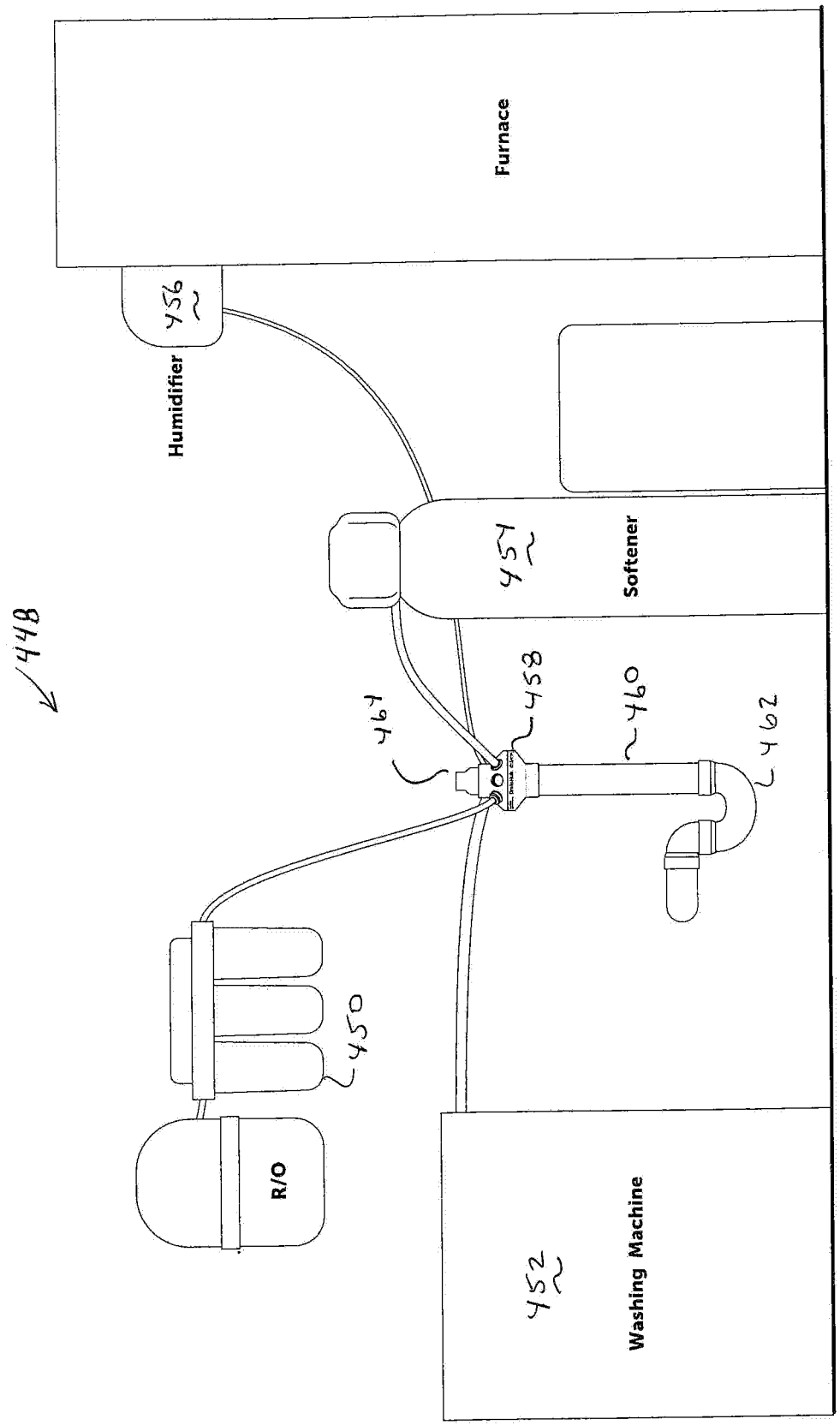

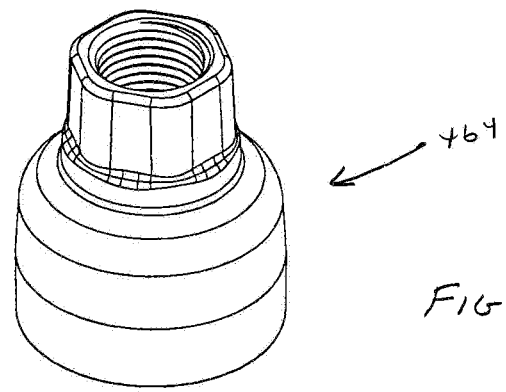
FIG 55
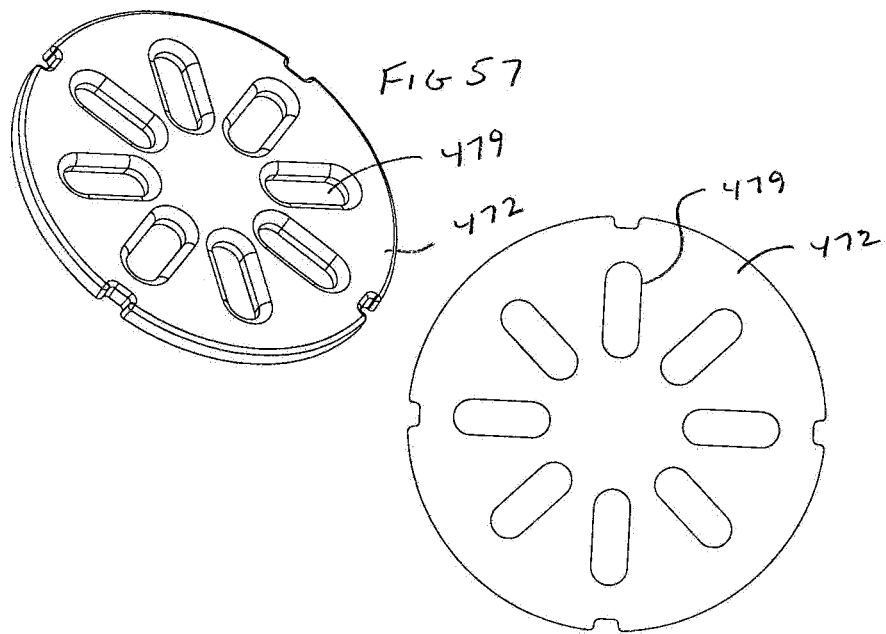
FIG 57
FIG 56

WATER DRAIN MANAGEMENT APPARATUS

TECHNICAL FIELD

This disclosure relates to a water management apparatus. The exemplary apparatus may be used to direct water discharged from autoclaves, sterilizers or other types of water discharge devices used in a clinical facility or other facility, to a drain.

BACKGROUND

Sinks used in residential and commercial establishments include a drain from which water and other waste material leaves a bowl or other holding area of the sink. Disposed below the drain is a pipe that is connected to a trap. Commonly, the trap is a U-shaped conduit section. The U-shaped conduit section is configured to hold water even after all of the liquid material has drained out of the sink. The water which is held in the trap prevents sewer gases and other gaseous material that may be in the drain line downstream of the trap from migrating upwardly through the drain of the sink and into the air in the room in which the sink is positioned.

Often in clinical facilities, such as dental or medical offices and laboratories, numerous devices produce waste water or other liquid waste material that must be disposed of into a sanitary sewer drain. For example, in clinical facilities devices which produce such waste material may be mounted on a counter, to a wall or within a cabinet. Examples of devices that require a drain may include autoclaves, steam sterilizers, ultrasonic cleaners, tabletop instrument washers, under counter instrument washers, model trimmers, reverse osmosis water filters, deionization water filters, steam coolers for sterilizers or autoclaves, and heat sinks which produce liquid condensate. Of course, these devices are merely examples of water discharge devices that may be utilized in clinical facilities and other environments.

The presence of one or more of these water discharge devices may present plumbing challenges. Such challenges may include drain connections that allow contamination, backflow or gas migration into the water discharge device. Some drain connections may also be prone to blockage or clogging.

Such systems may benefit from improvements.

SUMMARY

Exemplary arrangements pertain to systems that may include a sink having a drain, which drain is connected by one or more lines or conduits to a drain trap. In exemplary arrangements, a manifold plumbing fitting is positioned in intermediate relation vertically below the sink drain and above the drain trap.

An exemplary manifold plumbing fitting includes a body with a generally open interior area, which in the operative position extends generally along a vertical axis. The body includes a body inlet coaxial with the axis and which is configured to enable air to enter the interior area of the body. In some exemplary arrangements where the body inlet is connected to the sink drain, the water, air and other material from the sink drain also enters the body inlet.

The exemplary manifold plumbing fitting further includes a body outlet which is coaxial with the body inlet. The body outlet is configured to enable water and other liquid material which enters the interior area to pass out of the body and toward the trap.

Exemplary manifold plumbing fittings include an interior area which extends annularly and radially outward relative to the axis and beyond the body inlet and the body outlet. The interior area further includes a lower axial end that is bounded within the body by an annular tapered wall surface. The exemplary annular tapered wall surface is configured such that in the operative position of the manifold plumbing fitting, the annularly tapered wall surface is vertically lower with closer proximity to the body outlet.

The exemplary body includes a plurality of drain fitting openings extending through the body and into the interior area. Each of the plurality of drain fitting openings is configured to removably receive therein either a liquid drain fitting that is connectable to a water discharge device other than the sink drain, or a plug that blocks the opening. The water discharge devices in some exemplary clinical facilities may include devices that deliver liquid waste water or other waste material, such as autoclaves, steam sterilizers, ultrasonic cleaners, tabletop instrument washers, under counter instrument washers, model trimmers, reverse osmosis filters, deionization filters, autoclave and steam sterilizer coolers, heat sinks which collect condensate, or other devices in the environment near the sink that produce waste water or other waste fluid materials.

In an exemplary arrangement, the manifold plumbing fitting is configured so that each of the drain fitting openings is configured so as to be axially and radially disposed from the body inlet and above the annular tapered wall surface. In operation, the water and other waste materials from the water discharge devices pass through respective drain fitting openings and fall onto the surface of the annular tapered wall surface. The liquid waste material then flows in engagement with the annular tapered wall surface to the body outlet and out of the body outlet downward to the trap.

In exemplary arrangements when the inlet of the manifold plumbing fitting is connected to the sink drain, the plurality of drain fitting openings deliver liquid into the body interior area out of the main liquid stream coming from the sink drain. This reduces the risk of backflow into the drain fitting openings and blockage or contamination of the fittings through which waste water is discharged. Further in some exemplary arrangements, the drain fittings which are engaged in the drain fitting openings may have outlets that are configured to direct fluid in a direction that is radially disposed from and transverse to the body axis. Such arrangements may cause fluid received through the drain fittings to move in a rotational direction within the body interior area. Such rotational movement may further facilitate the draining of liquid and also reduce the risk of the outlet openings and drain fittings becoming clogged orblocked.

In exemplary arrangements, the manifold plumbing fitting includes a plurality of drain fitting openings that extend in an angularly spaced annular arrangement. This facilitates connecting numerous drain lines from water discharge devices which may be positioned at different locations relative to the manifold plumbing fitting. Further in exemplary arrangements, the unused drain fitting openings in the body may be readily blocked through the installation of plugs or similar devices.

Exemplary manifold plumbing fittings may be positioned in numerous locations between the sink drain and the drain trap. Further in exemplary arrangements, multiple manifold plumbing fittings may be positioned so as to provide a larger number of drains suitable for receiving waste water and other liquid material from a plurality of water discharge devices. In other arrangements manifold plumbing fittings may be connected to a drain line so that liquid from a sink drain does not pass through the fitting.

In alternative exemplary arrangements, a plumbing fitting providing similar features and advantages further includes an air gap between the body inlet and the body outlet. In exemplary arrangements, the fitting may include an interior area with an annular tapered funnel surface at an inlet end portion. The annular tapered funnel surface is operative to collect water that drains into the fitting body through the body inlet as well as through the drain fitting openings that extend in the body and are radially disposed outwardly from the body inlet. The annular tapered funnel surface extends closer to the central axis of the fitting with axial movement toward the body outlet. The tapered funnel surface has a central funnel opening that is fluidly connected to a spout. The spout extends axially toward the body outlet and is bounded by a generally annular spout wall. The spout terminates at a discharge opening that extends in an outlet end portion of the interior of the fitting body adjacent to the body outlet. The annular spout wall includes at least one spout outlet through the wall which in an exemplary arrangement includes an elongated slot that extends from the discharge opening toward the central funnel opening.

In exemplary arrangements, the body includes a cylindrical portion which outwardly bounds the fitting and is positioned between the body inlet and the body outlet of the fitting. A cylindrical portion includes an outer wall with an air gap opening. The air gap opening provides for the interior area of the fitting to be open to atmosphere. In exemplary arrangements, the air gap opening is positioned vertically below each of the drain fitting openings and the body inlet. The air gap opening may also be positioned on the body in an area that is opposite the elongated slot in the spout. Thus in some exemplary arrangements, water received in the fitting from the body inlet and the drain openings passes downwardly out of the spout and into the outlet end portion of the body on a side angularly opposed of the air gap opening through the discharge opening at the bottom of the spout. In some exemplary arrangements, the portion of the generally annular spout wall that extends adjacent to the air gap opening serves as a shield that prevents water that has passed through the spout from splashing out of the air gap opening. The shield extends radially between the air gap opening and the central funnel opening and extends in the axial direction above and below the air gap opening.

Further in some exemplary arrangements a plurality of axially elongated fins extend radially intermediate of the inner wall of the cylindrical portion of the body and the generally annular spout outer wall. The fins further operate to prevent water flowing through the spout portion of the fitting from splashing out of the fitting interior area through the air gap opening.

In exemplary arrangements, different configurations for the air gap opening may be utilized. This may include a continuous circumferential annular air gap. The air gap opening operates to assure that if water backs up into the interior area of the fitting through the body outlet, such water will exit from the fitting through the air gap opening prior to reaching a level at which the water can be drawn by suction into any of the drain fitting openings or the body inlet. This reduces the risk of contamination of devices that are connected to the exemplary manifold fitting.

In other arrangements, alternative air gap structures may be combined with the manifold fitting so as to provide a similar safety function and avoid contamination reaching the devices to which the manifold fitting is connected. In some such arrangements, the air gap structure may be a separate structure from the associated manifold fitting. Of course numerous other structures and approaches may also be utilized.

BRIEF DESCRIPTION OF DRAWINGS

FIG. 19 is an exploded view of the manifold plumbing fitting of FIG. 18 FIG. 20 is a plan view of the top portion of the manifold plumbing fitting of FIG. 18.

FIG. 21 is a section view of the top portion of the plumbing fitting along line 21-21 in FIG. 20.

FIG. 22 is a plan view of the bottom portion of the exemplary plumbing fitting of FIG. 18.

FIG. 23 is a cross-sectional view of the bottom portion taken along line 23-23 in FIG. 22.

FIG. 49 is a schematic view of a drain arrangement for a plurality of water discharge devices including a manifold fitting and an exemplary air management/check valve.

FIG. 55 is a top perspective view of the air management/check valve.

FIG. 56 is a plan view of the perforated plate of the air management/check valve.

FIG. 57 is a top perspective view of the perforated plate of the air management/check valve.

DETAILED DESCRIPTION

Figure 1:
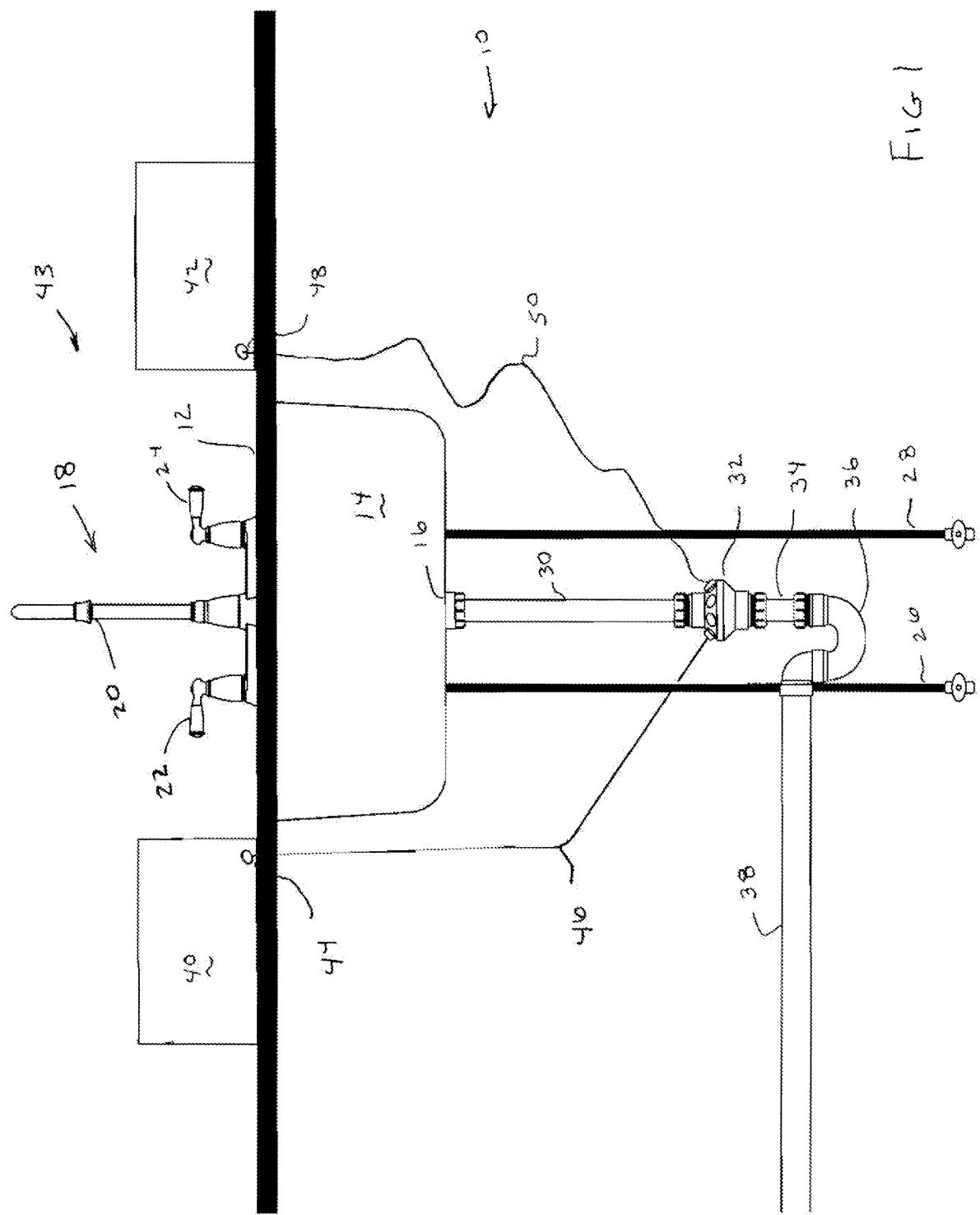
FIG. 1 is a schematic view showing a sink, trap and manifold plumbing fitting of an exemplary arrangement used in a clinical facility.

Referring now to the drawings, and particularly to FIG. 1, there is shown therein a system generally indicated 10. The exemplary system includes a sink 12, which includes a water tight holding area or bowl 14. The bowl 14 of the sink includes a drain 16. The sink is in connection with a faucet 18. The exemplary faucet 18 includes a water outlet 20, which is configured to deliver water above and into the sink 12. The exemplary faucet further includes two manually actuated valves 22 and 24. Valves 22 and 24 of the faucet are in connection with and control flow from water supply lines 26 and 28 respectively. Supply lines 26 and 28 correspond to cold water and hot water delivery lines in the exemplary arrangement.

In the exemplary system 10, drain 16 of the sink is connected to a drain pipe 30. Drain pipe 30 is connected to an exemplary manifold plumbing fitting 32, which is later discussed in detail. As a result the drain is in direct fluid connection with the inlet of the plumbing fitting. The manifold plumbing fitting 32 is connected to an outlet pipe 34, which is connected to a drain trap 36 that is associated with the sink. In the arrangement shown, the drain trap 36 is a U-shaped trap, which is configured to maintain water therein, even when water has been fully drained from the sink 14. This exemplary configuration of the drain trap 36 avoids migration of sewer gas from a drain header 38 to which the trap is connected, up and into the sink and the building air through the sink drain. The exemplary U-shaped trap 36 further provides the function of trapping and holding heavy items which may inadvertently pass down through the drain 16 of the sink. It should be understood however, that although in the exemplary arrangement a U-shaped drain trap is utilized, other types of drain traps may be utilized in other system configurations.

The exemplary system 10 is representative of systems that may most often be used in clinical facilities. Such clinical facilities may include medical office environments, hospital environments, dental office environments, dental lab environments, surgical environments, urgent care centers, veterinary hospital environments or other types of facilities in which additional devices may be positioned in proximity to the sink. Such clinical facilities may include a sterilization center or sterilization room. For example, in exemplary arrangements, devices utilized in the clinical facility 43 in the area of the sink may include devices which discharge water or other liquid waste material that is to be disposed of by passing it down to the drain header 38 for disposal to a sanitary sewer system. For purposes of brevity such discharge water and other liquid waste material are both and each referred to herein as water. The exemplary drain header 38 is in operative connection with a sanitary sewer drain, such as a drain from the particular building in which the system 10 is located. The sanitary sewer drain is operatively connected to a municipal or other sanitary waste water system, which provides for the treatment of waste water and other material which is passed from the drain of the sink and other devices. Of course, it should be understood that this approach is exemplary and in other arrangements other approaches may be used and the exemplary manifold plumbing fittings described herein may be used in other environments and other types of facilities.

Water discharge devices are represented by devices 40 and 42 in FIG. 1. The water discharge devices used in any exemplary system will depend on the particular system and the clinical facility, commercial, residential or other environment in which such devices are used. In some exemplary arrangements, the water discharge devices may also include water connections from one or both of the supply lines 26 and 28. In some exemplary applications the water discharge devices utilized may include devices that are used in connection with sterilizing medical devices, tools and appliances. Some examples of such devices include autoclaves and steam sterilizers, ultrasonic cleaners, tabletop instrument washers, under counter instrument washers, other item washer devices, model trimmers, reverse osmosis filters, deionization filters, autoclave and steam sterilizer coolers, heat sinks and condensation collection devices, and other devices that discharge a fully or partially liquid water material or other fluid that is to be disposed of by passing to the drain header 38.

In the exemplary clinical facility arrangement, the water discharge device 40 includes a liquid drain outlet 44, which is connected through a rigid drain line 46 to the plumbing fitting 32. Water discharge device 42 has a drain outlet 48, which is connected through a flexible tube 50 to the fitting 32. Of course, it should be understood that the exemplary fitting 32 is configured to accept drain lines or different types from a plurality of water discharge devices in a manner that is later discussed.

Figure 2:
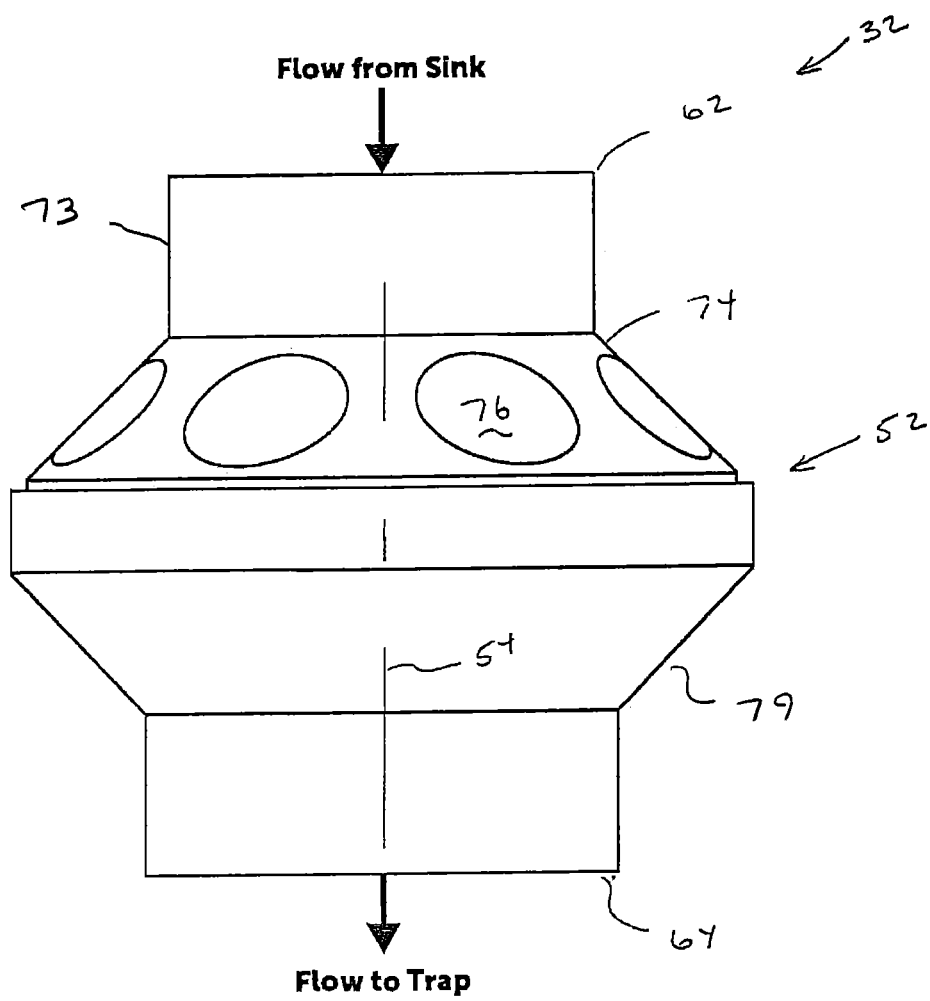
FIG. 2 is a side view of an exemplary manifold plumbing fitting.
Figure 3:
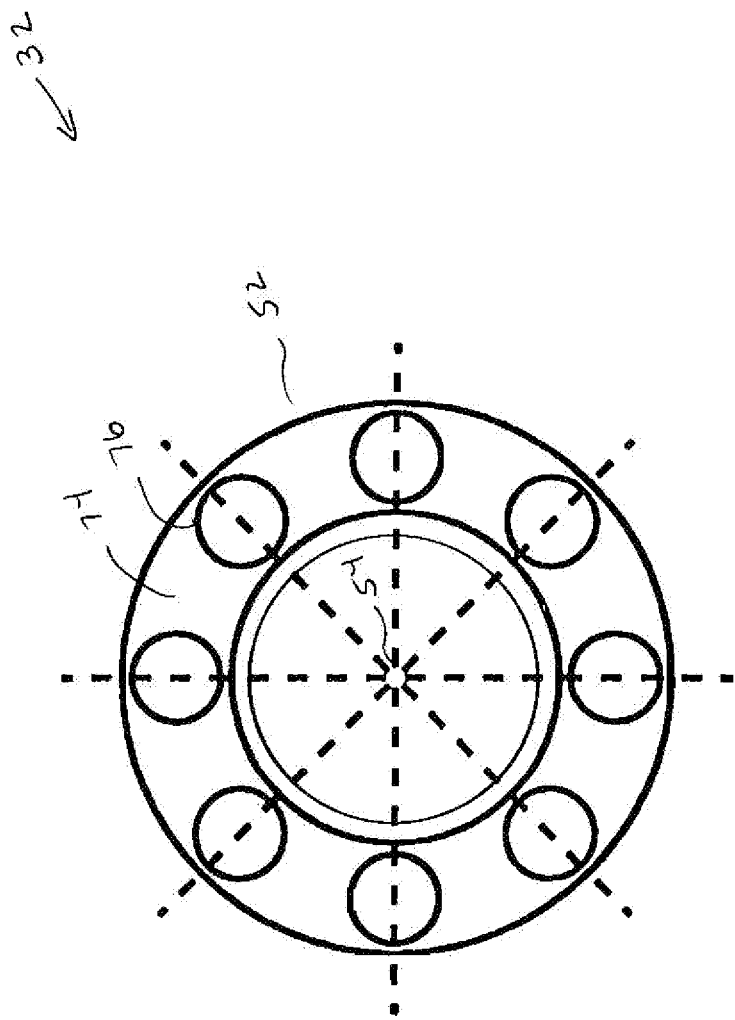
FIG. 3 is a top plan view of the plumbing fitting.
Figure 4:
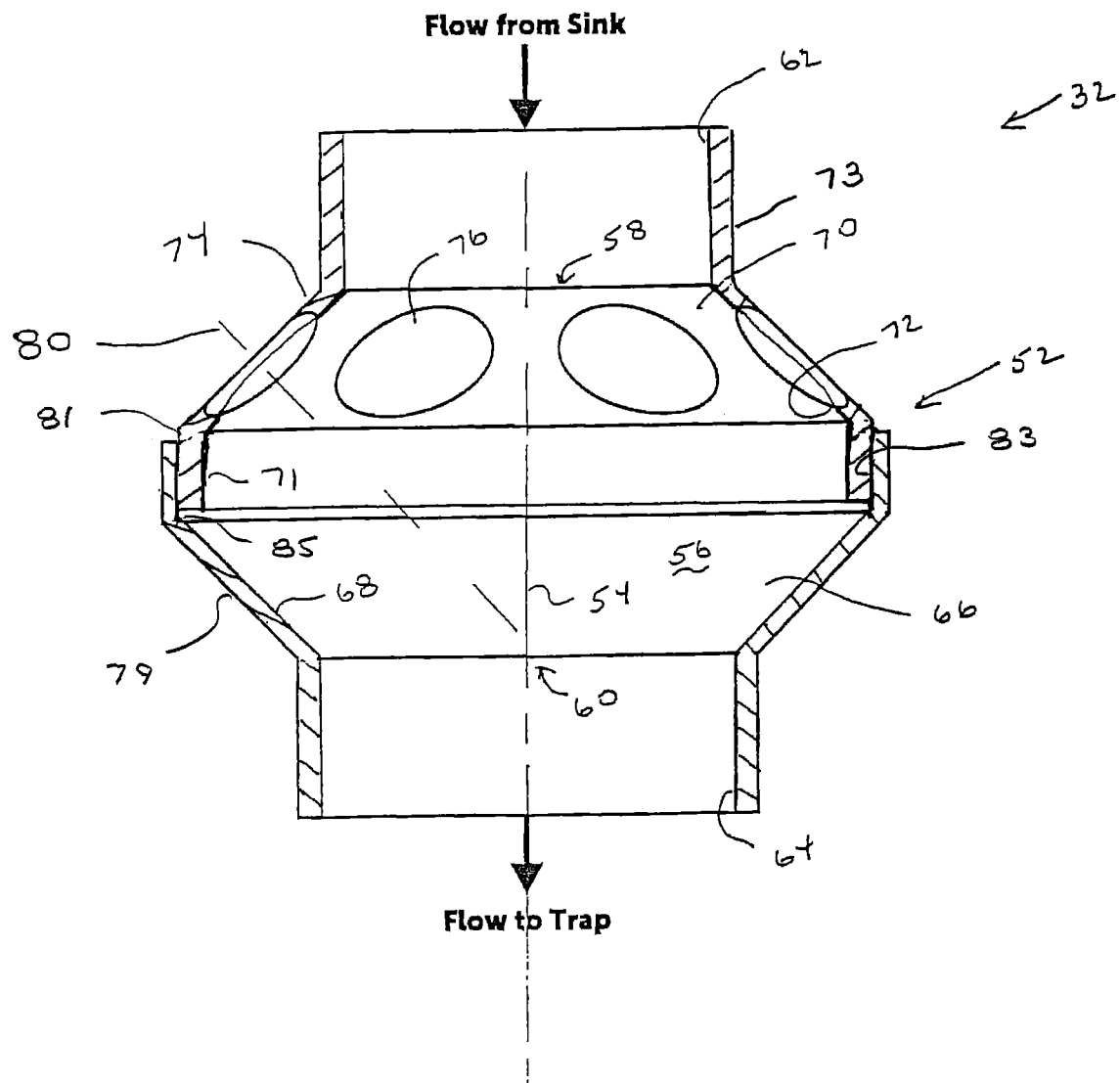
FIG. 4 is an axial cross-sectional view of the manifold plumbing fitting.

An exemplary plumbing fitting 32 is shown in greater detail in FIGS. 2 through 4. The exemplary fitting 32 includes an annular body 52. Annular body 52 extends along a body axis 54. The axis 54 extends in a vertical position in the operative position of the fitting 32. For purposes hereof, the vertical position includes a direct up and down position or a position at an angle from the vertical that enables water and other liquid waste to flow from the interior area of the fitting to the outlet pipe 34. It should be understood that while in the exemplary arrangement the body is cylindrical in other arrangements other shapes may be used.

In the exemplary arrangement, the body 32 is comprised of a plastic material. Such a plastic material may include plastic such as ABS, PVC, CPVC or Polypropylene. However, in other arrangements, the body may be comprised of metals, such as steel, brass, copper or cast iron. In still other arrangements, the body may be comprised of other materials, such as fiberglass or composites. The material used in any exemplary system will need to be compatible with the waste material and temperature ranges that are encountered by the fitting body in the operation of the system.

As shown in FIG. 4, the exemplary fitting body bounds a generally open interior area 56. The interior area 56 includes a body inlet opening 58 and a body outlet opening 60. Body inlet opening 58 is in fluid connection with a fitting inlet coupling portion 62 of the body that comprises a body inlet and in the arrangement shown in FIG. 1 is in direct fluid connection with the sink drain. In the arrangement shown in FIG. 1, the fitting inlet coupling portion 62 is in connection with the drain pipe 30. In the arrangement shown in FIG. 1, the fitting inlet coupling portion is operative to receive water and air from the sink drain 16. However, as will be seen in other exemplary arrangements, the body inlet coupling portion 62 may only receive air therein and not liquid material. The interior area is referred to as generally open because liquid and air are able to pass therethrough.

In the exemplary arrangement shown the body inlet extends coaxially with the axis 54. The body inlet has a constant inlet diameter through the inlet coupling portion to the opening to the body interior area.

The body 52 further includes a fitting outlet coupling portion 64 that comprises a body outlet. The fitting outlet coupling portion is configured to receive liquid that is passed from the interior area through the body outlet opening 60 and deliver such liquid to the outlet pipe 34 as shown in FIG. 1.

In the exemplary arrangement the body outlet extends coaxially with the axis and the body inlet. The body outlet has a constant outlet diameter from the outlet opening from the body interior area through the outlet coupling portion. In the exemplary arrangement the inlet diameter and the outlet diameter are the same. However, in other arrangements the inlet diameter may vary from the outlet diameter and/or the diameters may vary along the respective passages between the openings to the interior area and the connections to the fluid conduits on the inlet side and on the outlet side of the manifold plumbing fitting.

It should be appreciated that although in the exemplary arrangement the fitting inlet coupling portion 62 and the fitting outlet coupling portion 64 are configured to be fittings that are cemented in engagement with adjacent pipe sections, in other arrangements different coupling methods may be utilized to engage the plumbing fitting 32 to adjacent pipes or other structures.

As shown in FIGS. 2 through 4, in the exemplary arrangement of the fitting 32 the interior area 56 within the body extends annularly and radially outward from the axis 54 beyond the area of the body inlet 58 and the body outlet 60. The interior area 56 further includes an axial end 66 which comprises an outlet end portion of the interior area. In the operative position, the axial end 66 is the lower end of the interior area. In the exemplary arrangement, the outlet end portion of the interior is bounded in the interior area by an annular tapered outlet end funnel surface 68. The annular outlet end funnel surface is tapered downwardly toward the body outlet opening 60 which is also referred to herein as a body outlet funnel opening, in the operative position of the fitting 32. In the exemplary arrangement, in the operative position of the fitting the taper is arranged such that the annular tapered outlet end funnel surface 68 is vertically lower with closer axial proximity to the body outlet funnel opening 60. This relationship may alternatively be described as the annular tapered outlet funnel surface being closer to the body axis with proximity along the body axis to the body outlet funnel opening. Of course, it should be understood that this configuration is exemplary and in other arrangements, other configurations may be used.

The interior area further includes a further axial end 70. The further axial end 70 which is alternatively referred to herein as an inlet end portion, is disposed at the upper end of the interior area 56 in the operative position of the fitting. The interior area at the inlet end portion is bounded by a radially extending inlet end surface. In the exemplary arrangement the inlet end surface comprises an annularly tapered wall surface 72. The exemplary annularly tapered wall surface 72 which is alternatively referred to herein as an annular tapered inlet end funnel surface, extends radially outward beyond the body inlet opening 58 and the body outlet opening 60 as shown. The body inlet opening 58 is alternatively referred to herein as a body inlet funnel opening. In the exemplary arrangement in the operative position of the plumbing fitting the annular tapered inlet end funnel surface is disposed vertically higher with closer proximity to the body inlet funnel opening. This configuration can alternatively be described as the annular tapered inlet end funnel surface being closer to the body axis with closer proximity along the body axis to the body inlet funnel opening.

In the exemplary arrangement the interior area is bounded by a continuous annular sidewall surface 71. In the exemplary arrangement sidewall surface 71 is a cylindrical sidewall surface that in the operative position of the plumbing fitting extends generally vertically and continuously intermediate of the inlet end funnel surface 72 and the outlet end funnel surface 68. Of course it should be understood that in other arrangements the continuous sidewall surface that bounds the interior area radially need not be cylindrical. The surface that bounds the interior area may have other shapes. Further in exemplary arrangements the sidewall surface is continuous in that the surface does not include any openings therein for receiving liquid into the interior area in a direction transverse to the body axis.

In the exemplary arrangement the interior area includes only open space in the area that extends axially between the inlet end funnel surface and the outlet end funnel surface and diametrically across the interior area bounded by the cylindrical sidewall surface. Further in the exemplary arrangement the sidewall diameter is at least 1.5 times the diameter of the body inlet funnel opening 58. This configuration is useful for assuring that flow streams from a sink through the opening 58 into the interior area, and flow streams from other devices into the interior area through the drain fitting openings that are later discussed, do not cause excessive splashing and other undesirable flow patterns. Further it should be understood that in exemplary arrangements that do not have a cylindrical sidewall surface but have a closed annular sidewall surface of a different configuration, the sum of the co-linearly arranged radial distances on each side of the axis to the sidewall in all angular directions from the axis, is a distance that is at least 1.5 times the diameter of the body inlet funnel opening. In exemplary arrangements this configuration helps to facilitate the desired internal flow characteristics. However in other arrangements other approaches may be used.

In the exemplary arrangement, a tapered annular outer wall surface 74 externally overlies annular tapered inlet end funnel surface 72 and bounds the upper exterior portion of the fitting body 52. Like tapered wall surface 72, tapered annular outer wall surface 74 is configured so that in the operative position its surface is increasingly vertically higher with closer proximity along the body axis to the body inlet. Of course, it should be understood that this configuration is exemplary and in other fitting arrangements other approaches may be used.

Figure 12:
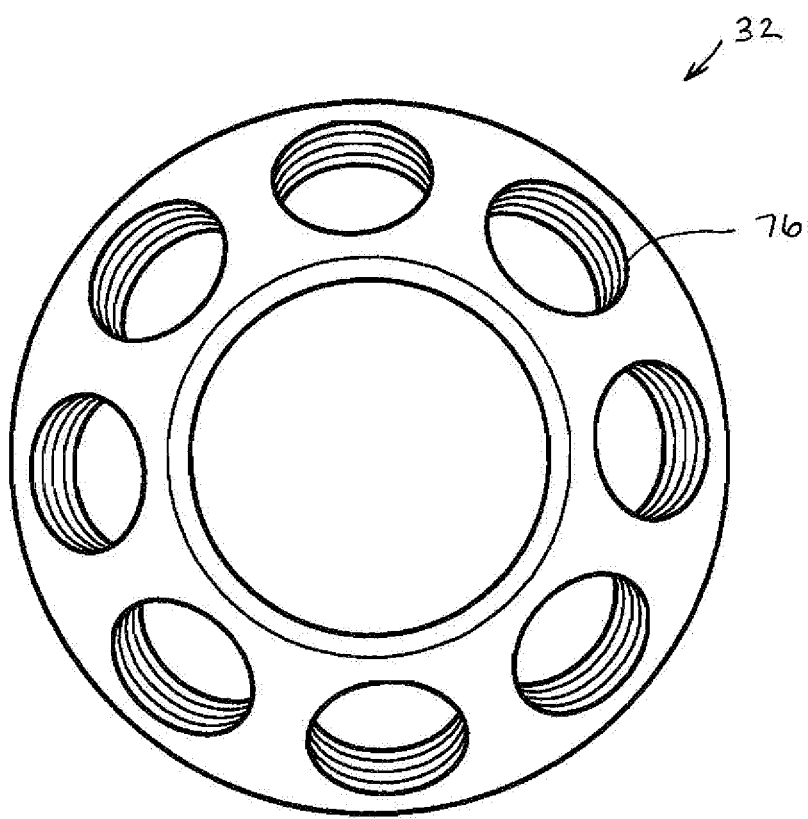
FIG. 12 is a top plan view of an exemplary plumbing fitting with eight drain fitting openings.
Figure 13:
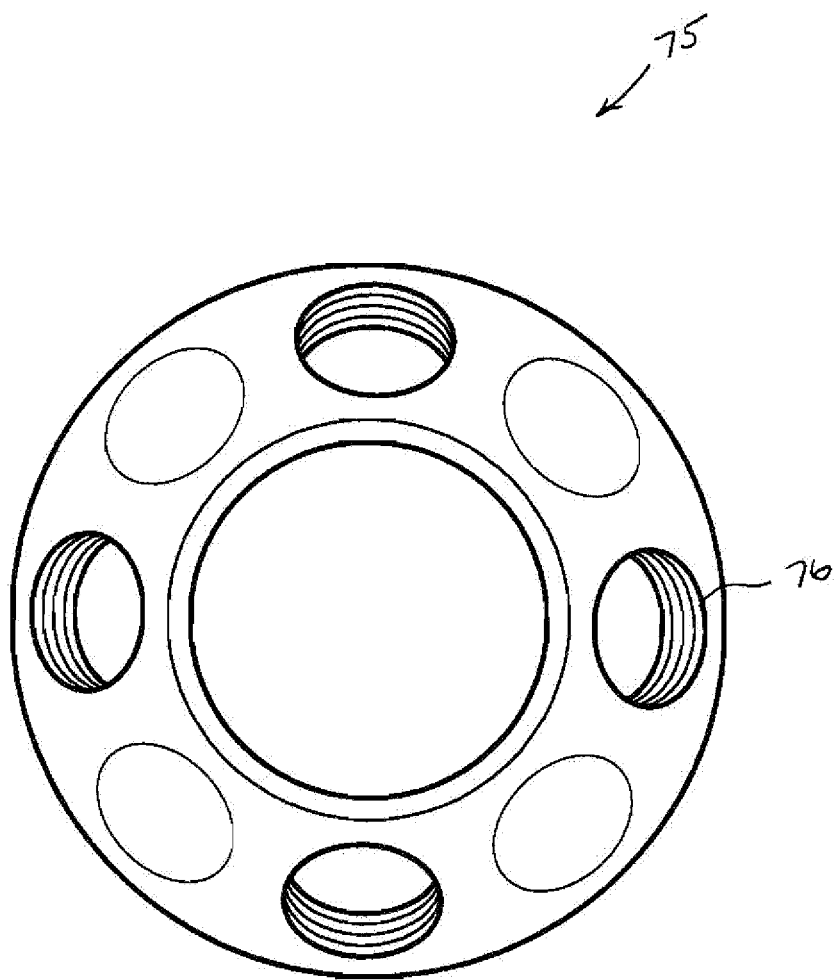
FIG. 13 is a top plan view of an exemplary plumbing fitting with four drain fitting openings.
Figure 14:
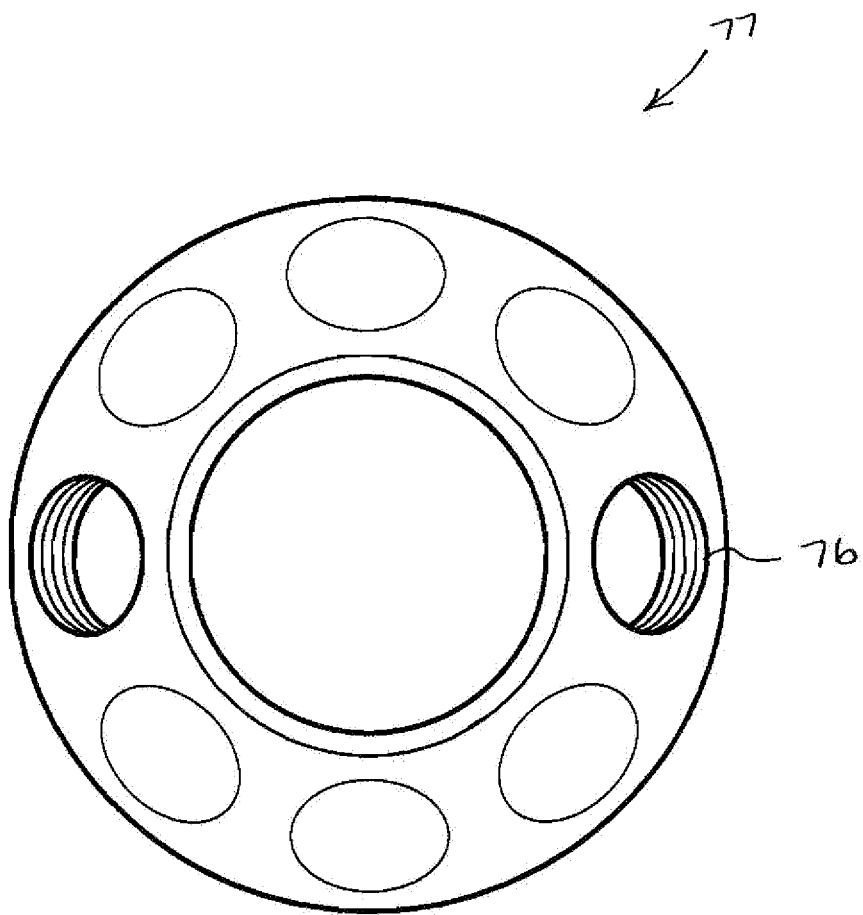
FIG. 14 is a top plan view of an exemplary plumbing fitting with two drain fitting openings.

A plurality of drain fitting openings 76 extend through wall surfaces 72 and 74 of the body. The plurality of drain fitting openings extend through the body into the interior area 56 of the fitting. In an exemplary arrangement, each of the drain fitting openings 76 comprises a threaded opening of a common size. In some exemplary arrangements, the drain fitting openings comprise a one-half inch NPT threaded opening. In one exemplary arrangement of the fitting 32 shown, there are eight uniformly angularly spaced drain fitting openings in the body. A top plan view of fitting 32 with eight fitting openings is shown in FIG. 12. FIG. 13 is a top plan view of an alternative arrangement of a manifold plumbing fitting 75 with four drain fitting openings 76. FIG. 14 is a top plan view of yet another alternative arrangement of a manifold plumbing fitting 77 with two drain fitting openings 76. Of course, it should be understood that these approaches are exemplary and in other arrangements other types of drain fitting connection features and types, opening sizes, numbers and configurations may be used.

In the exemplary arrangement, each of the drain fitting openings are arranged in a circular pattern and are uniformly angularly spaced from one another in the tapered annular outer wall surface 74. Each of the drain fitting openings is positioned radially outward of the body inlet funnel opening 58. The drain fitting openings 76 extend generally perpendicular to the wall surface 74 and extend along a drain fitting axis 80, one of which is shown in phantom in FIG. 4. Each drain fitting axis 80 in the exemplary arrangement intersects the body axis 54 of the fitting at an acute angle. In the exemplary arrangement each respective drain fitting axis intersects with the body outlet funnel opening. Further in some exemplary arrangements each respective drain fitting axis intersects the body axis in an area within or below the body outlet funnel opening. Further, in the exemplary arrangement in the operative position of the fitting, each of the drain fitting openings 76 is positioned in vertically aligned overlying relation above the annular tapered outlet end funnel surface 68, which bounds the interior area 56 of the body at the lower outlet end portion of the interior area.

Figure 5:
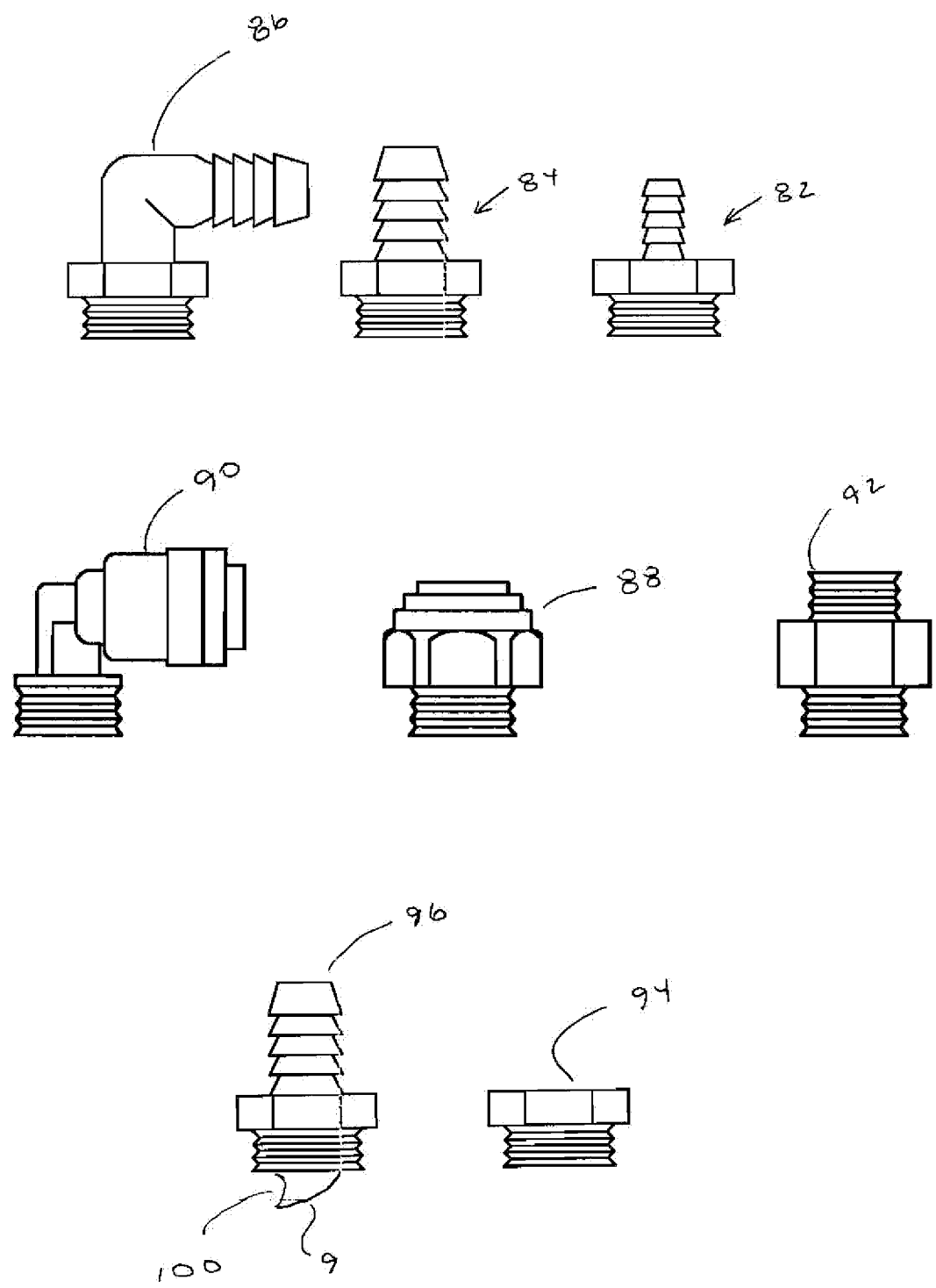
FIG. 5 are side views of a collection of numerous different types of drain fittings that may be engaged with the exemplary plumbing fitting.

In the exemplary arrangement, each of the drain fitting openings is configured to receive in releasable threaded engagement therewith a drain fitting, which is fluidly connectable with a corresponding water discharge device. Exemplary drain fittings which may be engaged with the exemplary fitting openings are shown in FIG. 5. The exemplary drain fittings include hose barb fittings 82 and 84. Fittings 82 and 84 are straight hose barb fittings that are suitable for engagement with a flexible conduit, such as a plastic tube or a rubber hose. As represented fitting 82 is configured to engage a smaller hose or tube than fitting 84. Each of the fittings is configured with a threaded portion having an opening therethrough. The threaded portion is engageable with the threaded drain fitting opening 76 in the body of the fitting 32.

An elbow barb fitting 86 is shown in FIG. 5. The elbow barb fitting is generally similar to fittings 82 and 84, in that it accepts a flexible tube thereon. However, elbow fitting 86 is angled relative to the threaded portion so as to accept the tube at a 90 degree angle relative to the main body axis of the fitting.

Other alternative fittings that can be used in connection with exemplary arrangements include a quick connect male adaptor fitting 88. Fitting 88 is configured to accept and engage a plastic tube in aligned engagement therewith. A quick connect elbow fitting 90 is similar to fitting 88, except that it accepts a plastic tube or other conduit therein at a 90 degree angle to the main fitting body.

Other types of fittings, such as a threaded adaptor fitting 92 can also be used in exemplary arrangements. Adaptor fitting 92 can be used for connecting to threaded fittings commonly used with solid conduits, such as brass fittings, which are used to engage copper or brass tubing. Alternatively, threaded fittings for engaging plastic threaded tube fittings or other types of conduits may be used.

It should be understood that the fittings shown are exemplary of many different types of fittings that can be used in conjunction with exemplary arrangements of the manifold plumbing fitting. Further, it should be appreciated that while threaded connections into the interior area of the plumbing fitting body are shown, in other exemplary arrangements other types of connections for fittings may be utilized. These may include for example, cemented type coupling openings included on the body which can be used to connect to cemented pipes or tubing. Further, while the exemplary arrangement shows female coupling openings through the body, other configurations of fittings may have male adaptors for connecting to various types of conduits that extend externally of the body. The exemplary arrangement may be adapted for use with numerous different types of conduits and connectors as appropriate for the particular environment in which the unit may be utilized.

In the exemplary arrangement of plumbing fitting 32, up to eight conduits from different water discharge devices may be connected to the fitting through the drain fitting openings 76. However, in most installations not all of the drain fitting openings will be utilized for connection to a water discharge device. This may be true even with lesser numbers of openings such as fittings 75 and 77. In exemplary arrangements, the unused openings 76 are closed or blocked through use of plugs. An exemplary plug 94 is shown in FIG. 5. Plug 94 may be threadably engaged with an opening 76 to close the opening when not in use. Thereafter, in the event the configuration of the area changes and an additional water discharge device is added or moved to another location, plug 94 can be removed from the respective opening and a suitable drain fitting may be installed. Of course, it should be understood that this approach facilitates the rearrangement of devices and drains in exemplary arrangements. Of course, in other arrangements other approaches may be used.

In the operation of the equipment in the clinical facility 43 shown in the exemplary system 10, water that is discharged into the sink from the water outlet 20 of the faucet 18 passes through the drain 16 of the sink 12. The drain water flows through the drain pipe 30 and along the body axis 54 through the center of the interior area 56 of the fitting 32. The water drained from the sink passes out the outlet pipe 34, through the trap 36 and through the drain header 38 to the sanitary sewer.

When one or more of the water discharge devices 40, 42 are operated, water and/or other waste passes from the respective drain outlet 44, 48 and through the respective drain line 46, 50 into a respective drain fitting positioned in a respective opening 76 of the manifold fitting 32. The liquid that passes at a slow flow rate through the drain fitting in the opening 76 flows or drips downward within the interior area 56 of the body and engages the annular tapered outlet end funnel surface 68. The annular tapered outlet end funnel surface directs the liquid toward the body outlet funnel opening 60 and through the fitting outlet coupling portion to the outlet pipe 34 and the trap 36. In the exemplary arrangement, the positioning of the outlet openings 76 and the associated drain fittings in vertically overlying relation above the annular tapered outlet end funnel surface 68 facilitates draining the waste water and liquid out of the interior area of the fitting body. Further, in this exemplary arrangement the positioning of the drain fitting openings from the water discharge devices outside the main axial pathway through the body 52 reduces the risk of the drain fittings that are positioned in the openings 76 from becoming clogged with debris or other material.

Further in exemplary arrangements the configuration of the drain fitting openings is operative to cause a rapid flowing stream of liquid discharged therefrom to be directed into the body outlet funnel opening. This further helps to minimize the risk of waste materials being drawn into other body fitting openings. Additionally if the water is moving axially along the body axis from the sink when a stream of liquid is discharged through one or more of the drain fitting openings, the water moving axially through the interior area receives the stream into the greater flow stream and helps to move the water out of the interior area. Alternatively or in addition, if multiple rapid streams of liquid are discharged simultaneously through the drain fitting openings, the collision the streams in proximity to the body axis and in the area of the body outlet funnel opening, further helps to minimize the risk of contaminated liquid reaching other drain fitting openings. Of course it should be understood that this arrangement is exemplary and in other arrangements other configurations may be used.

In addition, in some exemplary arrangements the drain fittings utilized in connection with some water discharge devices may include a directing outlet, which directs the fluid flow in a particular direction within the interior area of the fitting 32 other then along the respective drain fitting axis. An example of such a drain fitting with the directing outlet is fitting 96 shown in FIG. 5. As shown, fitting 96 is similar to the other fittings previously discussed, except that it includes a baffle or fin 98, which serves to direct the liquid coming from an outlet 100 in a direction that is generally perpendicular to the central axis of the fitting. In the exemplary arrangement, the directing outlet directs fluid in a direction that is selected based on the orientation of the fitting as it is installed in connection with the fitting body 52.

Due to the NPT connections used in the exemplary arrangement, the fittings are enabled to be angularly positioned in the suitable arrangement so as to direct the outlet of the fitting in a desired direction while the threads of the body of the fitting remain in fluid tight engagement with the threads bounding the opening 76 in which the fitting is positioned. This enables the direction of the outlet 100 to be positioned as desired on the body 52. In some exemplary arrangements, the direction for the outlet 100 is in a direction which is radially disposed from and transverse to the body axis 54 such that the fluid passing from the outlet 100 flows to establish a rotational flow within the interior area 56 of the body and around the annular tapered outlet end funnel surface 68. This may be desirable in some arrangements to provide a disbursing or flushing action to prevent the concentration of material in an area directly below the respective drain outlet opening. It may also be useful in some arrangements for avoiding hot liquid material from engaging the plastic body consistently by dripping in a particular position on the annular tapered outlet end funnel surface 68. Of course, it should be understood that these approaches are exemplary and in other arrangements other approaches may be used.

In the exemplary arrangement, the body 52 of the manifold fitting 32 is comprised as a clamshell arrangement. This clamshell arrangement includes an inlet piece 73 which is alternatively referred to as an upper portion. The inlet piece 73 includes the fitting inlet coupling portion and the annular tapered inlet end funnel surface 74 with the drain fitting openings 76. The clamshell arrangement also includes an outlet piece which is alternatively referred to as a lower portion. The exemplary outlet piece 79 includes fitting outlet coupling portion 64 and the annular tapered outlet end funnel surface 68. This exemplary clamshell arrangement may be utilized for ease of manufacture and may provide for permanent assembly and engagement of the upper and lower portions in fixed engaged relation. In the exemplary arrangement the inlet piece 73 includes thereon the continuous annular sidewall surface 71. The inlet piece further includes an annular outer wall 81 that extends radially outward and in parallel relation to the cylindrical sidewall surface. The exemplary outlet piece 79 includes an annular lip 83. The annular lip 83 radially outwardly overlies the annular outer wall 81 of the inlet piece 73 and the cylindrical sidewall surface 71 that bounds the interior area. In the exemplary arrangement the cylindrical sidewall surface is disposed radially inward of a radially outermost periphery 85 of the annular tapered outlet end funnel surface 68. Further in the exemplary arrangement in the operative position of the plumbing fitting, the cylindrical sidewall surface 71 is disposed vertically above the annular tapered outlet end funnel surface 68 as well as radially inward from the periphery 85. In exemplary arrangements this configuration helps to reduce the risk of leakage between the inlet piece and the outlet piece where they are joined in fixed engaged relation. However, it should be understood that this arrangement is exemplary in other arrangements other configurations may be used. For example, in some arrangements the upper and lower portions may be separable, such as through a threaded or other releasable connection. The separability of the portions may be useful in some arrangements for purposes of cleaning or inspecting the interior of the device.

Further, in other arrangements the body of the fitting may have other shapes or other locations for the drain fitting openings. For example, in some exemplary arrangements drain fitting openings may extend vertically through a body inlet end surface or in vertically extending side walls of the body of the manifold fitting. Other body arrangements may also include other configurations and opening arrangements so as to facilitate fitting engagements from multiple directions. Further, as previously discussed, the body may include a plurality of different sizes and types of fitting engaging structures and openings so as to facilitate the use of the manifold fitting member in numerous different types of systems. It can be appreciated that numerous different types and configurations of manifold plumbing fittings may utilize the principles described herein.

Figure 6:
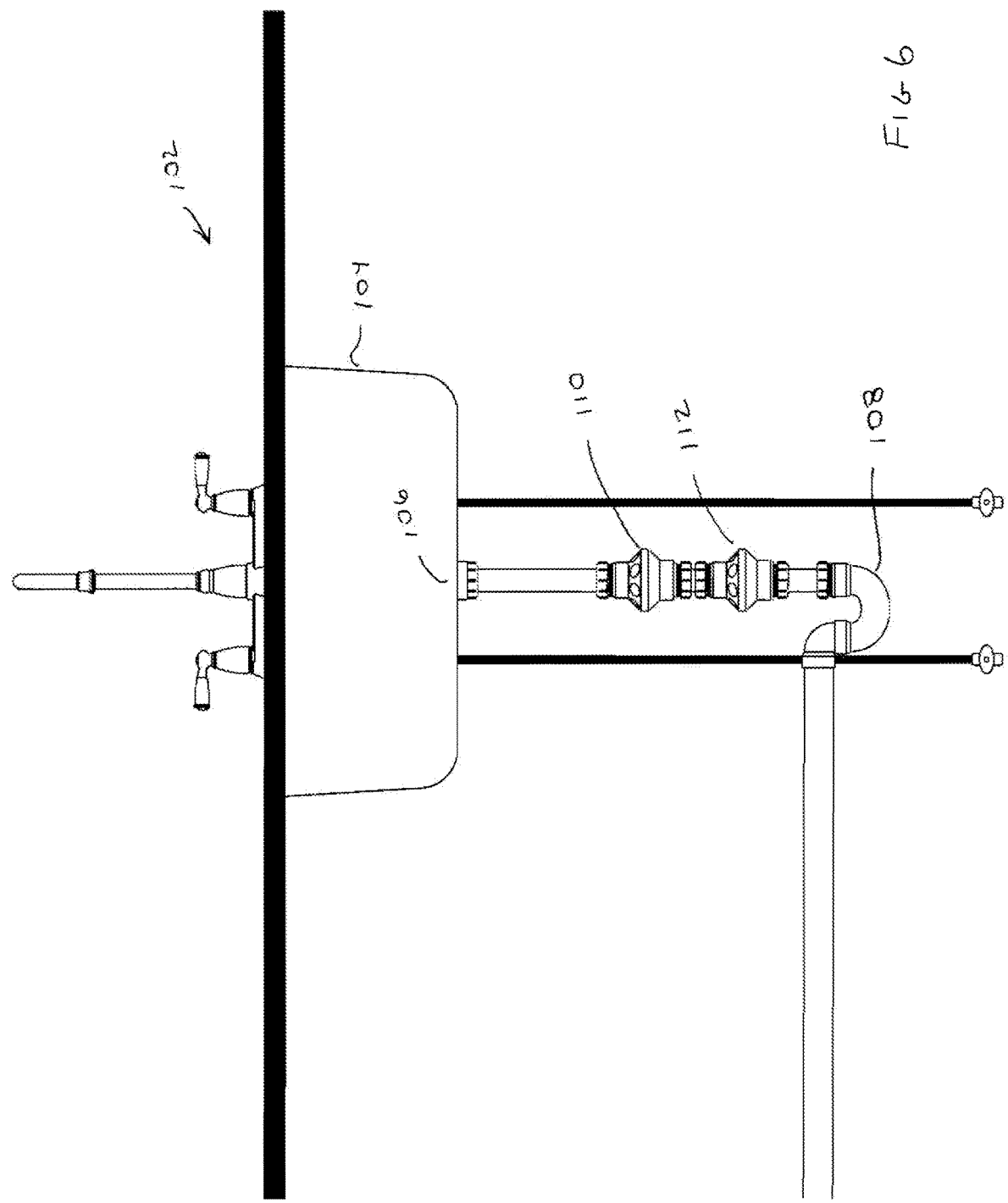
FIG. 6 is a schematic view showing a sink and a trap with two manifold plumbing fittings arranged in a vertically aligned arrangement.

FIGS. 6 through 11 and 15 show alternative arrangements which are representative of ways in which the exemplary manifold plumbing fittings may be utilized. For example, FIG. 6 shows a system 102 with a sink 104, including a drain 106. The drain 106 is fluidly connected to a trap 108. In this exemplary arrangement, a first manifold plumbing fitting 110 and a second fitting 112 are in aligned vertical relation in a fluid path between the sink drain 106 and the trap 108. As can be appreciated, each of the plumbing fittings 110 and 112 are configured to accept a plurality of drain fittings therein. As a result, this configuration provides for a potential doubling of the number of available outlets for water discharge devices compared to the system 10 shown in FIG. 1.

Figure 7:
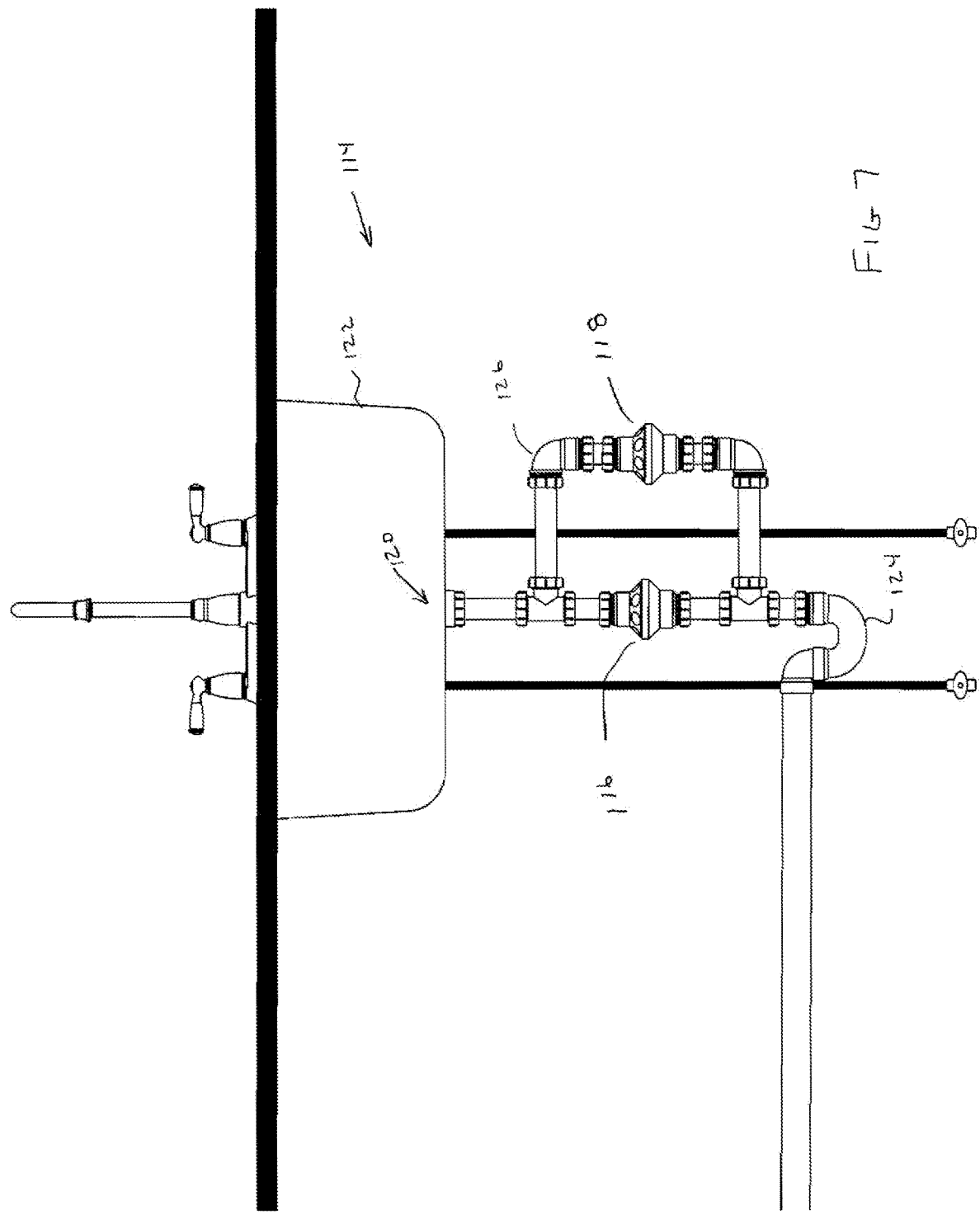
FIG. 7 is a view of a sink and trap with two manifold plumbing fittings arranged in a side-by-side arrangement.

FIG. 7 shows an alternative exemplary system 114, which also includes a pair of manifold plumbing fittings 116 and 118, which are positioned between the drain 120 of a sink 122 and a trap 124. In this exemplary arrangement, the manifold fitting 116 is positioned in the vertical line between the sink and the trap, while the manifold fitting 118 is positioned in a branch line 126, which is connected via "T" connections to the main line. It can be appreciated that the arrangement of system 114 enables providing additional drain fitting opening positions which are transversely spaced which may facilitate the drain line connections from the various water discharge devices to the fittings.

Figure 9:
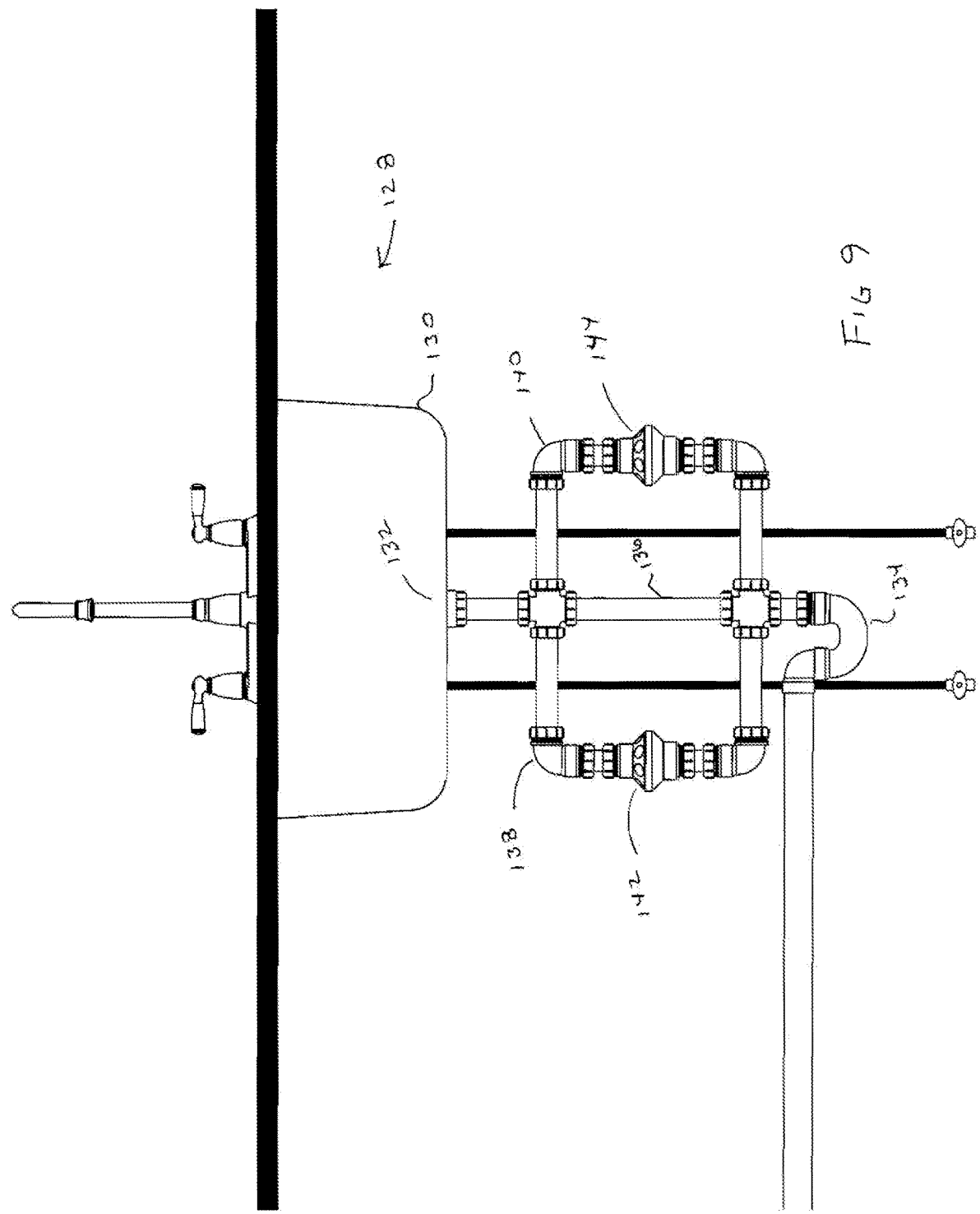
FIG. 9 is a schematic view of the sink and trap arrangement with a pair of manifold plumbing fittings arranged in branch lines to a main drain line between the sink drain and the trap.

FIG. 9 shows a system 128, which is an alternative exemplary system to that shown in FIG. 7. A sink 130 includes a drain 132 that is fluidly connected to a trap 134 through a central branch pipe 136. Cross-fitting connections from the central pipe 136 are made to a first branch 138 and second branch 140. Branch 138 includes a manifold plumbing fitting 142, while branch 140 includes a manifold plumbing fitting 144. As can be appreciated in this exemplary arrangement, the drain connections of the various water discharge devices may be more conveniently connected to one of the branches based on the lateral side relative to the sink 130 on which such devices are positioned. Further, in exemplary arrangements of this type, this approach may be utilized to maintain the manifold fittings 142, 144 and the liquid waste material that they receive disposed away from the central pipe 136. This may be done to reduce the risk of fouling of the drain outlets by materials that might clog or foul them that may be passing through the central pipe 136. Alternatively, an approach of this type might also be taken to initially isolate liquid waste material drained into one or both of the fittings 142, 144 from the material in the central pipe 136, while still enabling each of the fittings to be connected to atmosphere through the sink drain 132. This might be done for example to reduce the amount of initially hot water vapor from a sterilizer or other water discharge device that discharges hot water migrating up into the sink through the sink drain.

Figure 8:
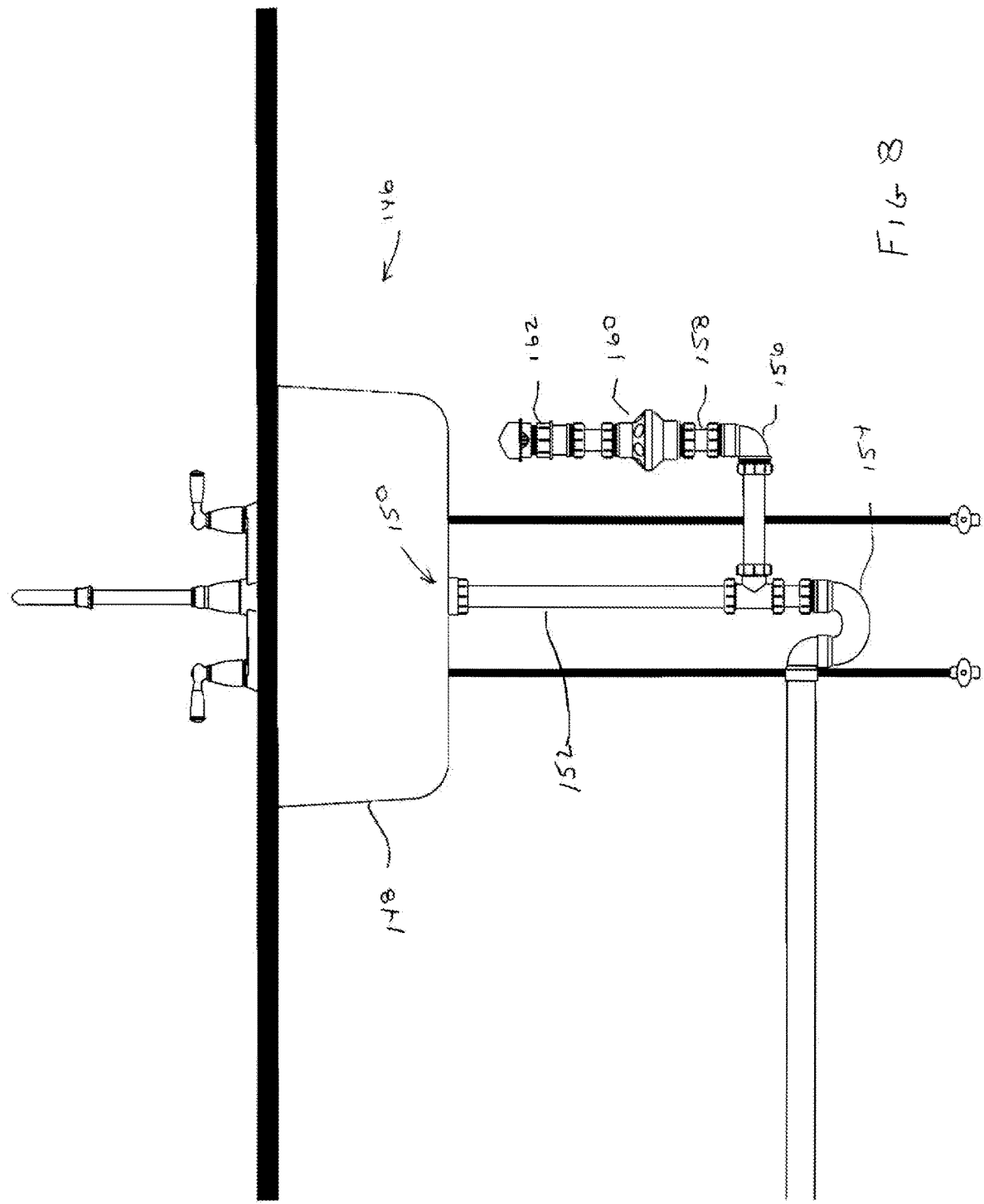
FIG. 8 is a schematic view of a sink and trap arrangement with an exemplary manifold plumbing fitting arranged on a branch of a drain pipe between the sink and the trap, with an air admittance/ball check valve in engagement with the fitting body inlet.

FIG. 8 shows yet another alternative system 146. System 146 includes a sink 148 with a drain 150, which is connected to a discharge pipe 152 that connects to a trap 154. A branch 156 extends from the pipe 152 into a vertical stand pipe 158. An exemplary fitting 160 is connected to the stand pipe. An air admittance/check valve 162 is connected to the fitting inlet coupling portion of the body of the fitting 160. In the exemplary arrangement, the air admittance/check valve comprises a valve that allows air to enter the top of the fitting body, but prevents water from escaping therefrom. This may be done through the use of a ball, a flap or other form of check valve structure in the valve. Alternatively, an air management/check valve of a type later discussed may be used.

As can be appreciated, in the exemplary system 146 this configuration enables the connections of the water discharge devices to the branch 156 through connection to the fitting 160. This approach may be used for example to isolate the fitting 160 from the main drain pipe 152, while avoiding the need to connect the fitting inlet coupling portion to atmosphere through the sink drain 150. Of course, this approach is exemplary of configurations which may be utilized in connection with the exemplary manifold plumbing fittings to avoid the need to use the sink drain as the opening of the fitting body to atmosphere.

Figure 10:
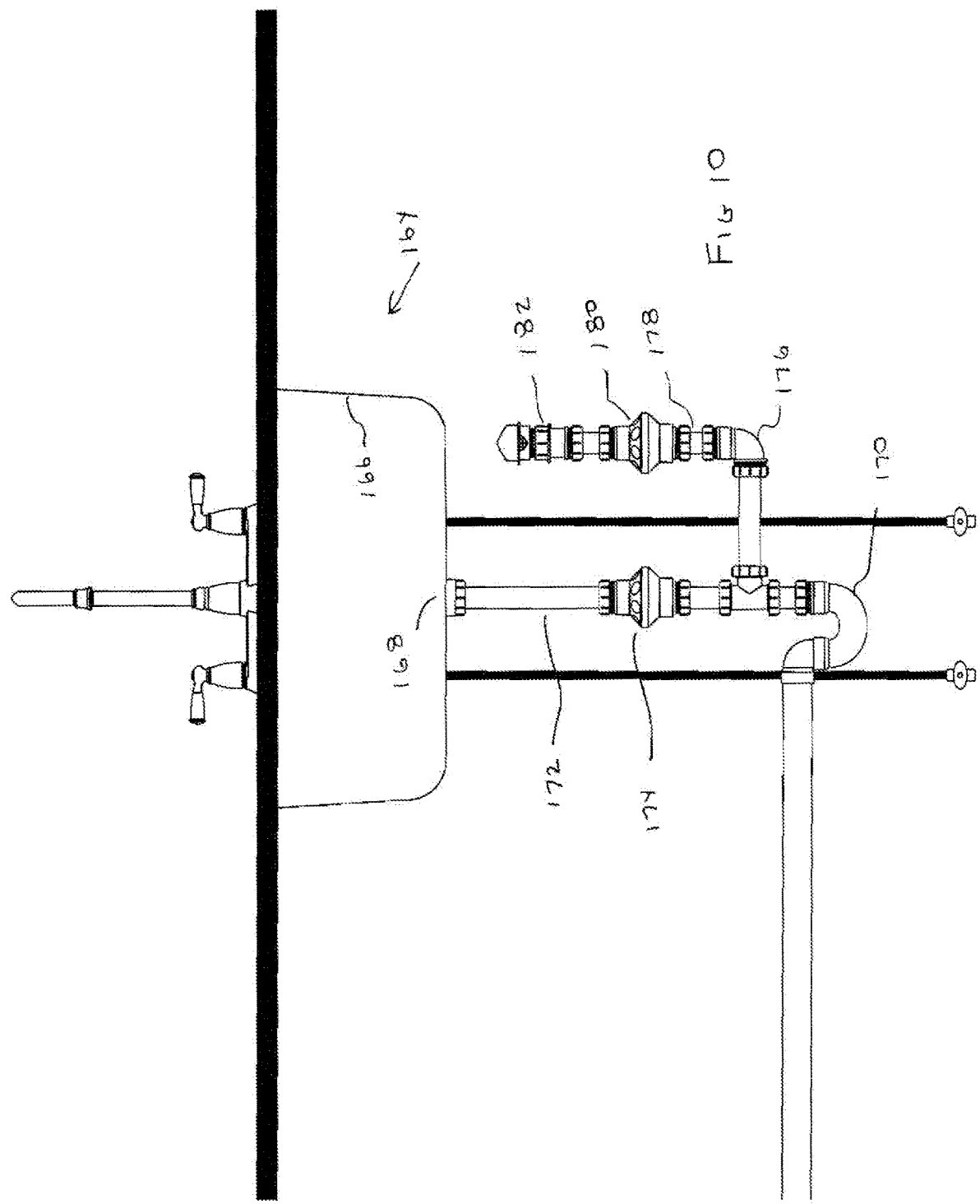
FIG. 10 is a schematic view of a sink and trap arrangement similar to FIG. 8, except that a further manifold plumbing fitting is positioned in the main drain line between the sink and the trap.

FIG. 10 shows an alternative exemplary system 164 that is similar to FIG. 8. System 164 includes a sink 166 with a drain 168. The drain is connected to a trap 170 through a central drain line 172. Positioned in the central drain line, which is made up of a plurality of pipe sections and fittings, is a manifold plumbing fitting 174. Similar to the system shown in FIG. 8, the system 164 further includes a "T" branch line 176, which is connected to a vertical stand pipe 178. A manifold fitting 180 is positioned vertically above the stand pipe. An air admitting valve 182 is in fluid connection with the top of the fitting 180. As can be appreciated, the exemplary system 164 provides drain connections via both the central drain line that extends directly between the sink drain 168 and the trap 170, as well as through the fitting 180 connected to the branch line 176.

Figure 11:
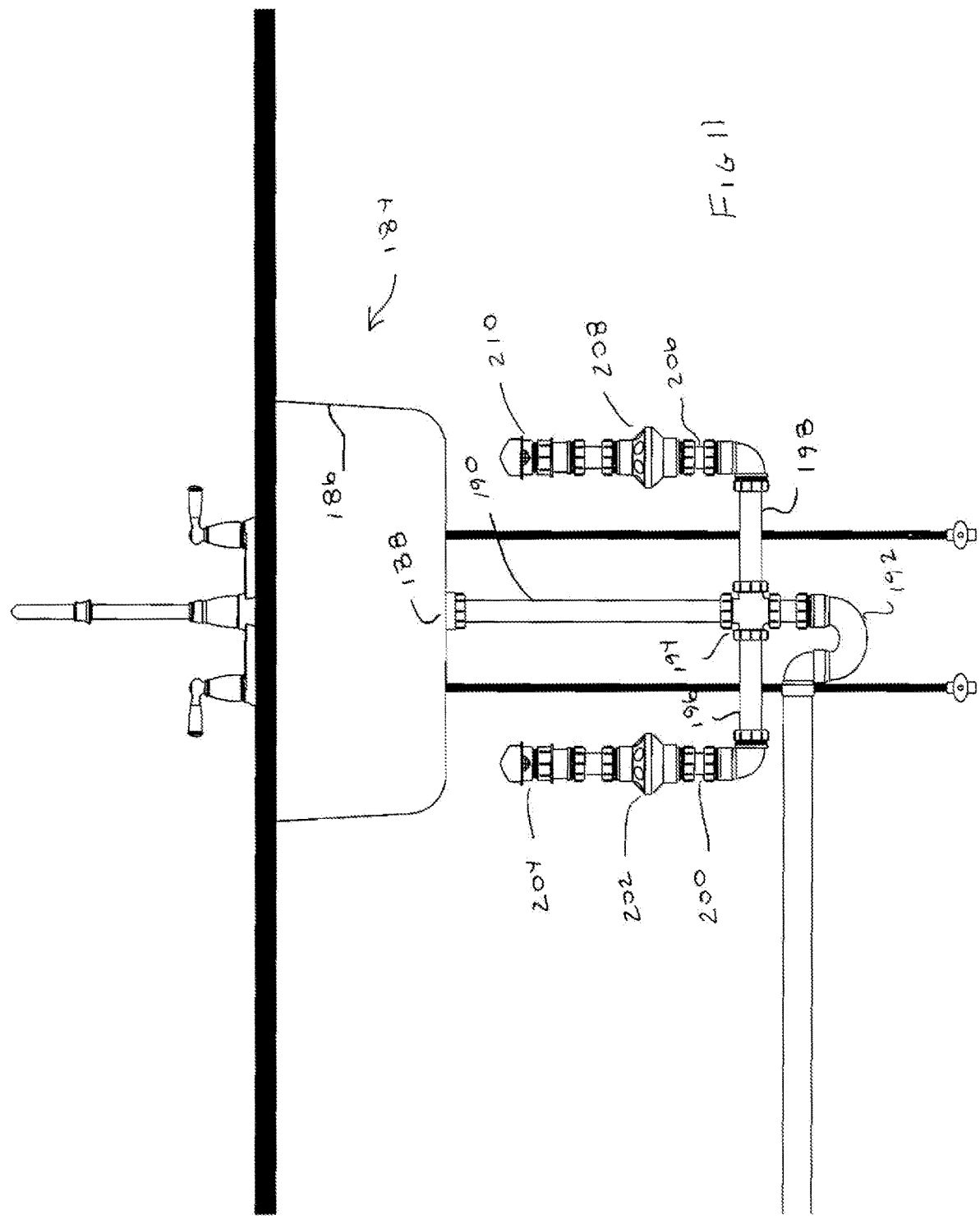
FIG. 11 is a schematic view of a sink and trap arrangement similar to FIG. 8, but with a pair of manifold plumbing fittings in branch lines which extend from a main drainpipe between the sink and the trap, each of which branches includes an air admitting valve above the respective manifold plumbing fitting.

FIG. 11 shows yet another alternative exemplary system 184. System 184 includes a sink 186 with a drain 188. Drain 188 is connected through a central line 190 to a trap 192. Line 190 includes a cross fitting 194, which connects to a first branch line 196 and a second branch line 198. Branch line 196 is connected to a stand pipe 200. A manifold fitting 202 is positioned in connection with the stand pipe 200 and an air admittance/check valve 204 is in connection with the fitting inlet coupling portion of the fitting 202. Similarly, branch line 198 is in connection with a stand pipe 206, which is in connection with a fitting outlet coupling portion of a fitting 208. Air admittance/check valve 210 is in fluid connection with the fitting inlet coupling portion of a fitting 208. As can be appreciated, these configurations avoid the need to connect the interior areas of the fittings 202, 208 to the sink drain 188. This may be desirable in some applications. Further, the approach enables spacing the manifold fitting bodies and the associated drain fitting connections away from the central line 190 from the sink drain, which may facilitate connecting the fittings to water discharge devices that may be more widely spaced.

Figure 15:
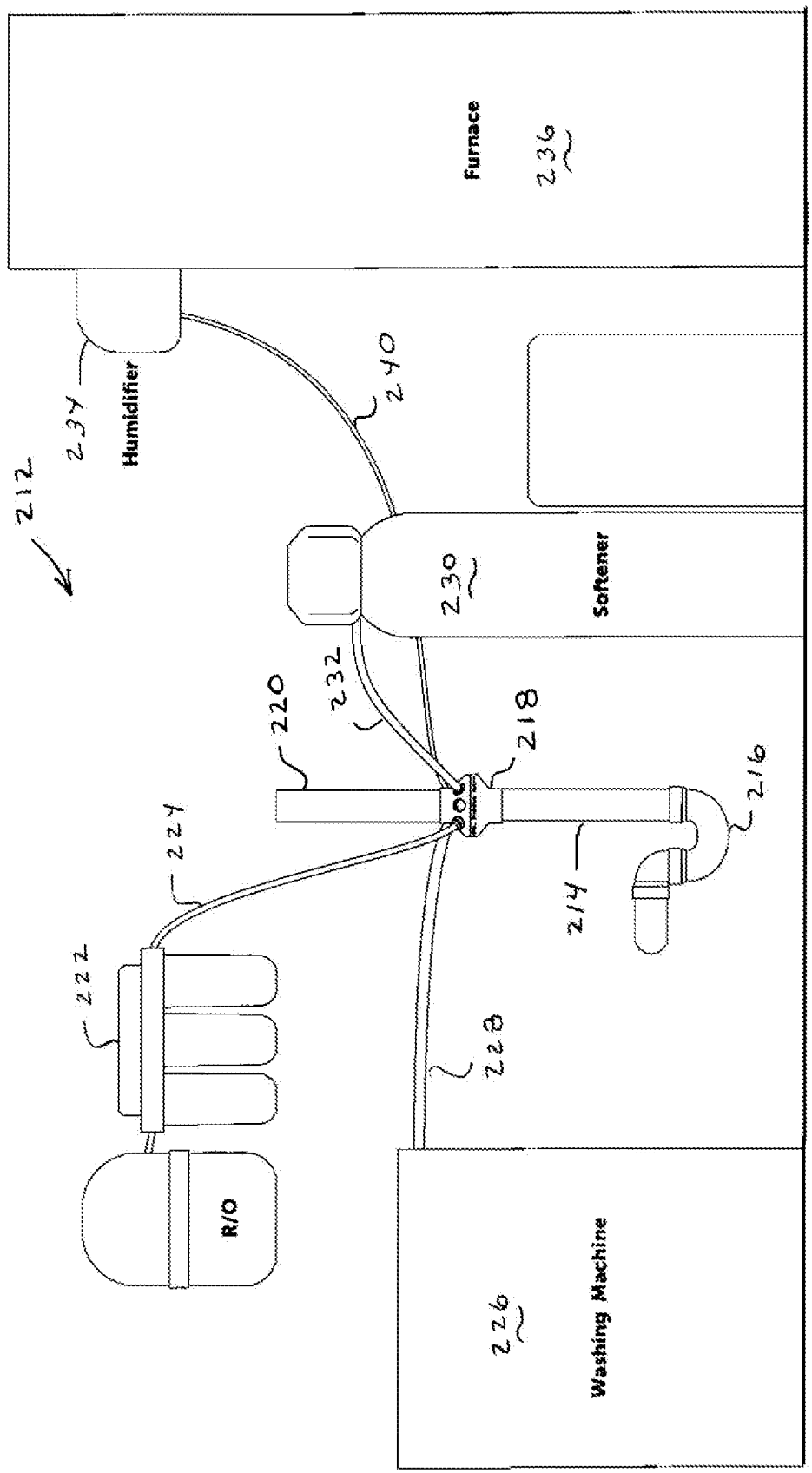
FIG. 15 is a schematic view of a drain arrangement for a plurality of water discharge devices.

FIG. 15 shows yet another alternative exemplary system 212. A drain line 214 is connected to a trap 216. The drain line is connected to a manifold plumbing fitting 218 similar to those previously described. A stand pipe 220 extends upward from the top opening of the plumbing fitting 218.

A plurality of water discharge devices are connected to and discharge water therefrom to the manifold fitting in this exemplary system. A filter 222 of the reverse osmosis type is connected through a drain line 224 to the manifold fitting 218. A washing machine 226 such as one used for cleaning instruments, utensils, garments or other items is connected to the manifold fitting through a drain line 228.

A water treatment device 230, such as a water softener or a water sterilizer is connected to manifold fitting 218 through a drain line 232. A humidifier 234, such as an air humidifier that treats air heated by a furnace 236 is connected to the manifold fitting 218 through a drain line 238. Of course it should be understood that the described water discharge devices of system 212 are merely exemplary of devices from which the manifold fitting may receive discharged water.

In the exemplary system 212 the stand pipe 220 is open to atmosphere and does not have a water drain line connected thereto. However, in other exemplary arrangements, one or more water drain lines may be extended into an upper opening at the top of the standpipe 220. For example, in some arrangements the standpipe may be configured to receive an end of a relatively large drain hose or pipe therein compared to the size of the drain lines that connect directly to the body of the manifold fitting 218. Such a drain hose or pipe that discharges into the standpipe may be from the water discharge device that discharges water at a high flow rate.

Alternatively, in other arrangements, the body inlet of the manifold fitting 218 may be connected to an air admittance/check valve like those previously described or an air management/check valve of a type like that later described may be used. Such an air management/check valve may operate to allow air to flow into and out of the manifold fitting, while stopping any water discharge therefrom.

Figure 16:
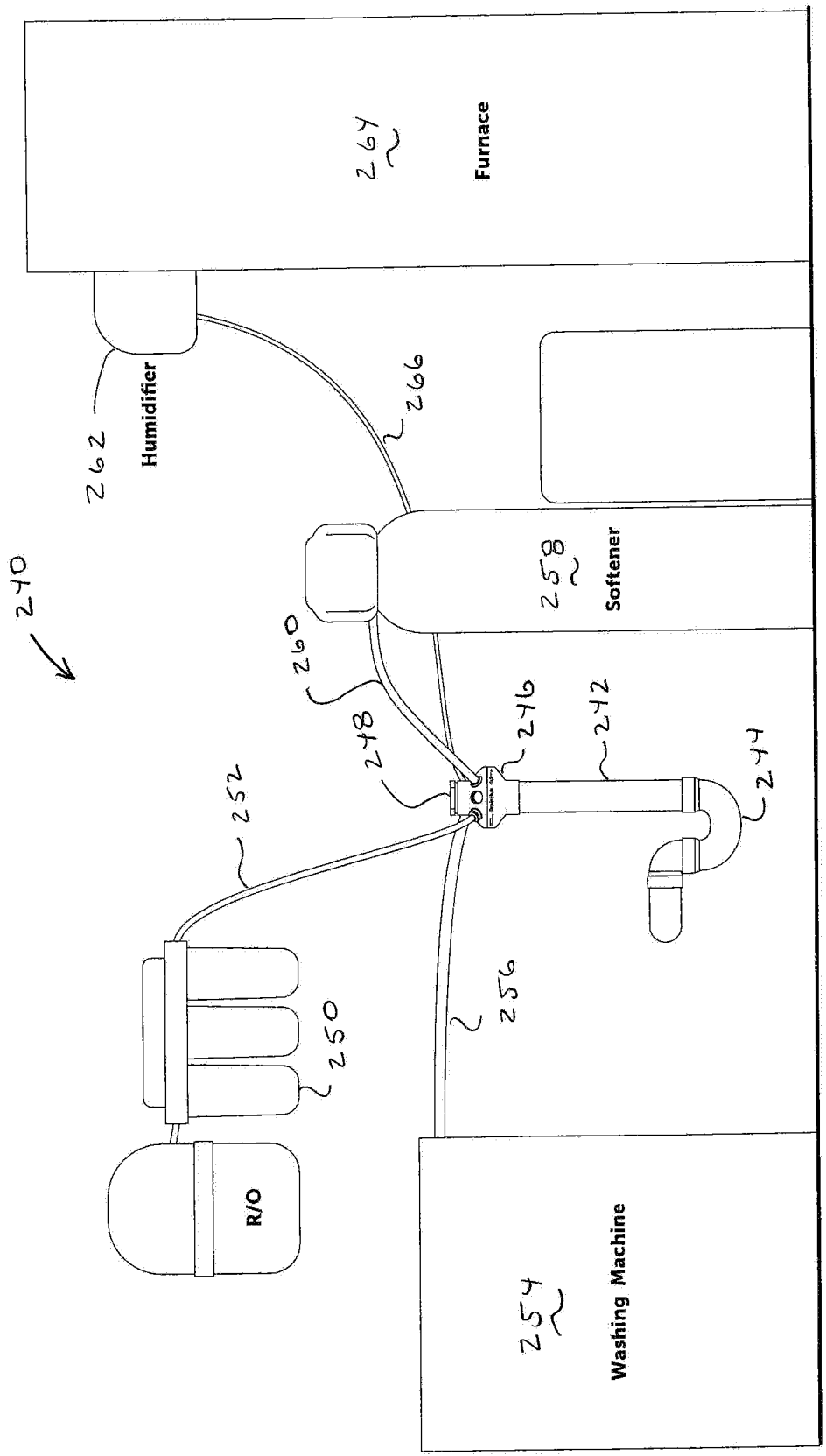
FIG. 16 is a schematic view of an alternative drain arrangement for a plurality of water discharge devices.

Further in other exemplary systems the upper opening of the manifold fitting may be closed by a solid plug. Such a configuration may be appropriate based on the properties and types of water discharge devices to which the manifold fitting is connected. Such a system 240 is schematically represented in FIG. 16. System 240 includes a drain line 242 which is connected to a trap 244 which is connected to a water drain. A manifold fitting 246 which includes a plurality of drain openings is connected to the drain line 242. The solid plug 248 is operative to close the fitting inlet coupling portion of the fitting 246.

As represented in FIG. 16, a plurality of water discharge devices are operative to drain water and liquid waste into the fitting 246. The exemplary water discharge devices represented in FIG. 16 include a filter 250 which has a drain line 252 that connects to one of the drain fitting openings of the fitting 246. A washing machine 254 which may be one of the types previously described is connected to one of the drain fitting openings 246 through a drain line 256.

A water treatment device 258 which in some arrangements may include a water softener or a water sterilizer, has a water drain line 260 which is connected to one of the drain openings of the fitting 246. A humidifier 262 which is associated with a heating device such as a furnace 264 has a drain line 266 which is in operative connection with a drain fitting opening of the fitting 246. Of course it should be understood that this configuration is merely exemplary of the use of the manifold plumbing fitting of an exemplary arrangement utilized for receiving drain water from a plurality of water discharge devices in which the nature of the devices do not require venting of the drain line through a separate conduit such as a stand pipe or an air admitting valve. Of course it should be understood that in other exemplary system configurations other types of water discharge devices may be utilized.

Figure 17:
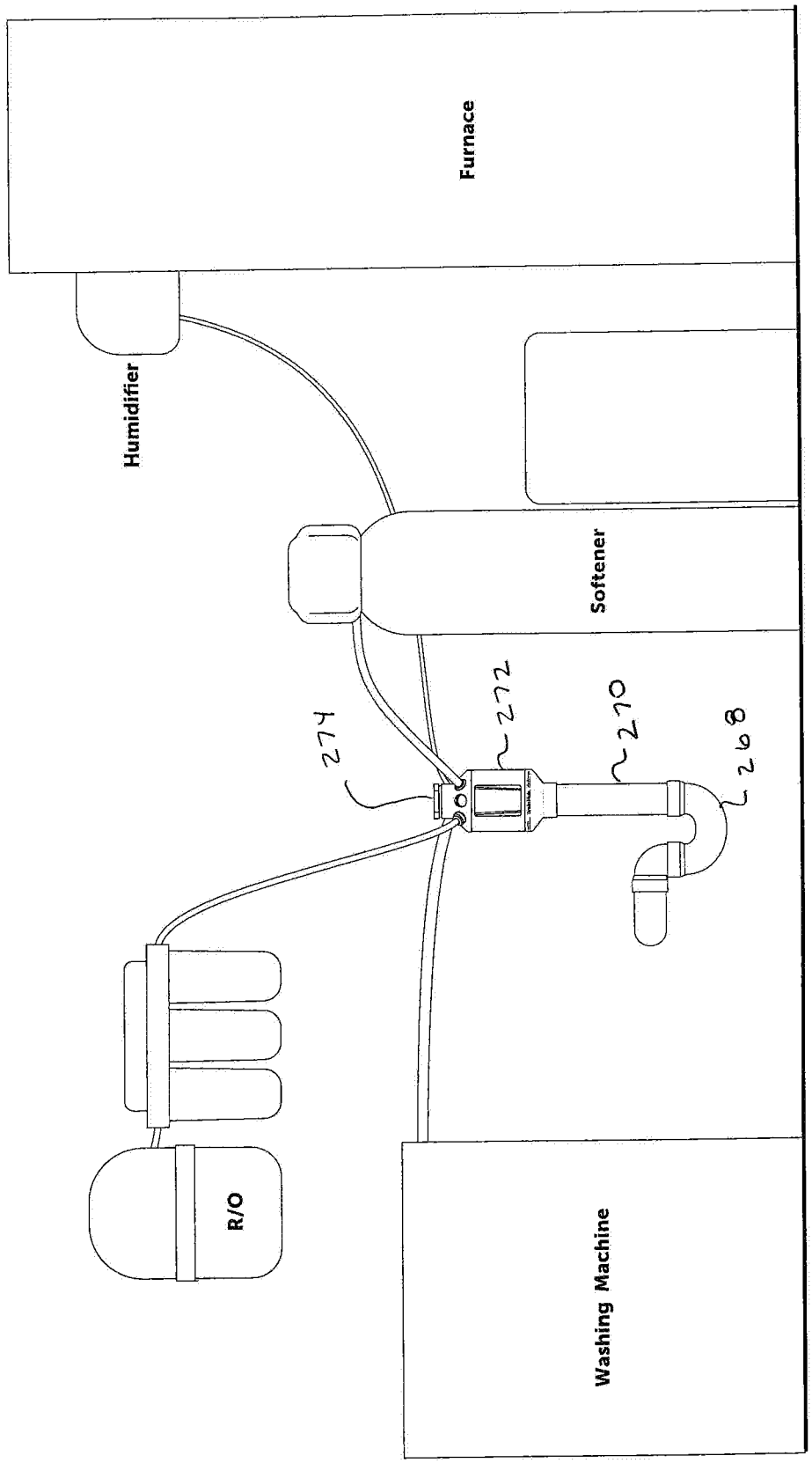
FIG. 17 is a schematic view of a further alternative drain arrangement including a manifold fitting that provides an air gap.

FIG. 17 shows schematically an alternative system configuration similar to that shown in FIG. 16 except as otherwise described. In the exemplary arrangement a water drain, including a trap 268, is connected to a drain line 270. The drain line 270 is connected to a manifold plumbing fitting including an air gap 272. The exemplary manifold fitting with an air gap is used in situations where there is a risk that if water backs up in the drain and rises in the drain line 270, contaminated water could reach the drain fitting openings on the fitting through which the plurality of drain lines from the water discharge devices are connected. In some arrangements, depending on the nature of the water discharge devices, the contaminated water if allowed to reach the level of the drain lines, could be pulled by suction into the devices resulting in contamination and other issues. The exemplary fitting 272 which includes an air gap prevents this problem by causing water which rises in the line 270 to be discharged through an opening in the body of the fitting. The water is discharged from the body of the fitting at a level that is lower than the level of the drain openings. As a result, the exemplary fitting 272 operates so that the water level never rises inside the body of the fitting to a level where it would reach the drain fitting openings at the top of the fitting and contaminate the water discharge devices by being drawn into the drain lines.

In the exemplary system shown in FIG. 17, the manifold fitting 272 has the fitting inlet portion closed by a plug 274. However, it should be understood that in other configurations the exemplary fitting with air gap 272 may be used in systems like those previously described which have the fitting inlet coupling portion connected to a line that runs from the drain of the sink or other water discharge device. In such systems the exemplary fitting and the air gap prevents water from backing up into a drain line of a sink or other device, and prevents any contamination of water discharge devices with water that backs up in the drain.

Figure 18:
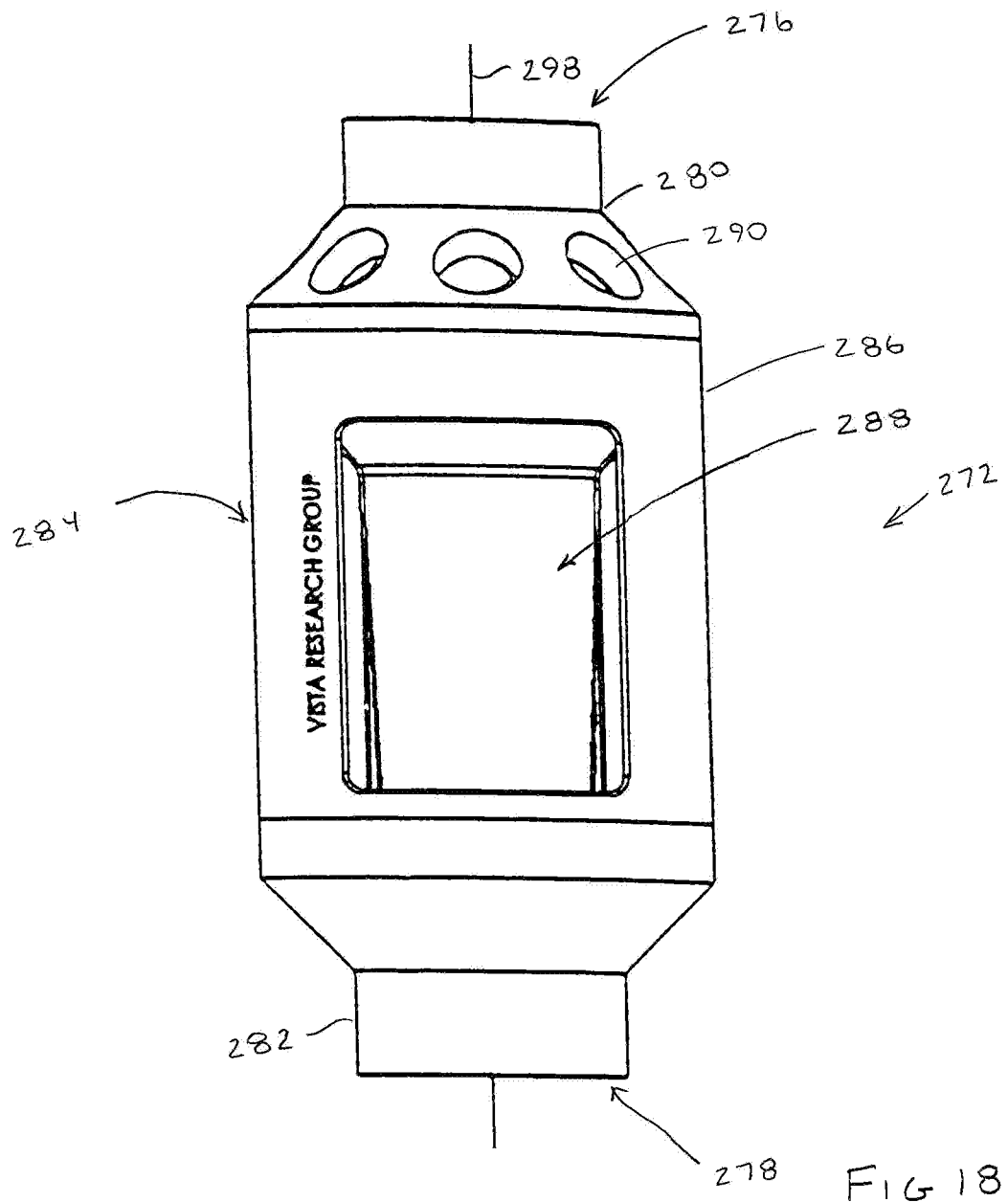
FIG. 18 is a front view of an exemplary manifold plumbing fitting including an air gap.

FIGS. 18-30 show the exemplary arrangement of the plumbing fitting 272 with the air gap feature. As shown in FIG. 18, the exemplary fitting 272 includes a fitting inlet coupling portion 276. The fitting inlet coupling portion 276 may be similar to the corresponding coupling inlet portions of the previously described fittings. Fitting 272 further includes a fitting outlet coupling portion 278. The outlet coupling portion 278 may be similar to the outlet coupling portions on the fittings previously described. In the exemplary arrangement, inlet coupling portion 276 may receive a line that is operative to drain water from a sink or other water discharge device and enable the water to pass into the interior area of fitting 272. Of course in alternative systems like those shown in FIG. 17, the inlet coupling portion 276 may be closed by a plug or similar item. Outlet coupling portion 278 is configured for connection to a line such as a drain line which carries away waste water from the interior of the fitting.

The exemplary fitting 272 includes an upper portion 280. Upper portion 280 includes the inlet coupling portion 376. Fitting 272 also includes a lower portion 282. Lower portion 282 includes the outlet coupling portion 278. Fitting 272 also includes a central portion 284. The central portion 284 of the exemplary arrangement is a generally cylindrical portion with a cylindrical outer wall 286. The cylindrical outer wall 286 includes an air gap opening 288 therein.

The upper portion includes a plurality of drain fitting openings 290. The drain fitting openings are configured in uniformly angularly spaced patterns in exemplary arrangements and may vary in number with different fitting arrangements. The drain fitting openings are configured to accept therein drain fittings such as those previously described that receive water from drain lines connected to water discharge devices. Alternatively in the exemplary arrangement the drain fitting openings may accept therein a plug or other suitable blocking device. As shown in FIGS. 20 and 21, the drain fitting openings are positioned radially outward beyond the body inlet 292 which is connected to the inlet coupling portion 276. As in the previously described arrangements, the drain fitting openings extend in a tapered annular outer wall 294. A further annular tapered wall 296 extends on the inside of the fitting from the body inlet opening 292. The further annular tapered wall 296 is similar in configuration to that described in the prior arrangements and extends further radially outward with movement downwardly as shown along a central axis 298 of the fitting. As shown in FIGS. 19-21, in the exemplary arrangement the upper portion includes an annular lip projection 300. The lip projection 300 is configured to extend in an annular recess within the central body portion 286 when the fitting 272 is assembled.

As shown in FIGS. 22 and 23, the lower portion 282 includes a body outlet 302 which connects the interior area of the fitting and the outlet coupling portion 278. An annular tapered wall portion bounds an outer end portion of the interior area of the coupling 272 within the lower fitting portion 282. The annular tapered wall portion is tapered so as to be in closer proximity to the body outlet 302 with movement in an axial direction downwardly toward the body outlet. The annular tapered wall portion 304 facilitates the draining the water from the outlet end portion of the interior area within the lower portion 282.

In an exemplary arrangement, the lower portion 282 includes an annular recess 306. The annular recess 306 is configured to receive a corresponding annular projection 308 on the central body portion. In the construction of some exemplary arrangements, the annular recess 306 may be configured so as to also be engageable in mating arrangement with the annular lip projection 300 on the upper body portion 280. This enables some exemplary arrangements to be produced without an air gap by directly mating the upper and lower body portions 280 and 282, and to utilize the same components for purposes of providing a manifold plumbing fitting with an air gap by including a central portion between the upper and lower portions. Such fitting components may be held together in exemplary arrangements through suitable adhesives, ultrasonic welding, fasteners or other methods so as to produce the desired configuration. Of course it should be understood that these components and configurations are exemplary and in other arrangements other approaches may be used.

As shown in FIGS. 24-27, the interior area of the central body portion includes structures that are operative to direct water that enters the body inlet 292 and the plurality of drain fitting openings 290 through the interior of the fitting and out the body outlet 302. The exemplary construction enables a flow of water through the interior area while minimizing the risk that the draining water will splash out of the air gap opening 288. Further the exemplary structures operate to cause any water that would back up into the fitting from the drain line and into the interior area through the body outlet 302, to drain out of the body interior area through the air gap opening 288. The draining of the water that backs up maintains the water level within the interior area of the fitting, below a level at which the dirty water which is backing up into the fitting could be siphoned into either the drain openings 290 or the body inlet opening 292.

In an exemplary arrangement, an inlet end portion 310 of the interior area of the fitting is bounded by an annularly tapered funnel surface 312. The annularly tapered funnel surface extends to a central funnel opening 314. The annularly tapered funnel surface is configured as shown to extend closer to the central axis 298 with movement downwardly along the axis away from the body inlet and toward the body outlet. The annularly tapered funnel surface also extends radially outward relative to the body inlet 292 so as to extend in vertically aligned relation with the drain fitting openings 290. The exemplary central funnel opening 314 extends in generally axially aligned relation with the body inlet so as to facilitate relatively high water flows into the interior area of the plumbing fitting and to direct such flows through the central funnel opening.

In the exemplary arrangement, a generally annular spout portion 316 extends from the funnel opening. The spout 316 extends within the body in the axial direction toward the body outlet 302. The spout 316 includes a generally annular spout wall 318 that tapers somewhat inwardly with axial movement toward the body outlet 302. The spout wall 318 which interiorly underlies the air gap opening 288 serves as a shield. This portion of the spout wall which serves as a shield extends radially between the air gap opening in the cylindrical outer wall 286 of the central portion 284 and the central funnel opening 314. Further, the spout wall portion 218 in generally facing relation with the air gap opening also serves as a shield that extends below the air gap opening and in conjunction with the surface which bounds the exterior of the tapered funnel surface, provides a shield above the air gap opening within the fitting interior area. Thus the shield configuration of the exemplary arrangement reduces the risk of any of the water passing through the interior of the spout toward the outlet opening, splashing out of the fitting through the air gap opening.

Figure 24:
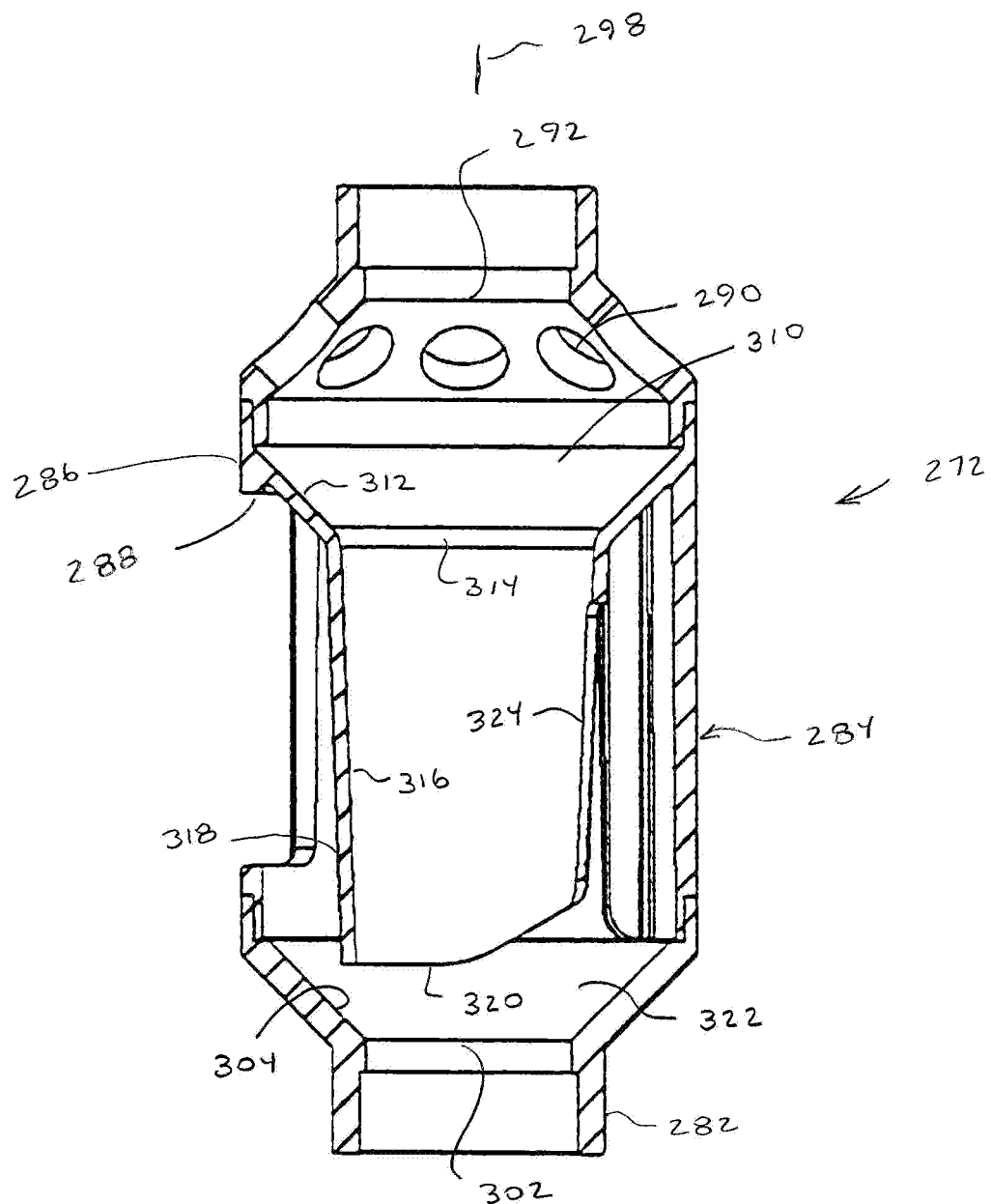
FIG. 24 is a cross-sectional view of the exemplary plumbing fitting of FIG. 18.
Figure 25:
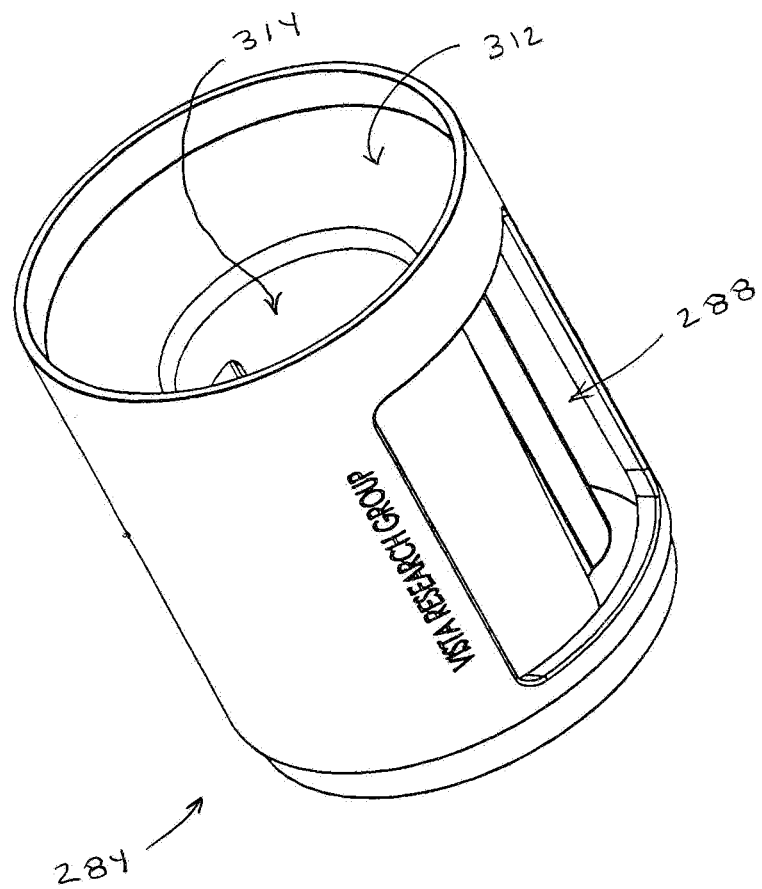
FIG. 25 is a perspective view of the central portion of the manifold plumbing fitting of FIG. 18.
Figure 26:
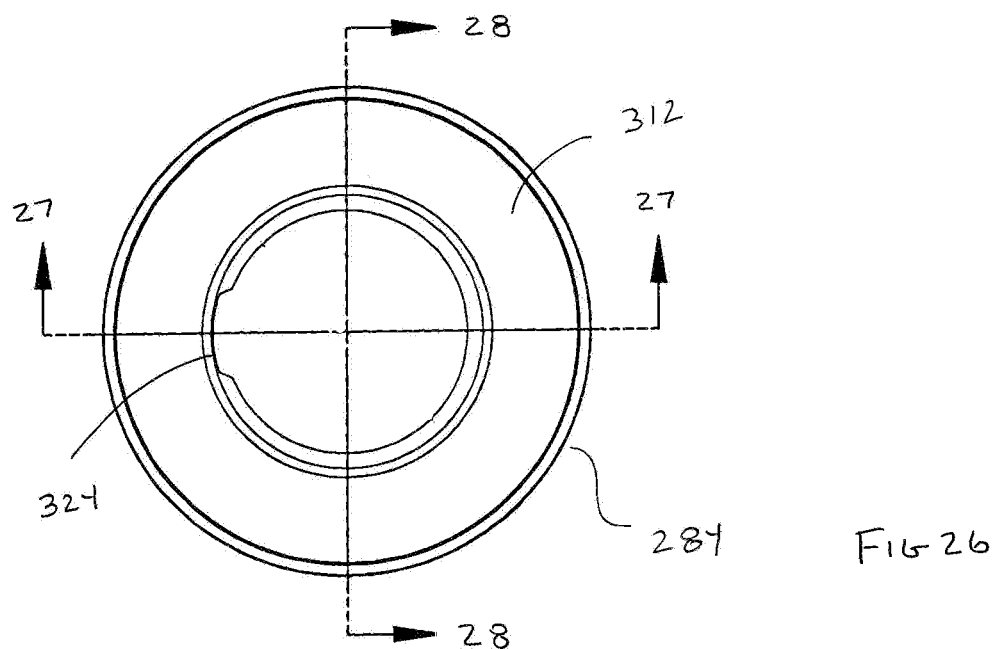
FIG. 26 is a top plan view of the central portion of the plumbing fitting.
Figure 27:
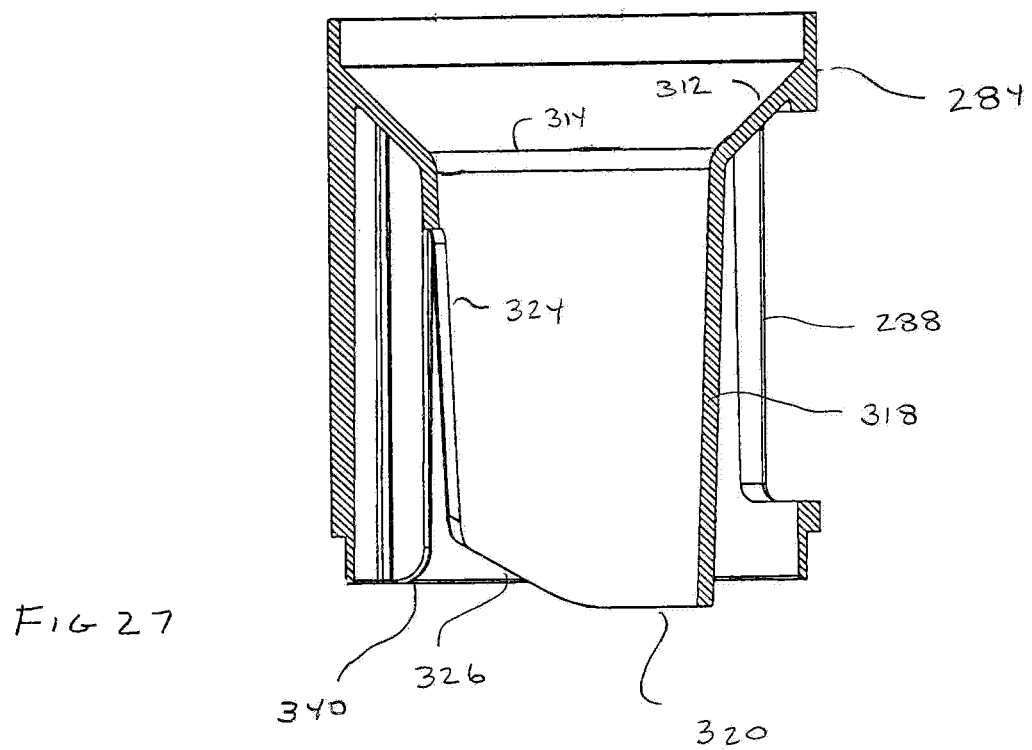
FIG. 27 is a cross-sectional view of the central portion taken along line 27-27 in FIG. 26.
Figure 28:
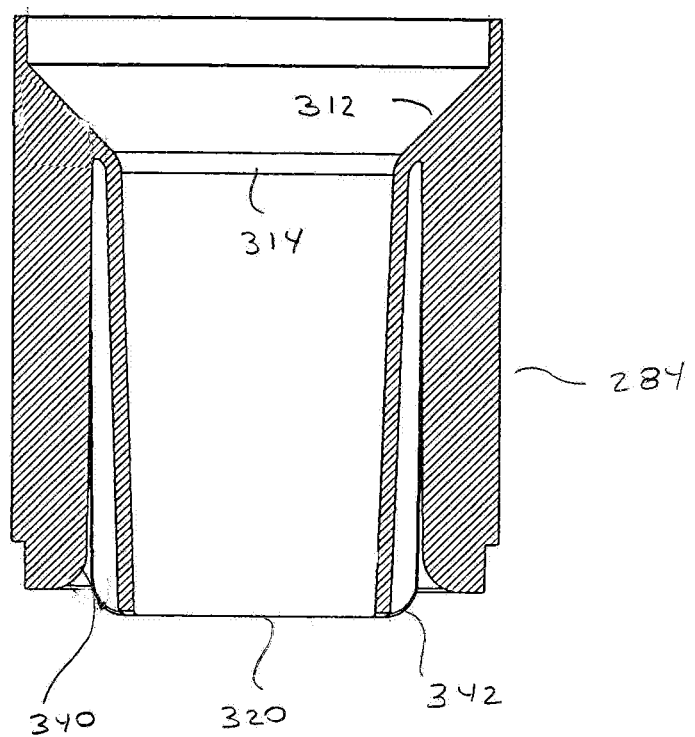
FIG. 28 is a cross-sectional view of the central portion taken along line 28-28 in FIG. 26.
Figure 29:
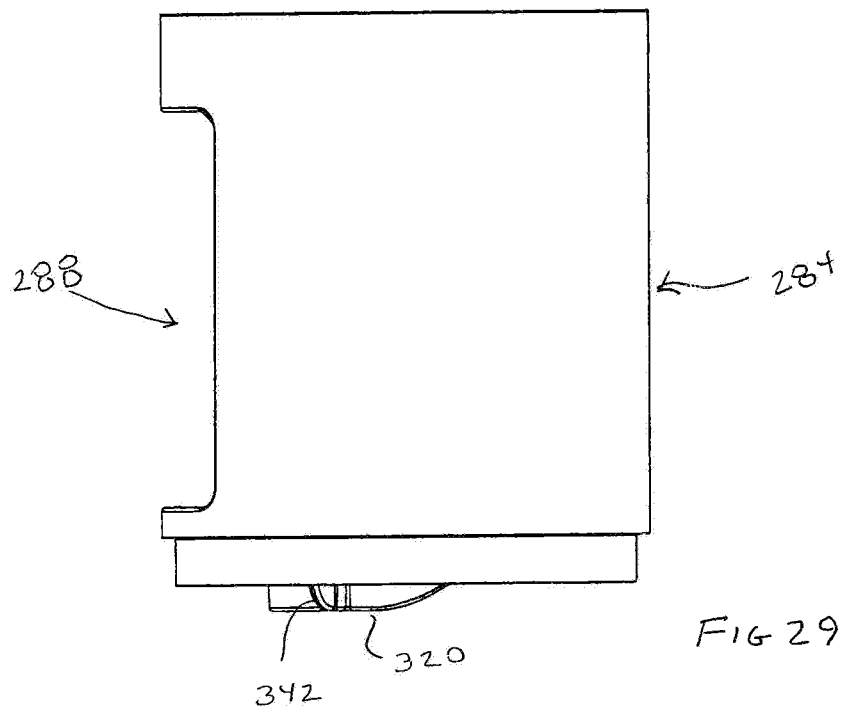
FIG. 29 is a side view of the central portion of the manifold plumbing fitting shown in FIG. 18.

The spout 216 of the exemplary arrangement terminates at its lower end in a discharge opening 320. The discharge opening generally overlies the body outlet opening 302 and is generally aligned therewith. As shown in FIG. 24, the discharge opening 320 of the exemplary arrangement and the spout wall 318 which serves as a shield, extend outwardly from the central body portion and into an outlet end portion of the interior area 322 which is bounded by the tapered wall portion 304 of the lower portion 282.

In an exemplary arrangement, the spout wall 318 includes at least one spout outlet 324. In the exemplary arrangement, the spout outlet comprises an opening that is angularly disposed on the opposite side of the spout from the shield that faces the air gap opening 288. The spout outlet 324 enables water that has passed through the central funnel opening 314 to flow outwardly from the spout through the spout outlet as well as from the discharge opening 320 at the lower end of the spout.

In the exemplary arrangement, the spout outlet 324 includes an elongated slot through the spout wall 318. The elongated slot of the exemplary arrangement extends from the discharge opening 320 on a side of the spout wall that is opposite the air gap opening. In the exemplary arrangement, the spout wall includes an axially angled tapered portion 326 that enables the side of the spout that is angularly disposed from the air gap to be open continuously between the discharge opening 320 and the top of the slot 324 which in the exemplary arrangement is disposed in the spout in close proximity to the central funnel opening 314.

In the exemplary arrangement, the configuration of the spout outlet in the form of an elongated slot that extends in the axial direction from the discharge opening helps to facilitate the flow of water downwardly through the spout 316. The opening in the wall bounding the spout on an opposed side of the air gap opening helps to discharge the water in a way that reduces the risk of splashing out of the air gap opening and facilitates flow downwardly across the annularly tapered wall portion 304 which bounds the outlet end portion 322 and directs the water into the body outlet 302. Further in exemplary arrangements the elongated slot configuration of the spout outlet 324 maintains the body inlet 292 in contact with air in the event that water backs up and rises upwardly into the interior area of the fitting.

As can be appreciated from the exemplary configuration shown in FIG. 24, if water backing up into the fitting rises above the level of the discharge opening 320 of the spout 316, the water upon rising to a slightly higher level will flow out of the air gap 388. The air gap in the exemplary arrangement is configured to enable the discharge of a high flow of water out of the interior area of the fitting. Even when the water level within the fitting has reached above the lower end of the air gap 288, the upper portion of the elongated slot 324 remains open to atmosphere. As a result, the inlet end portion 310 of the interior wall of the fitting remains open to air and the dirty water backing up into the fitting cannot be drawn by suction into any of the body inlet or drain fitting openings. This exemplary arrangement further helps to assure that the air gap is operative to maintain the inlet end portion 310 of the interior area of the manifold fitting isolated from any contaminated drain water that may back up into the fitting.

Figure 30:
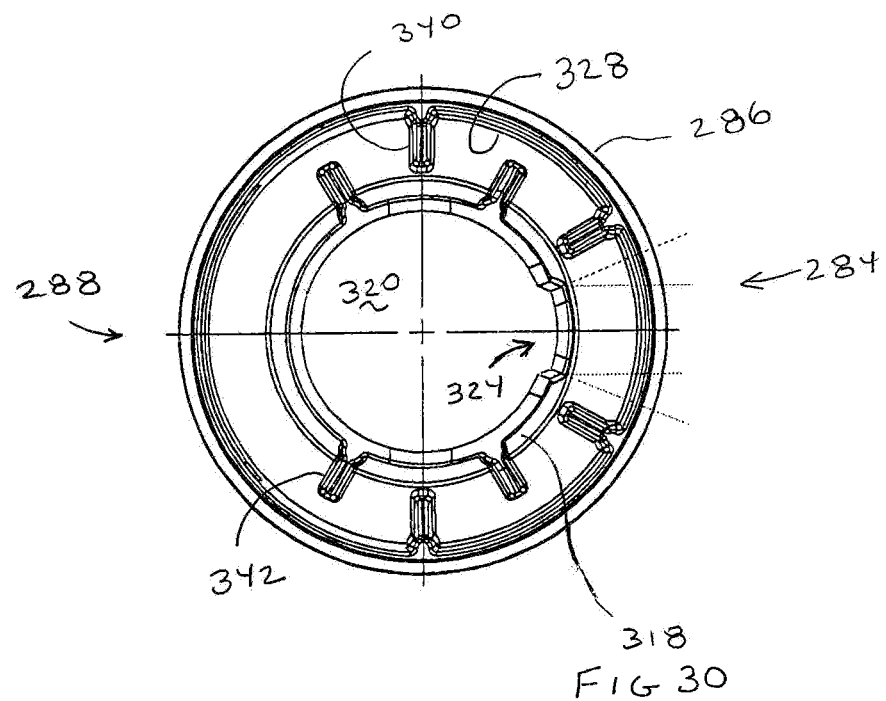
FIG. 30 is a bottom view of the central portion shown in FIG. 29.
Figure 31:
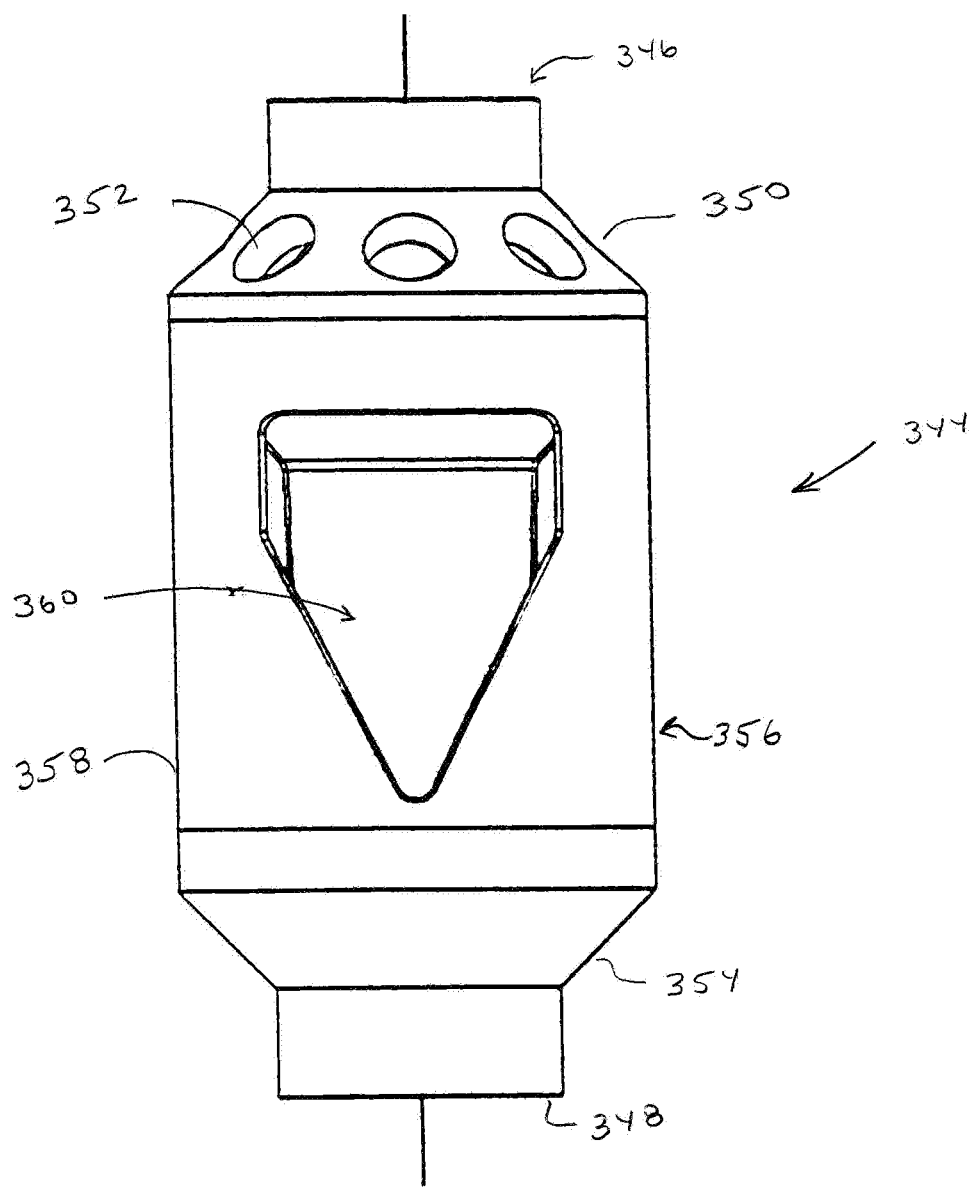
FIG. 31 is a front view of an alternative manifold plumbing fitting including an air gap.
Figure 32:
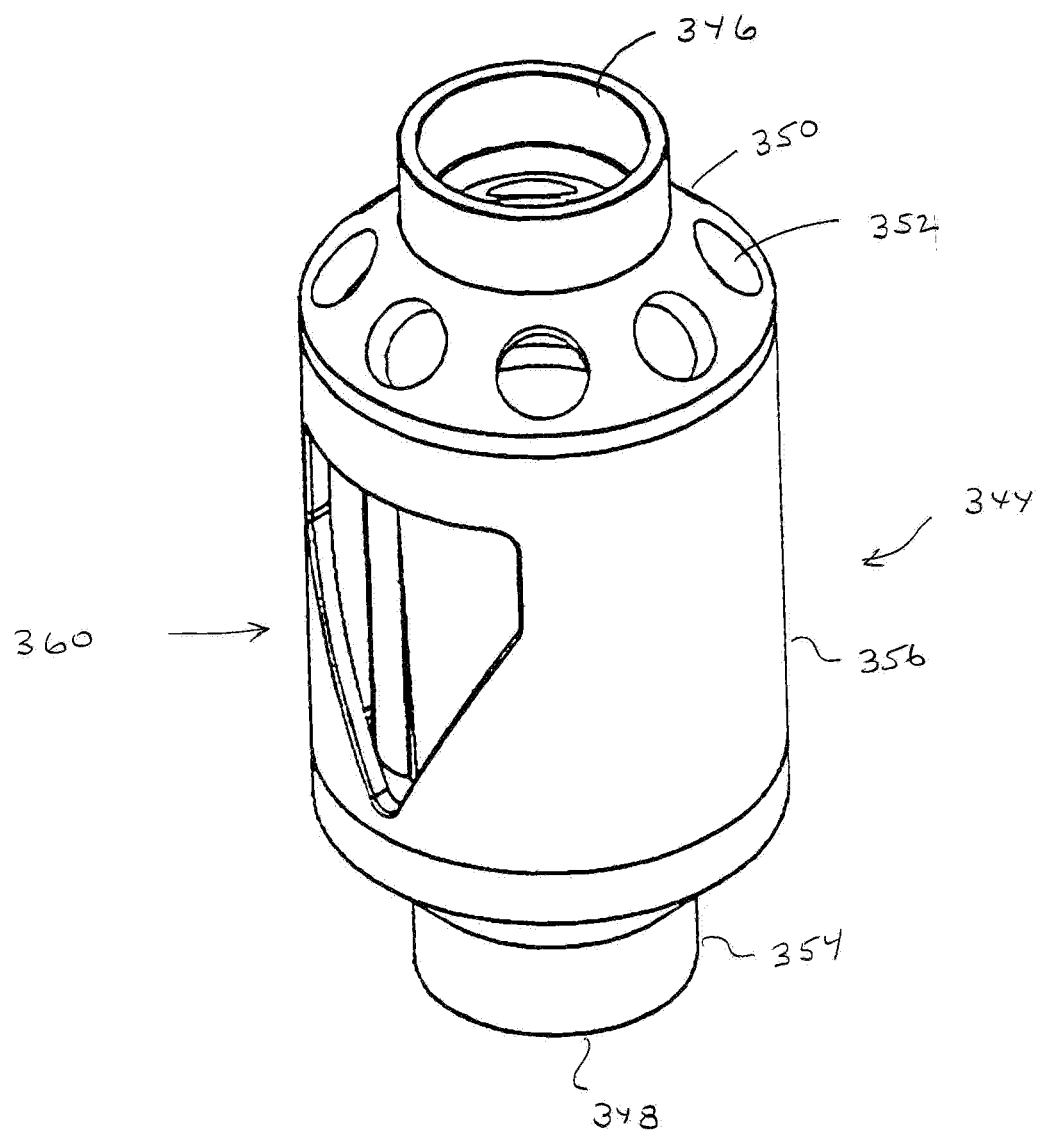
FIG. 32 is a perspective view of the manifold plumbing fitting shown in FIG. 31.
Figure 33:
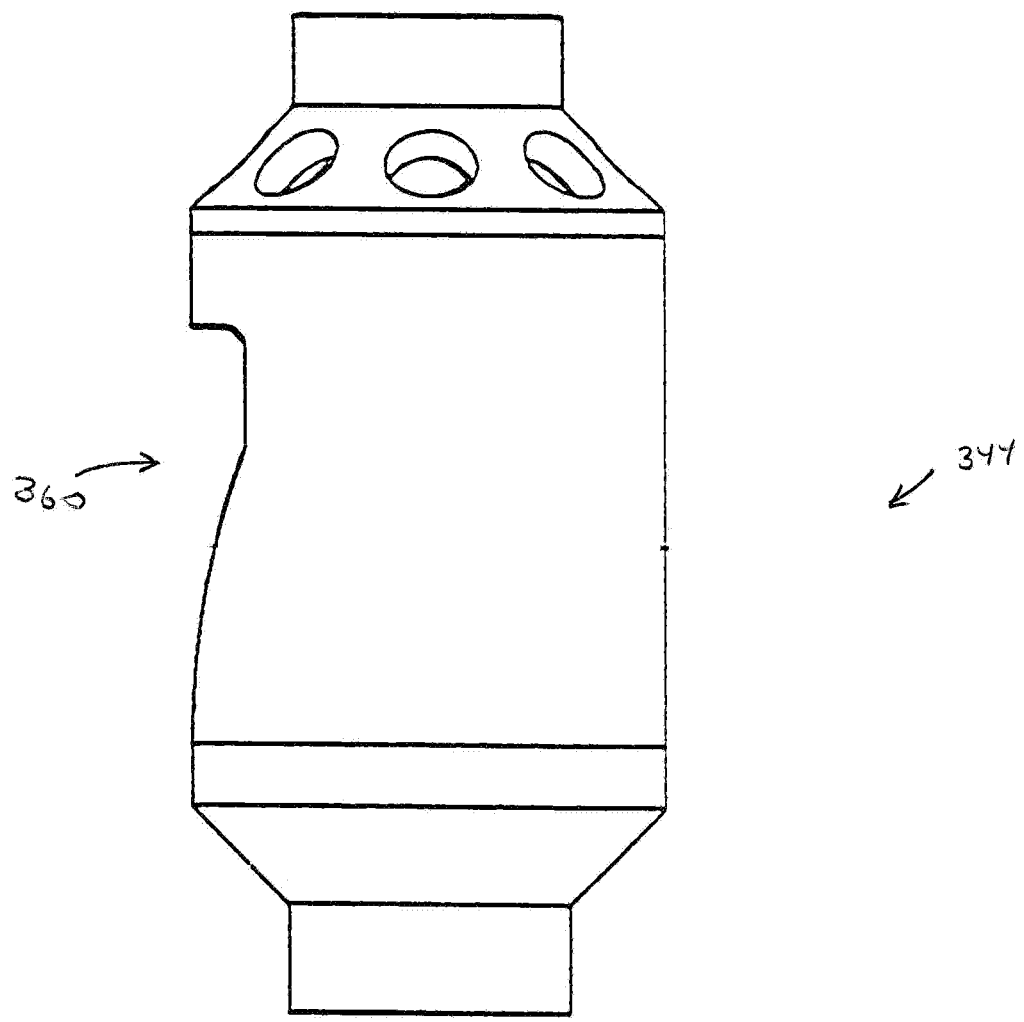
FIG. 33 is a side view of the manifold plumbing fitting shown in FIG. 31.

Further as shown in detail in FIG. 30, which shows a bottom view of the central portion 284, the interior area of the fitting that extends between a cylindrical inner wall 328 on the inside of the central portion 284 and the outer surface of the spout wall 318, includes at least one axially elongated fin. In the exemplary arrangement shown, a plurality of inwardly directed fins 340 extend generally radially inwardly from the cylindrical inner wall 328. A plurality of outwardly radially directed fins 342 extend outwardly from the outer surface of the spout wall 318. In the exemplary arrangement the inward fins 340 and the outward fins 342 are angularly spaced from one another. In the exemplary arrangement at least some of the fins 340, 342 extend in an axial direction both above and below the air gap opening 288 in an operative position of the fitting.

As shown in FIG. 30 in the exemplary arrangement, the elongated fins are angularly disposed on both angular sides of the air gap opening 288. Similarly elongated fins are angularly disposed on opposed angular sides of the elongated slot 284. In addition, radially extending fins are disposed intermediate of the fins most closely adjacent to the air gap opening 288 on the elongated slot 324. As can be appreciated, these radially extending fins serve to direct water which may splash out of the elongated opening 324 or splash upwardly upon exiting the discharge opening 320, into alignment with the fins so as to direct a flow axially within the interior area of the fitting facilitating water moving downwardly into the body outlet 302. Thus in an exemplary arrangement, the fins 340, 342 further help to reduce the instances in which water flowing through the fitting downwardly from the inward end portion 310 is splashed outwardly through the air gap opening 288. Of course it should be appreciated that these structures for reducing the risk of splash are exemplary and in other arrangements other structures or materials may be positioned within the interior are of the fitting so as to reduce the risk that water will splash out of the fitting through the air gap opening.

FIGS. 31-36 show an alternative arrangement of manifold plumbing fitting with an air gap feature 344. Fitting 344 is generally similar to fitting 272 previously described except as otherwise specified.

Like manifold fitting 272, fitting 344 includes an inlet coupling portion 346 and an outlet coupling portion 348. Fitting 344 includes an upper portion 350 with a plurality of angularly spaced drain fitting openings 352 therein. Fitting 344 further includes a lower portion 354. Upper portion 350 and lower portion 354 of the exemplary arrangement are configured in a manner similar to upper portion 280 and lower portion 282 of the previous arrangement.

Fitting 344 includes a central portion 356. Central portion 356 includes a cylindrical outer wall 358. Cylindrical outer wall 358 has an air gap opening 360 therethrough. Air gap opening 360 is configured to place the interior area of the body of the manifold fitting in fluid communication with atmosphere.

Figure 34:
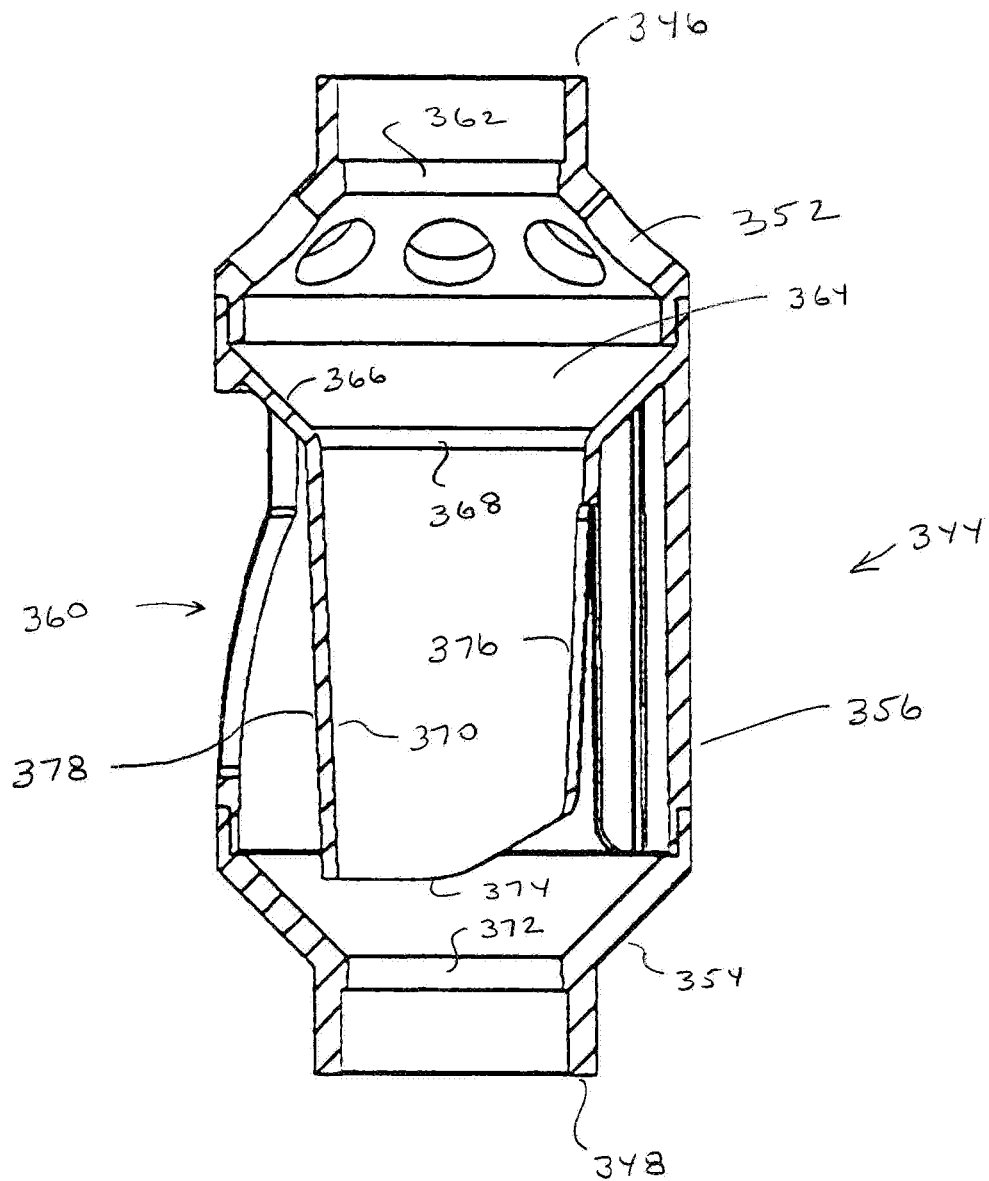
FIG. 34 is a cross-sectional view of the plumbing fitting shown in FIG. 33.
Figure 35:
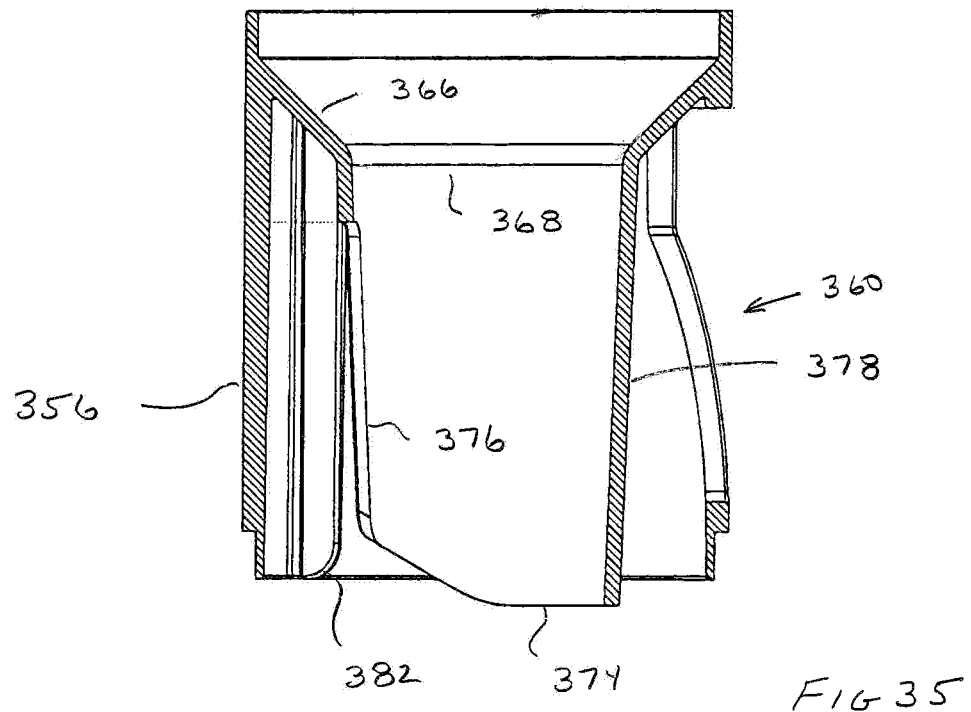
FIG. 35 is a cross-sectional view of the central portion of the plumbing fitting shown in FIG. 31.
Figure 36:
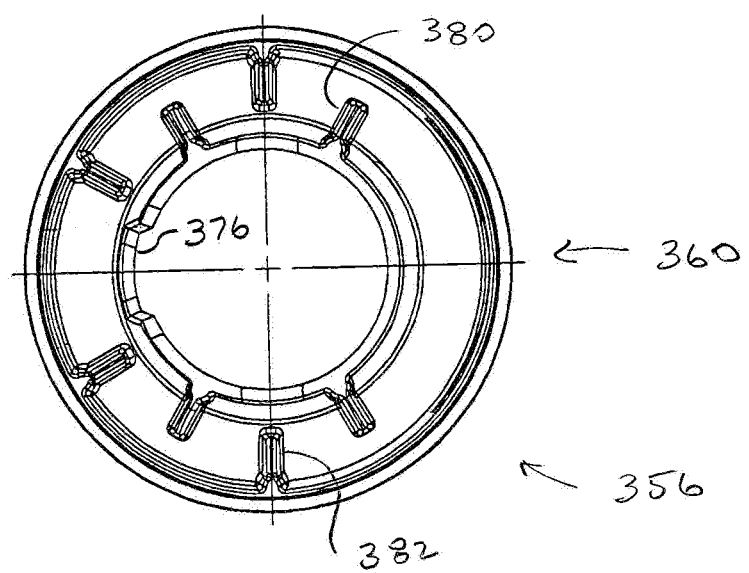
FIG. 36 is a bottom view of the central portion of the plumbing fitting shown in FIG. 35.
Figure 37:
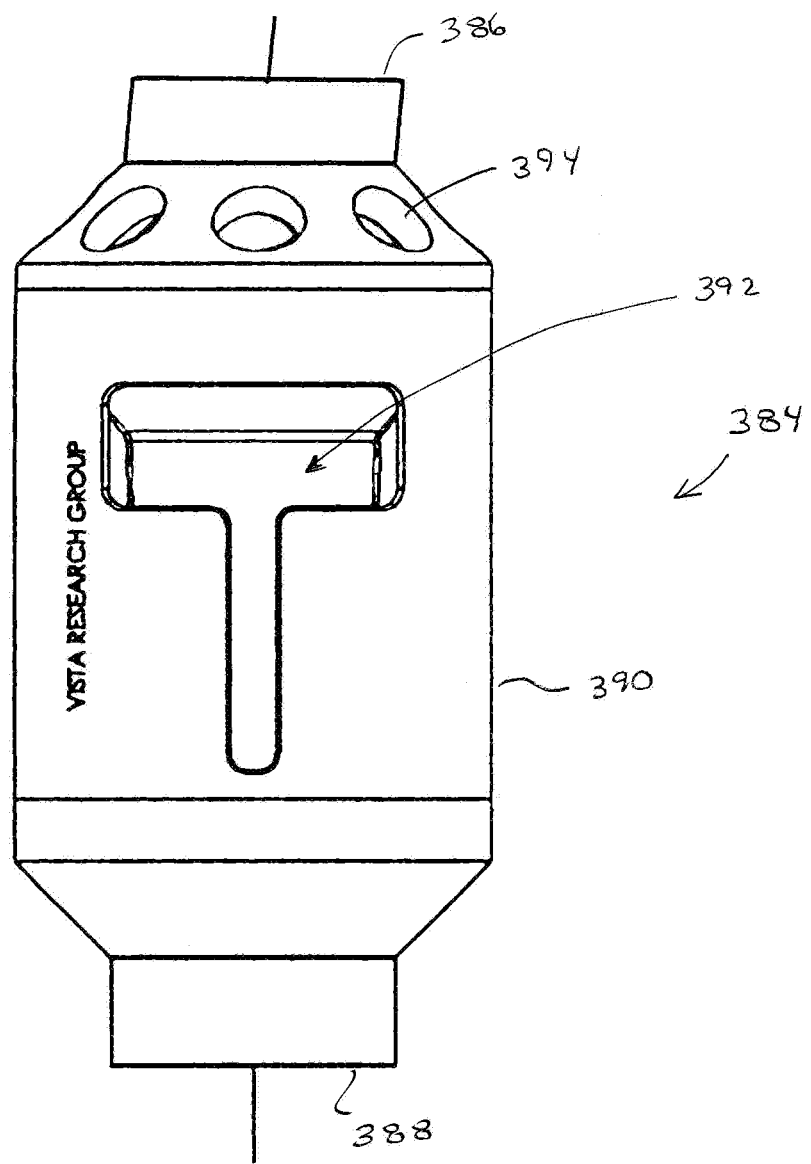
FIG. 37 is a front view of a further alternative manifold plumbing fitting including an air gap.
Figure 38:
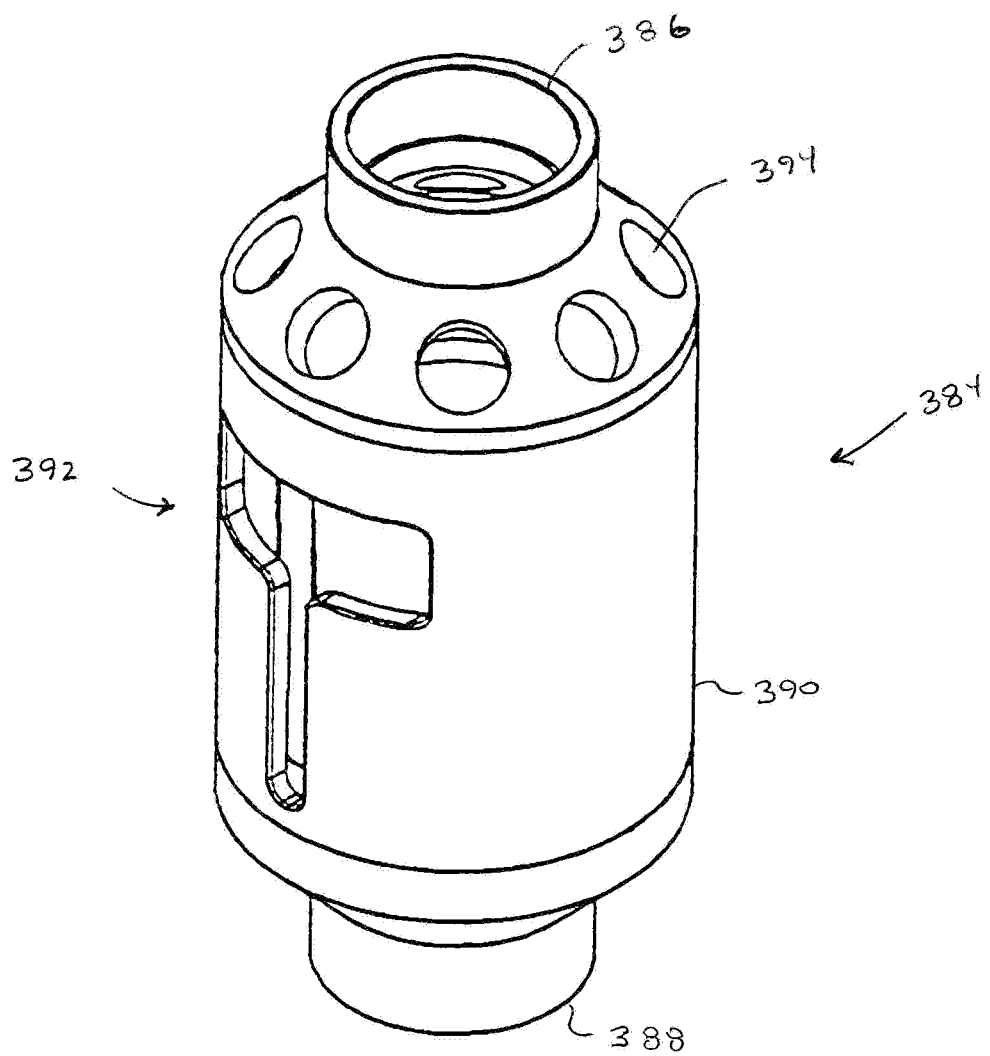
FIG. 38 is a perspective view of the fitting shown in FIG. 37.
Figure 39:
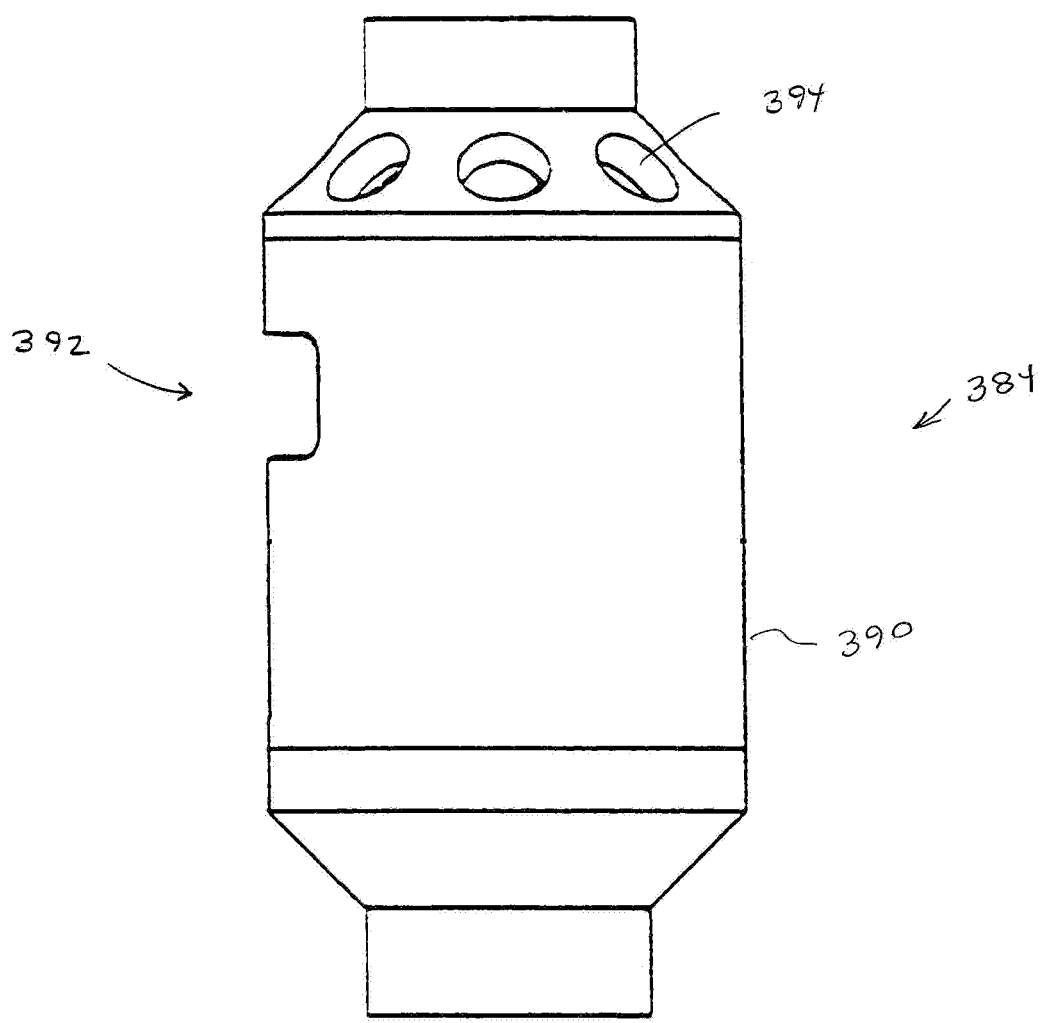
FIG. 39 is a side view of the plumbing fitting shown in FIG. 37.

As shown in FIGS. 34-36, fitting 344 includes interior structures that are operative to reduce the risk of water flowing through the fitting splashing out of the fitting through the air gap opening, and preventing water that backs up into the fitting through the outlet coupling portion 348 from reaching the body inlet 362 or the drain fitting openings 352.

As with the prior arrangement, fitting 344 includes a central portion that bounds an inlet end portion 364 of the interior area with an annular tapered funnel surface 366. The funnel surface extends inwardly and downwardly to a central funnel opening 368. A spout 370 extends from the central funnel opening toward a body outlet 372.

As in the case of the previously described arrangement, the spout terminates axially downward in a discharge opening 374. A spout outlet in the form of an elongated slot 376 extends axially from the discharge opening 374 to a slot end which is adjacent to the central funnel opening 368. The elongated slot extends through the spout wall on a side opposed of the air gap opening 360.

As in the case of the prior arrangement, the outside spout wall 378 on the side of the spout underlying the air gap opening serves as a shield. The shield comprises the outer spout wall and the wall underlying the annular tapered funnel surface 366. As the shield extends both above and below the air gap opening, the shield helps to prevent draining water from splashing from the inside of the fitting outwardly through the air gap opening.

Fitting 344 also includes radially outward directed fins 380 that extend outwardly from the surface 378 on both angular sides of the slot. Radially inwardly directed fins 382 extend inwardly from an inner wall of the central portion. As in the prior arrangement, the outwardly and inwardly directed fins are angularly disposed from one another and at least some of the fins extend axially to above and below the air gap opening so as to reduce the risk of draining water splashing out of the air gap opening. Also as in the previously described arrangement, at least two of the fins extend on opposed angular sides of the elongated spout outlet 376 as well as on angularly opposed sides of the air gap opening 360.

In the exemplary arrangement, the air gap opening 360 has a generally V-shape and is configured to be wider in the area closest to the upper portion of the fitting. In the exemplary arrangement, this configuration provides for a greater surface area of the opening at a higher level within the interior area of the fitting. As a result, in this exemplary arrangement the more that water backs up into the interior area, the larger the area of the opening through which the water which is backing up can escape. Thus the water can flow out of the fitting at a faster rate if the water backing up rises to a higher level within the fitting. In exemplary arrangements, this configuration further helps to avoid the risk that any contaminated drain water will reach the body inlet or the drain fitting openings and be syphoned into them to contaminate any of the water discharge devices connected thereto.

FIGS. 37-42 show yet a further alternative arrangement of a manifold fitting with an air gap feature generally indicated 384. Fitting 384 is generally similar to fitting 344 and fitting 272 except as otherwise described.

Fitting 384 includes a body with an upper portion including a fitting inlet coupling portion 386 and a lower portion with a fitting outlet coupling portion 388. Fitting 384 further includes a central portion 390. Central portion 390 includes an air gap opening 392. Air gap opening 392 has a generally T-shaped configuration.

Figure 40:
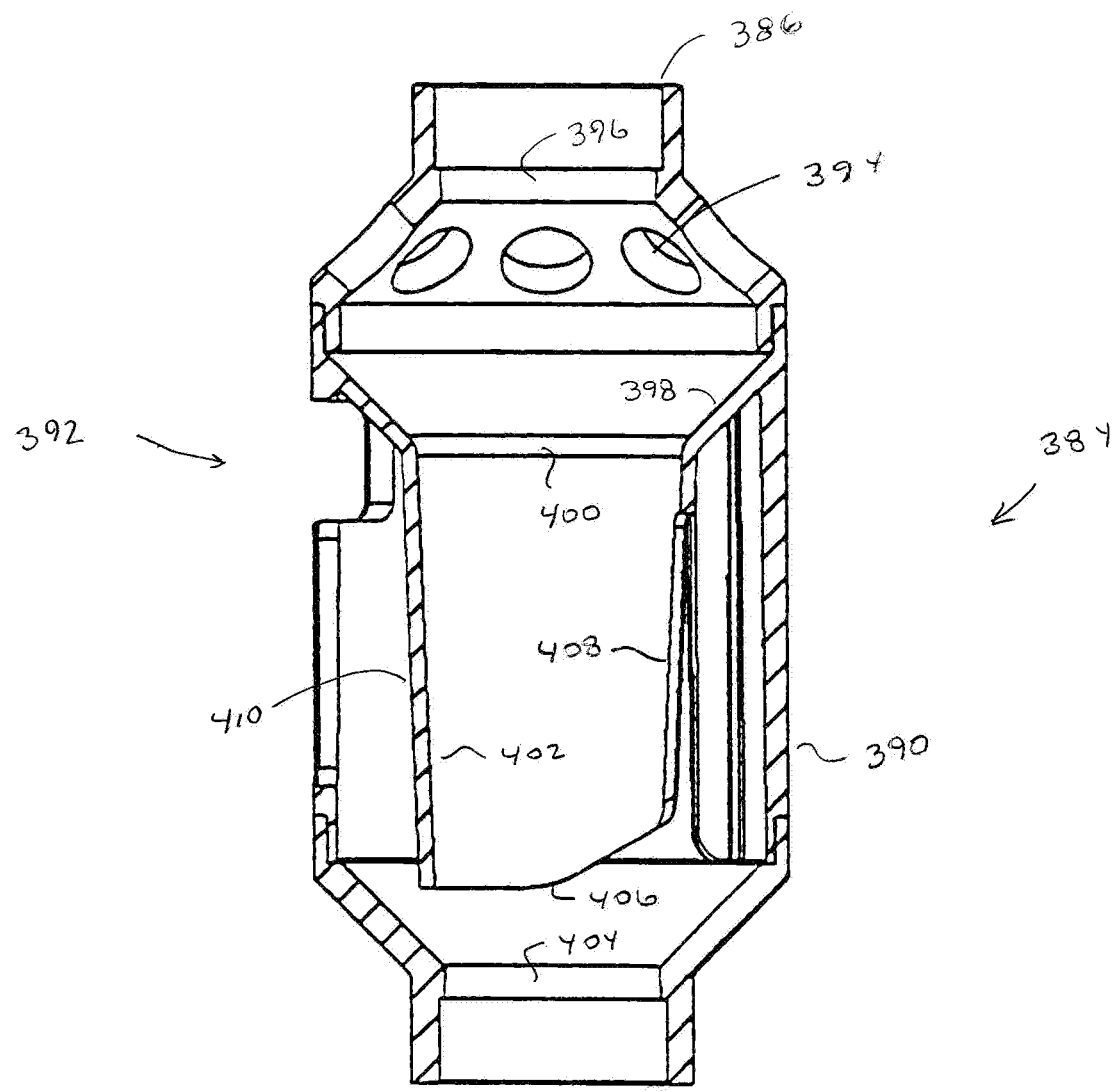
FIG. 40 is a cross-sectional view of the plumbing fitting shown in FIG. 39.
Figure 41:
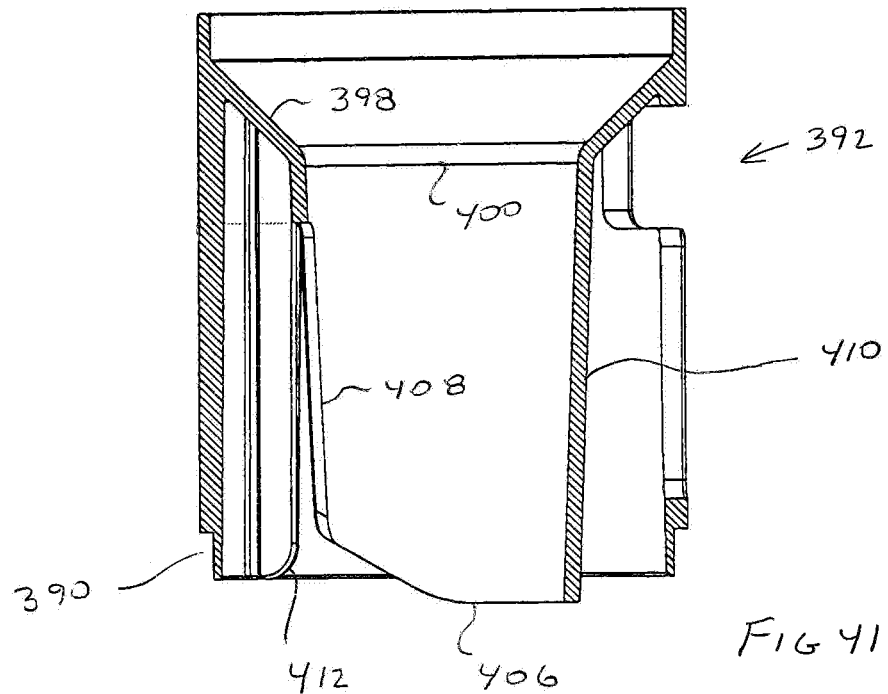
FIG. 41 is a cross-sectional view of the central portion of the plumbing fitting shown in FIG. 37.

As shown in FIG. 40, the manifold air gap fitting 384 includes internal structures similar to those described in connection with fittings 272 and 344. Such features include a plurality of drain fitting openings 394 and a body inlet 396. An annular tapered funnel surface 398 tapers downwardly to a central funnel opening 400. A spout 402 extends from the central funnel opening toward a body outlet 404. The spout has a discharge opening 406 at a lower end thereof that extends continuously to a spout outlet in the form of an elongated slot 408. The outer surface of the spout 402 and the surface underlying the tapered funnel surface form a shield 410 that radially inwardly underlies the air gap opening 392. The shield 410 of the exemplary arrangement extends within the fitting interior area in an axial direction both above and below the air gap opening.

Figure 42:
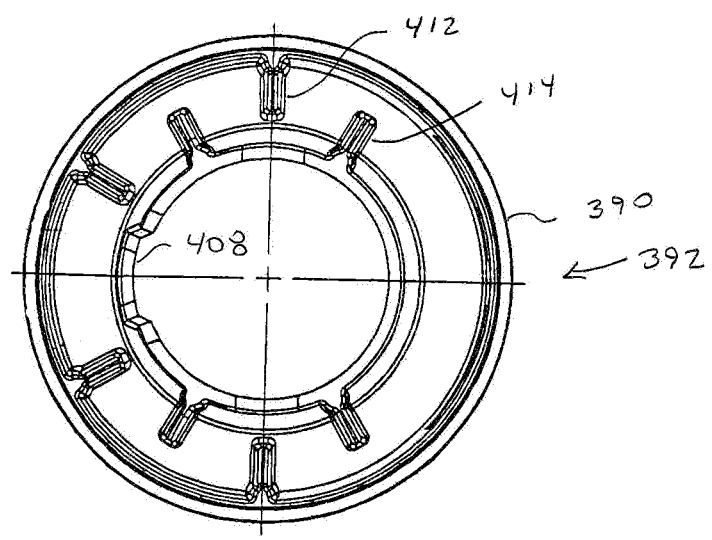
FIG. 42 is a bottom view of the central portion shown in FIG. 41.
Figure 43:
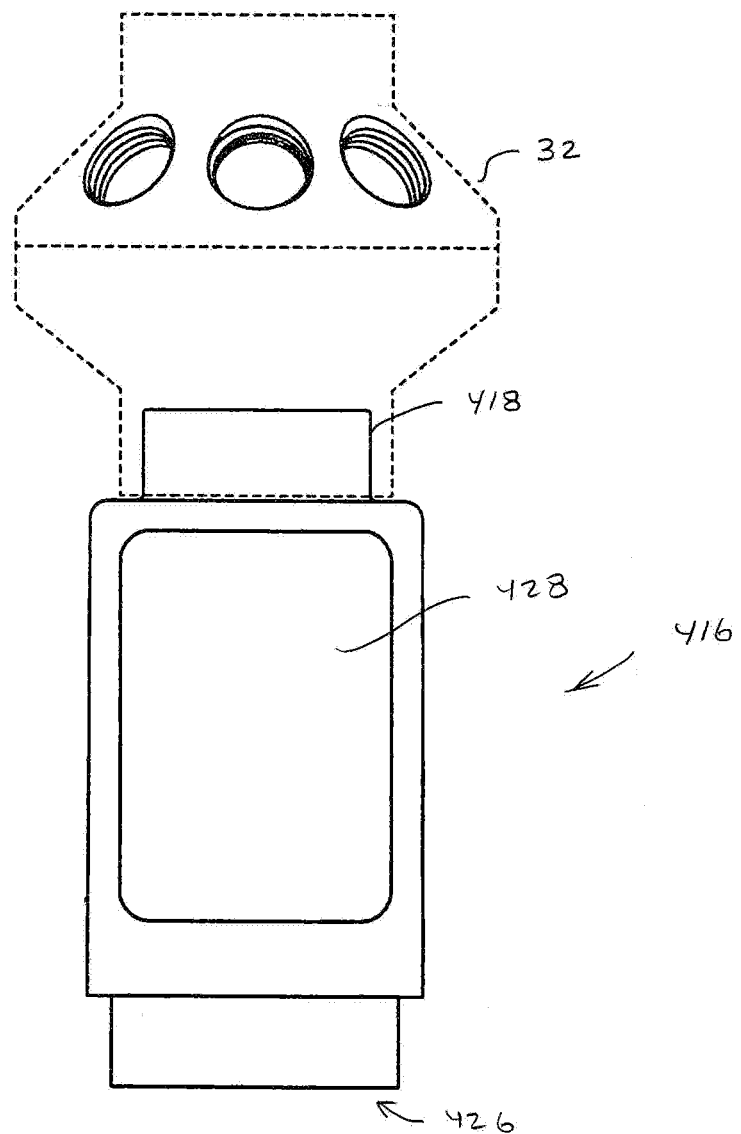
FIG. 43 is a front view of an exemplary air gap fitting with a manifold fitting shown attached thereto in phantom.
Figure 44:
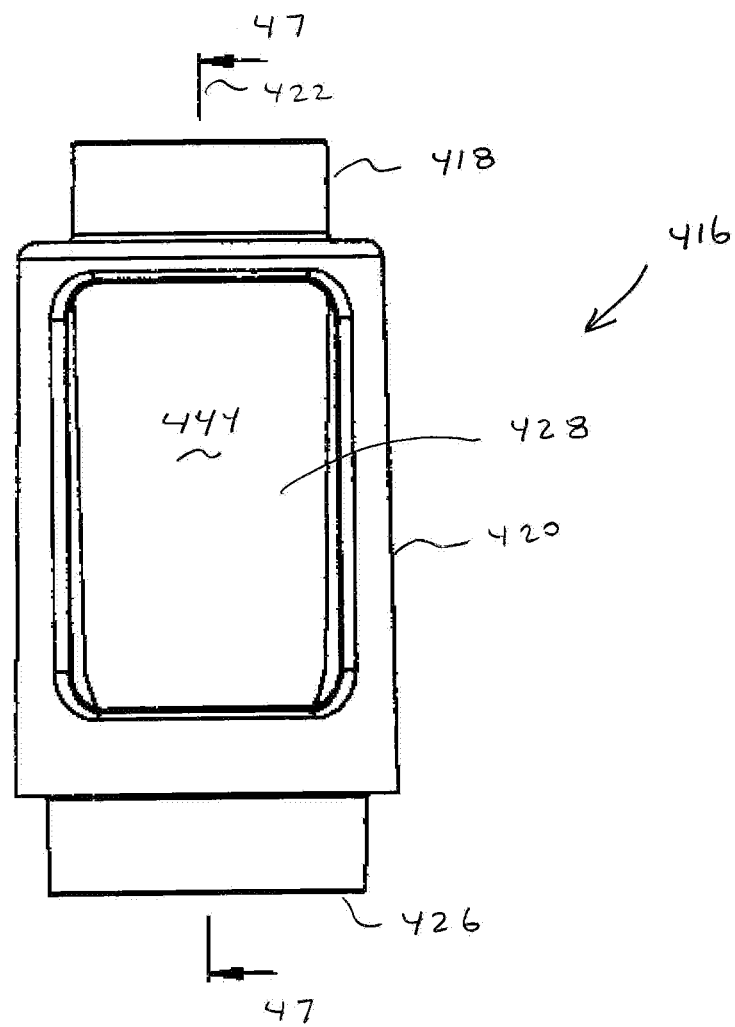
FIG. 44 is a front view of a fitting of FIG. 43 without the manifold plumbing fitting.
Figure 45:
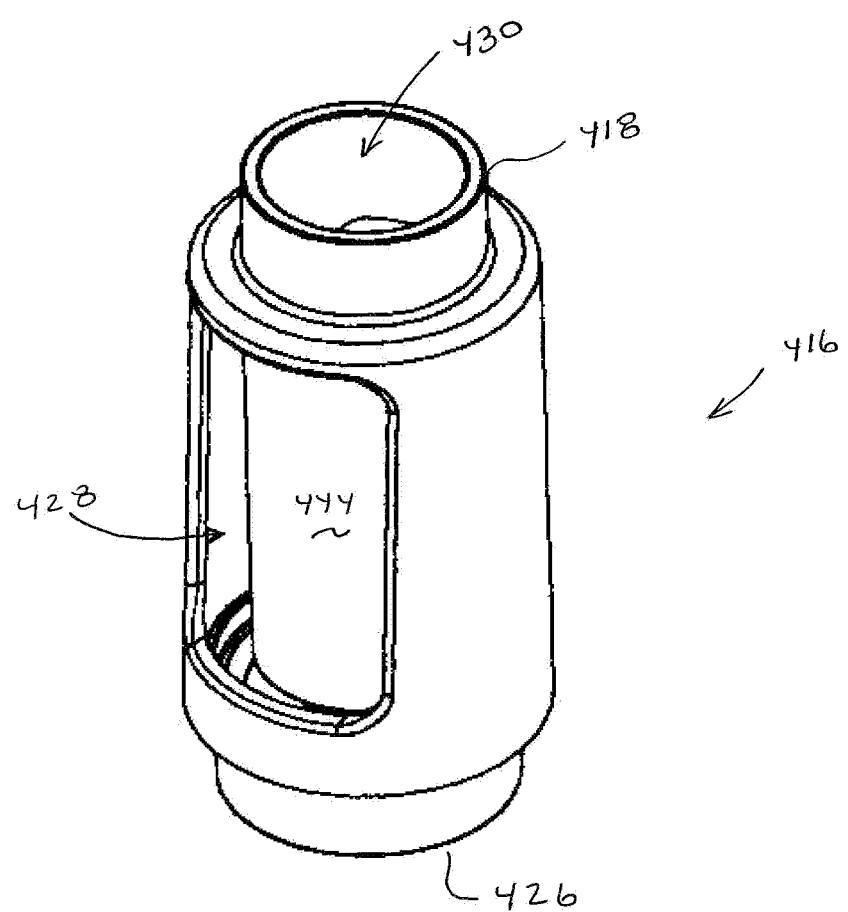
FIG. 45 is a perspective view of the air gap fitting shown in FIG. 43.
Figure 46:
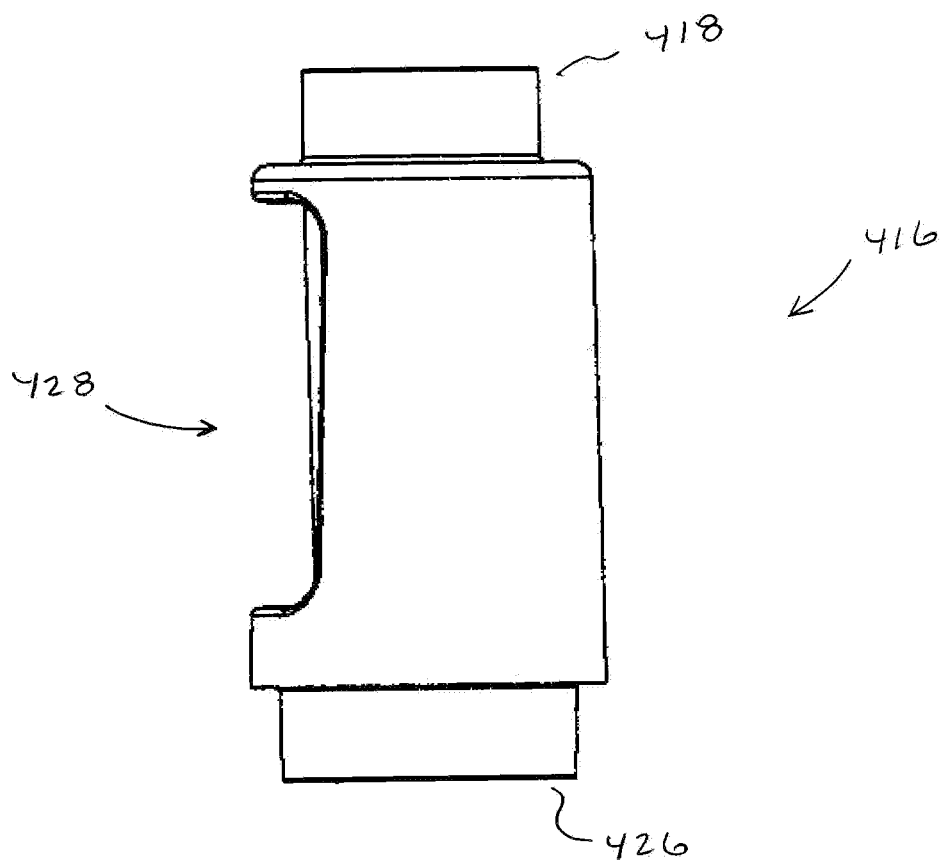
FIG. 46 is a side view of the air gap fitting shown in FIG. 43.
Figure 48:
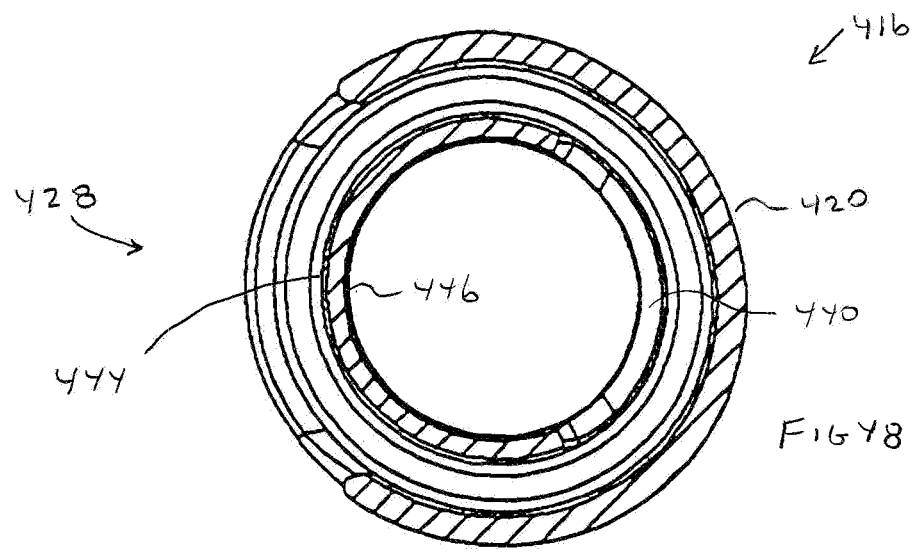
FIG. 48 is a cross-sectional view of the air gap fitting taken along line 48-48 in FIG. 47.

In the exemplary arrangement as shown in FIG. 42, a plurality of radially inwardly extending fins 412 and radially outwardly extending fins 414 extend in angularly spaced relation in the interior area of the fitting. At least some of the fins extend axially above and below the air gap opening and serve to reduce the risk that draining water will splash out of the fitting through the air gap opening.

In the exemplary arrangement, the manifold fitting 384 with the air gap opening is configured to enable water that backs up in a drain to escape from the fitting through the narrow lower leg of the T-shaped slot. Generally this narrow opening is sufficient to enable water which is flowing upwardly to flow out of the fitting so as to avoid the level of the water in the interior area of the fitting reaching the inlet opening or the drain fitting openings. However, in the event that the level of water inside the fitting that is backing up through the drain should begin to approach the upper area of the elongated slot, the wider and greater surface area of the air gap opening near the top portion of the T-shaped slot will enable a greater flow of water out of the interior area of the fitting. This greater flow of water will serve to reduce the risk that the water will back up to a level at which the contaminated water from the drain reaches the level of the drain fitting openings or the body inlet.

Of course it should be understood that the configurations of the air gap openings shown are exemplary, and other air gap openings may have other different orientations, positions or configurations so as to serve the purpose of providing an air gap. Also in other arrangements, multiple air gap openings may be utilized for purposes of performing the functions described herein.

FIGS. 43-47 show an exemplary arrangement of an air gap fitting 416. Fitting 416 of this exemplary arrangement provides only a single inlet coupling portion 418. Fitting 416 does not provide a plurality of drain fitting openings like the previously described arrangements. Rather in some exemplary arrangements, the fitting 416 may be used in conjunction with a manifold fitting like fitting 32. Manifold fitting 32 is shown in phantom in FIG. 43 connected to the inlet coupling portion 418 of the fitting 416. Of course fitting 416 may be utilized in numerous different piping arrangements and configurations.

The exemplary air gap fitting 416 includes generally cylindrical axially elongated annular body that is elongated about a central axis 422. Annular body 420 bounds an interior area 424. Annular body 420 further includes a body outlet 426 which in the operative position of the plumbing fitting is at the bottom of the fitting body.

In the exemplary arrangement, an air gap opening 428 extends in an outer wall of body 420. It should be understood that while in the arrangement shown, the air gap opening 428 is generally rectangular, in some arrangements, the air gap opening may have other shapes such as those shapes previously discussed.

In an exemplary arrangement, a body inlet 430 extends through the inlet coupling portion and into the interior area 424. In the exemplary arrangement the body inlet 430 is bounded by an annular inlet wall 432. The body inlet is in operative connection a semi-annular spout 434 that extends in the interior area. The semi-annular spout 434 is open at its lower end to a discharge opening 436. The spout 434 is bounded externally by a curved spout wall 438. At least one spout opening 440 extends through the spout wall on a side of the wall that is opposite to the air gap 428. In the exemplary arrangement, the spout opening 440 includes an axially elongated slot which extends upwardly in the interior area 424 to the level of the annular inlet wall 432. In the exemplary arrangement, the elongated slot 440 includes an axially angularly tapered side which is angularly opposed from the air gap opening 442 so as to provide a continuous opening from the discharge opening 436 along the slot 440 and upwardly to the level of the annular inlet wall 432.

Figure 47:
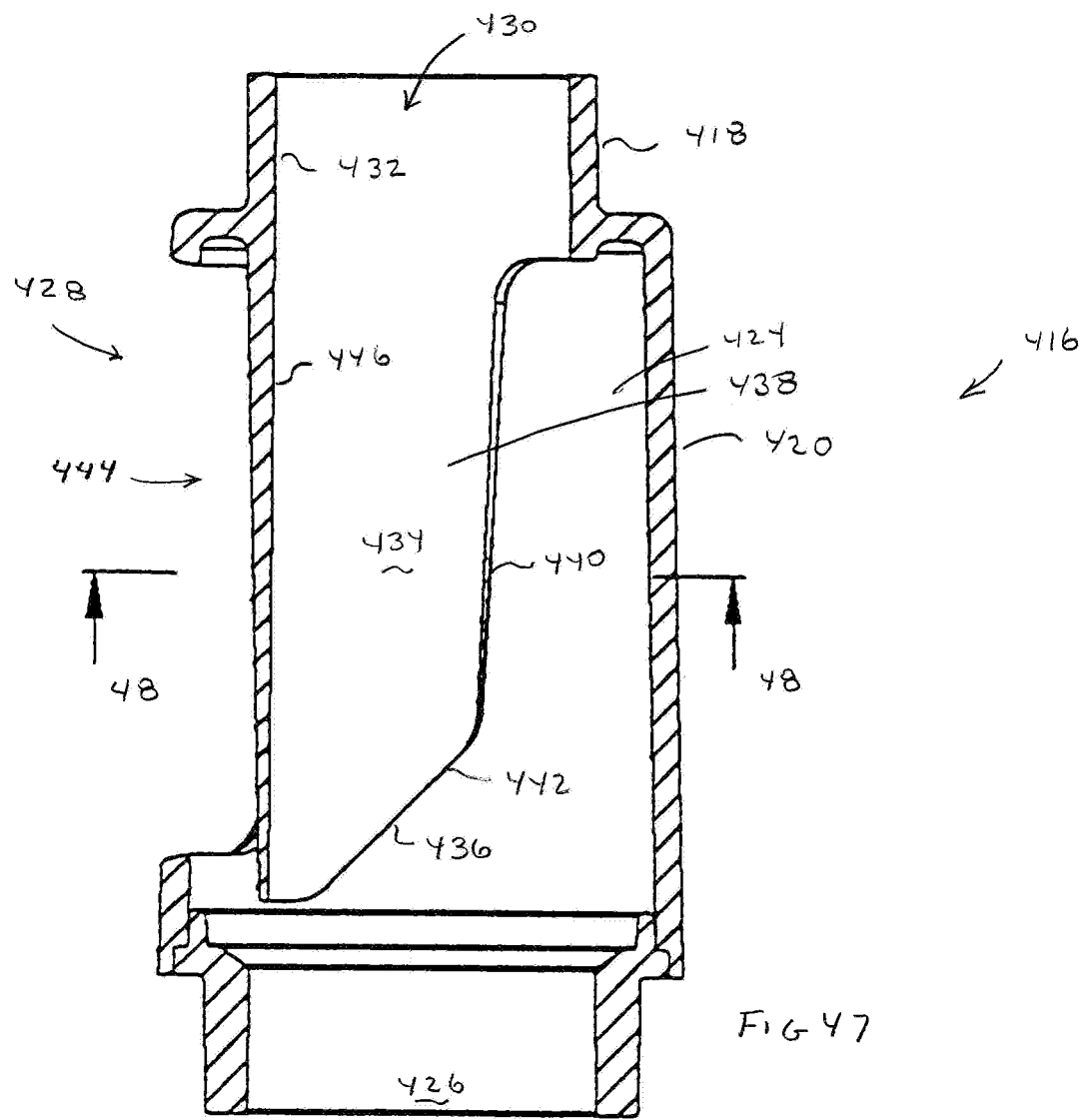
FIG. 47 is a cross-sectional view of the air gap fitting taken along line 47-47 in FIG. 44.
Figure 53:
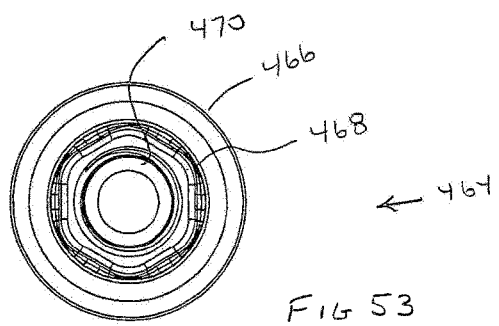
FIG. 53 is a top view of the air management/check valve.

In the exemplary arrangement, the outwardly facing curved spout wall underlying the air gap opening 428 serves as a shield generally referred to as 444. As shown in FIG. 47, the shield 444 extends radially between the body inlet and the air gap opening. Further, the shield extends in the axial direction from the body inlet to a level below the air gap opening. This exemplary configuration in which the external surface of the curved spout wall 438 which serves as a shield 444 extends continuously from the body inlet to axially below the air gap opening, reduces the risk that water passing through the fitting from the inlet coupling portion 418 to the body outlet 426 will splash outwardly through the air gap opening. Further in the exemplary arrangement, the annular inlet wall 432 which bounds the body inlet 430 is smooth and annularly continuous with the interior surface 446 of the curved spout wall. This smooth and continuous configuration of the wall surface from the inlet opening downward and through the interior area of the body serves to help reduce resistance to flow and turbulence within the interior area of the air gap fitting 416. This also helps to avoid water splashing out of the interior area of the fitting through the air gap.

As can be appreciated in operation of the air gap fitting water flows into the interior area of the body through the body inlet 430. The water is guided by the spout downwardly past the air gap opening and into a lower portion of the interior area from which the water passes out of the body outlet 426. In the event that water backs up into the body outlet and begins to rise within the interior area of the body, drain water will pass out of the air gap opening 428. The water passing out of the air gap opening prevents the water level from rising within the interior area of the fitting 416. The elongated gap 440 extending from the discharge outlet 436 to the level of the annular inlet wall 432 serves to prevent drain water that may be backing up in the fitting from reaching the level of the annular inlet wall 432, thus maintaining an air gap and preventing the drain water from passing upwardly out of the fitting. Thus the air gap fitting may be used to reduce the risk that contaminated drain water may back up and reach water discharge devices or other items that normally drain water downwardly through the fitting. Of course it should be understood that this configuration of the air gap fitting is exemplary and in other arrangements, other configurations and approaches may be used.

FIG. 49 shows an alternative system 448. System 448 is generally like system 212 previously described except as otherwise specified.

Like the previously described system, system 448 includes a plurality of water discharge devices 450, 452, 454 and 456. Such water discharge devices may be similar to those described in connection with system 212 or other types of water discharge devices. Each of the water discharge devices are connected through respective drain lines to a manifold plumbing fitting 458. Fitting 458 may in some arrangements be like manifold plumbing fitting 32 which has been previously discussed. Manifold fitting 458 has the fitting outlet thereof connected to a drain line 460 which extends above a trap 462 which is connected to a water drain outlet in a manner like that referred to in the previously described systems.

In the exemplary arrangement of system 448, fitting 458 has the fitting inlet coupling portion thereof connected to an air management/check valve 464. In the exemplary arrangement the air management/check valve operates to enable atmospheric air to enter the interior area of fitting 458. By enabling the passage of air into the interior are of the fitting, the draining of the water from the water discharge devices and the interior area of the fitting is facilitated by allowing air to be drawn into the interior area. Further in exemplary arrangements, air or water vapor moving at a sufficiently slow speed into the interior area of the fitting may also be vented outwardly through the air management/check valve.

However, in circumstances where water rises in the drain line 460 and into the interior area of the fitting body, the check valve function will operate to prevent drain water from moving upward out of the interior area of the body. This may be done in circumstances where it is desirable to hold a fluid tight arrangement and not allow water to pass outwardly from the fitting 458 into the surrounding area. Further in some exemplary arrangements, the check valve structure may prevent bursts of water and/or large volumes of fast moving air that move upward through the drain line 460 from exhausting from the fitting 458. Likewise this prevents the unwanted discharge of water in the area of the water discharge equipment.

An exemplary arrangement of the air management/check valve 464 is shown in FIGS. 50-57. It should be appreciated while the air management/check valve 464 may be utilized in connection with systems like system 448, such a valve may also be used as the valve 162, 182, 204 and/or 210 in the arrangements previously described.

In an exemplary arrangement valve 464 has a generally annular lower body portion 466. In an exemplary arrangement, annular body portion 466 is configured and sized to extend into an inlet coupling portion such as the fitting inlet coupling portion of a manifold fitting like those previously discussed. For example in some arrangements, the annular body portion 466 may be glued in close tolerance fit engagement with such a coupling portion. Of course it should be understood that this configuration is exemplary and in other arrangements other connections such as threaded connections or bayonet connections may be utilized.

The body of exemplary valve 464 further includes an upper portion 468. Upper portion 468 includes a hexagonal exterior portion for facilitating engagement with a wrench or similar tool. Alternatively in other arrangements the upper portion may have other configurations. A threaded opening 470 extends in the upper portion of the exemplary arrangement. A threaded opening 470 may be utilized to connect the valve 464 to an air inlet vent line, stand pipe or other suitable connection. In some systems the threaded opening may be connected to a body including a desiccant material or coalescing media that captures material in the vapor or air that passes out of the upper portion. Of course these arrangements are merely exemplary of those in which the valve may be used.

Figures 50, 51, 52:
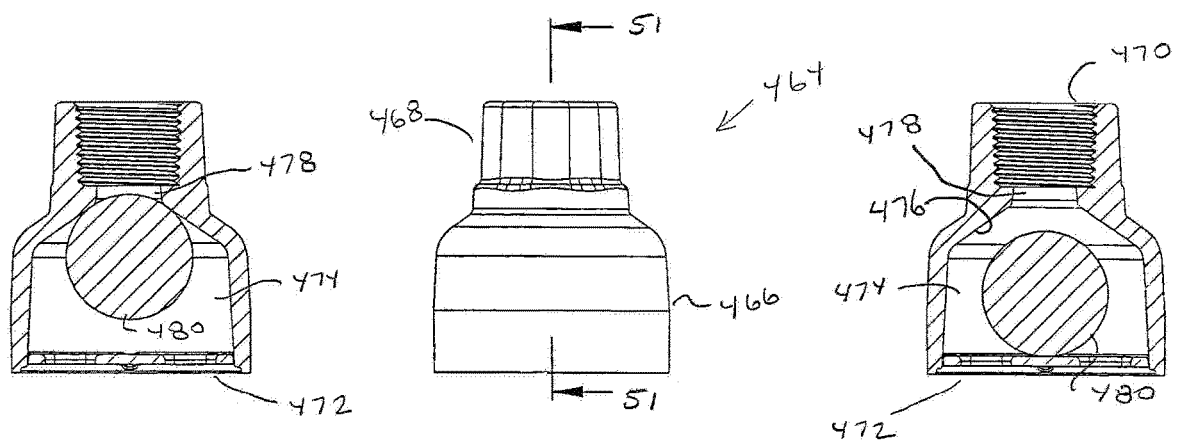
FIG. 50 is a front view of an exemplary air management/check valve.
FIG. 51 is a cross-sectional view of the air management/check valve shown in FIG. 50 taken along line 51-51 and showing the internal check ball in upwardly disposed blocking the outlet of the air management/check valve.
FIG. 52 is a cross-sectional view of the air management/check valve similar to FIG. 51 but showing the check ball disposed downwardly and away from the outlet.
Figure 54:
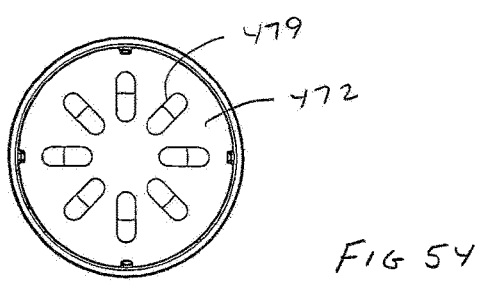
FIG. 54 is a bottom view of the air management/check valve.
Figure 58:
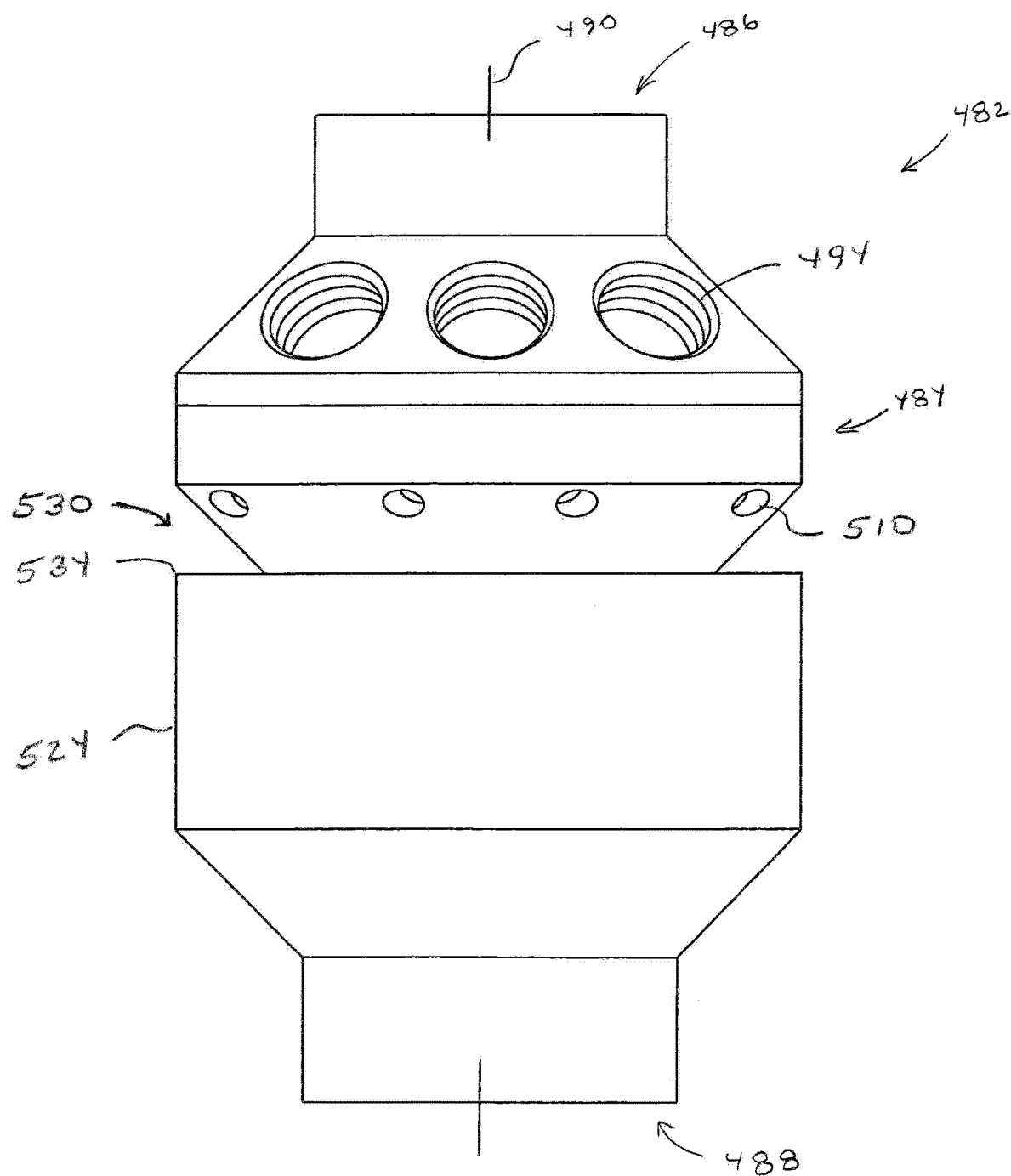
FIG. 58 is a side view of an alternative arrangement of the manifold plumbing fitting which includes an air gap.

As shown in FIGS. 51 and 52, the exemplary valve 464 includes a generally bell shaped interior area 474. The interior area 474 is bounded by an inner wall which has an inwardly tapered upper wall portion 476. The tapered wall portion 476 terminates upwardly at an opening 478 that is open to the threaded opening 470.

The interior area 474 is bounded at its lower end by a plate 472. The exemplary plate 472 includes a plurality of radially elongated angularly space openings 479 therethrough. The exemplary valve 464 includes a check ball 480 that is movable within the interior area 474. The exemplary ball floats on the surface of water. In the exemplary arrangement the check ball is movable in the interior area 474 between positions in which the ball 480 is disposed away from the opening 478 and positions in which the ball is disposed adjacent to the opening 478 so as to block the passage of liquid or gas outwardly through the opening 470 of the valve.

In the exemplary operation of the valve 464, when the valve is in a normal operating condition to enable air flow into the interior area of the valve and therethrough to a connected fitting or other conduit, the ball 480 is disposed away from the opening 478. This condition is shown in FIG. 52. In this configuration the valve 464 enables air from atmosphere to enter the interior area 474, pass through the openings 479 in the plate and into the connected manifold fitting or other structure.

In the event that water backs up and reaches the level within the valve 464 or in circumstances where an extremely high rate of air flow or a mixture of fast moving air and liquid, rushes into the interior area from the bottom of the valve and passes through the openings 492 in the plate 472, the ball will be displaced upwardly as shown in FIG. 51. In this position the ball 480 will block the opening 478. As a result, air or liquid will not be able to pass outwardly from the valve until the condition causing the ball 480 to be displaced upwardly in the interior area subsides. This may include, for example, a lowering of the level of water within the valve interior area. Alternatively, such a condition may correspond to a decrease in air flow into the valve. Once the condition displacing the ball upwardly as shown in FIG. 51 no longer exists, the valve 464 will return to the normal air admittance and exhaust condition shown in FIG. 52. Of course it should be understood that this configuration of the air management/check valve is exemplary and in other arrangements, other configurations and structures may be utilized.

FIGS. 58-62 show an alternative arrangement of a manifold plumbing fitting 482. Fitting 482 can be utilized in a functionally similar manner to previously described plumbing fittings 272, 344, 384 and 416 which provide an air gap to prevent backflow from the drain line to which the plumbing fitting is connected into the water discharge devices connected to the fitting such as those previously described.

Fitting 482 includes a body 484. The body 484 includes a body inlet 486 and a body outlet 488. The body inlet 486 and body outlet 488 are coaxial about an axis 490. In an operative position of the plumbing fitting 482 the axis extends vertically. Similar to the previously described air gap fittings the body outlet 488 is configured to be attached in fluid connection with a water drain through connection to a drain line above a drain trap. The body inlet 486 may in some configurations be operatively connected to a drain of a sink and may receive at least one of water and air therethrough. In other exemplary arrangements the body inlet may be an operative connection with air from the atmosphere. The connection with atmosphere may be via an open conduit extending above the body, through an air admitting valve such as valve 162 previously described or through a check valve such as air admittance/check valve 464. In other exemplary arrangements the plumbing fitting may be installed in an arrangement in which the body inlet 486 may be wholly or partially closed through the placement of a plug therein. Numerous different installation arrangements for the manifold plumbing fitting 482 such as those arrangements previously discussed in connection with the other plumbing fittings may be utilized.

The exemplary fitting 482 includes an upper portion 492 which includes a plurality of angularly spaced drain openings 494. In the exemplary arrangement the drain openings 494 are threaded or otherwise configured to receive drain fittings or plugs similar to the previously described arrangements. The drain fittings may receive water and other fluids from water discharge devices similar to those previously discussed.

Figure 59:
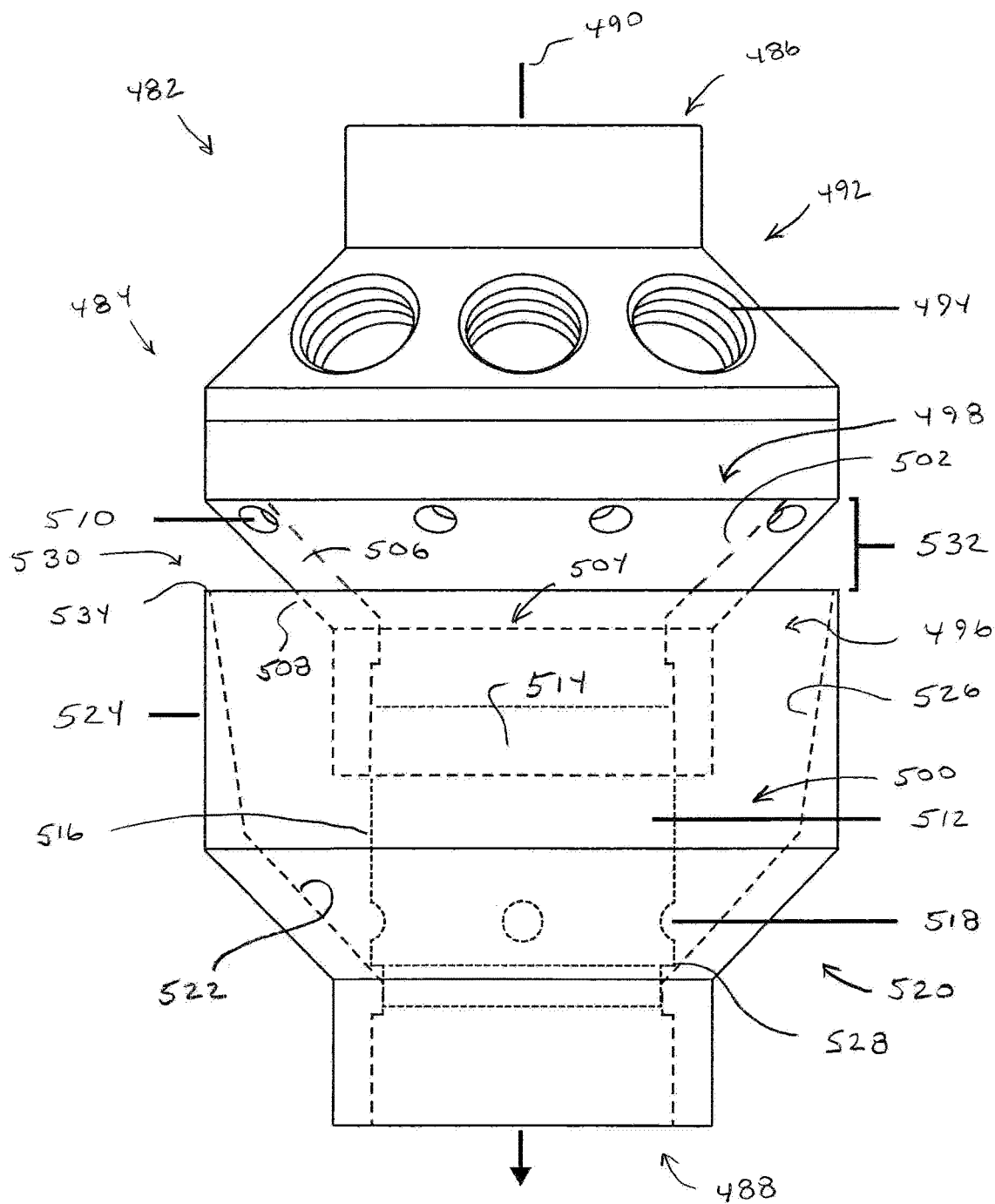
FIG. 59 is a view of the manifold plumbing fitting of FIG. 58 with the internal structures of the outlet end portion shown in phantom.
Figure 60:
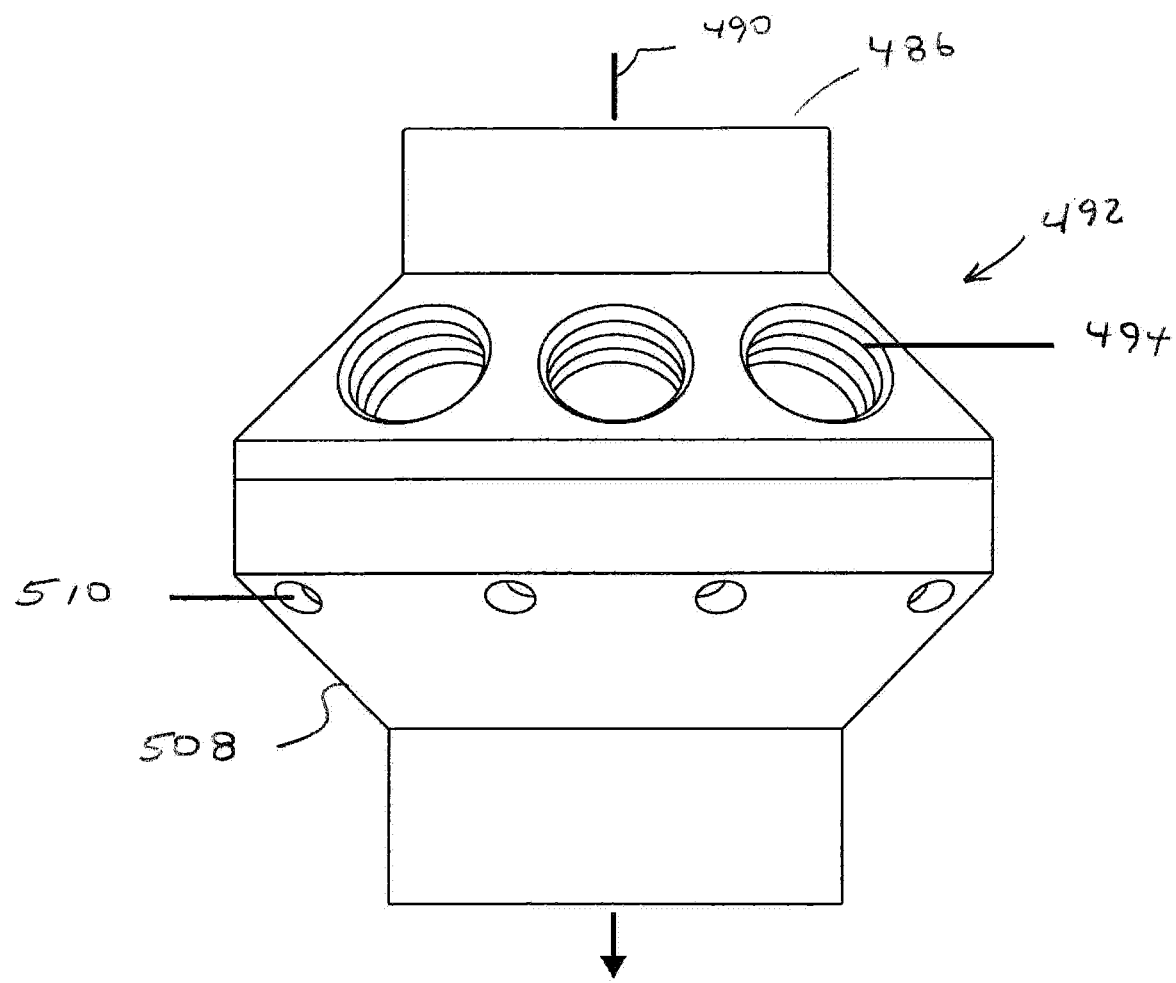
FIG. 60 is a side view of the structures in the upper end portion of the manifold plumbing fitting of FIG. 58.

In the exemplary arrangement the upper portion 492 of the fitting 482 is generally similar to manifold plumbing fitting 32 previously described. As shown in FIG. 59, the body 484 of the plumbing fitting bounds an interior area 496. The exemplary interior area is radially enlarged relative to the axis relative to the body inlet and the body outlet. The interior area 496 includes an inlet end portion 498 in the upper portion 492. The interior area 496 also includes an outlet end portion 500. The outlet end portion 500 is disposed at an opposed end from the inlet end portion 498 and is in proximity to the body outlet 488.

In the exemplary arrangement the inlet end portion 498 is bounded in an axially downward direction by an annular tapered funnel surface 502. The annular tapered funnel surface 502 is configured to extend closer to the axis 490 with downward movement when the plumbing fitting is in the operative position. The annular tapered funnel surface 502 extends to a central funnel opening 504. In the exemplary arrangement the annular tapered funnel surface 502 comprises an axially upward facing surface of a annular funnel wall 506. The annular funnel wall is bounded outside of the inlet end portion and within the body interior area by a tapered annular lower funnel wall surface 508.

Figure 61:
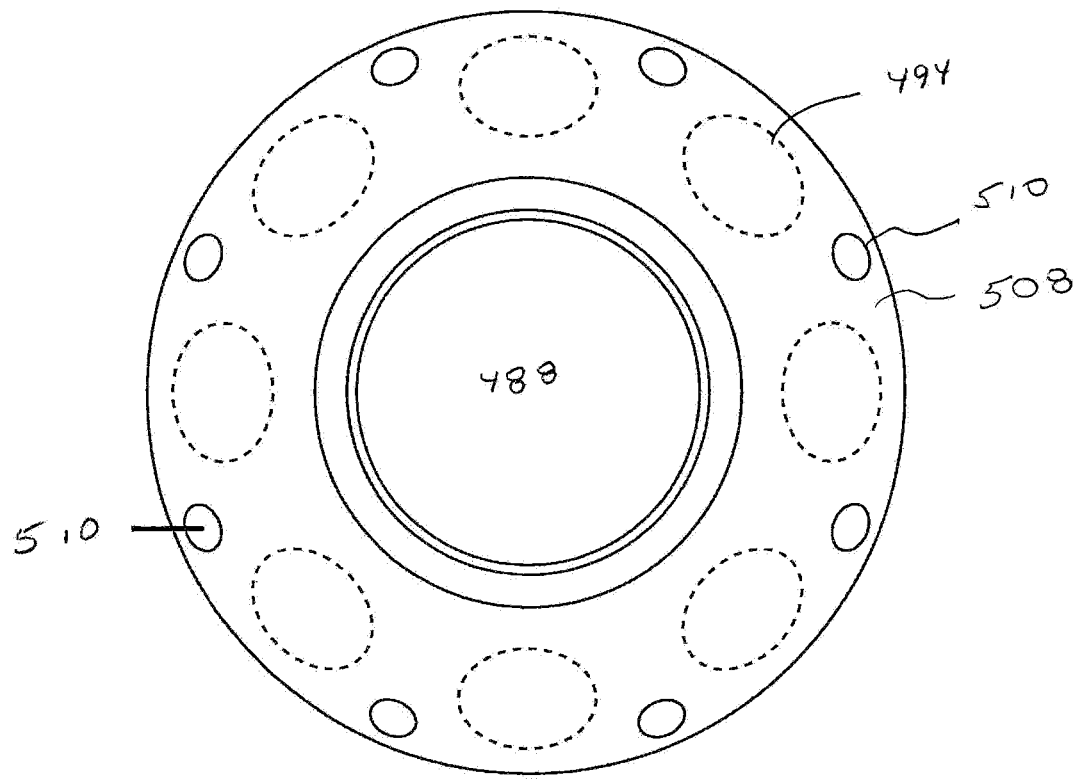
FIG. 61 is a bottom view of the structures in the upper end portion of the manifold plumbing fitting of FIG. 58.

The upper portion 492 of the plumbing fitting 482 differs from the structure of plumbing fitting 32 by including a plurality of angularly spaced air gap openings 510. The air gap openings each extend through the annular funnel wall 506 between the annular tapered funnel surface 502 and the lower funnel wall surface 508. In the exemplary arrangement as shown in FIG. 61 each of the air gap openings 510 is positioned to be vertically below the drain openings 494 and spaced angularly between immediately adjacent drain openings. In the exemplary arrangement the fact that the air gap openings are not vertically aligned with the drain openings reduces the amount of water that is received from the water discharge devices through the drain openings 494, that passes out of the inlet end portion 498 through the air gap openings 510 instead of the central funnel opening 504. Of course it should be understood that this approach is exemplary and in other arrangements other configurations may be used.

Figure 62:
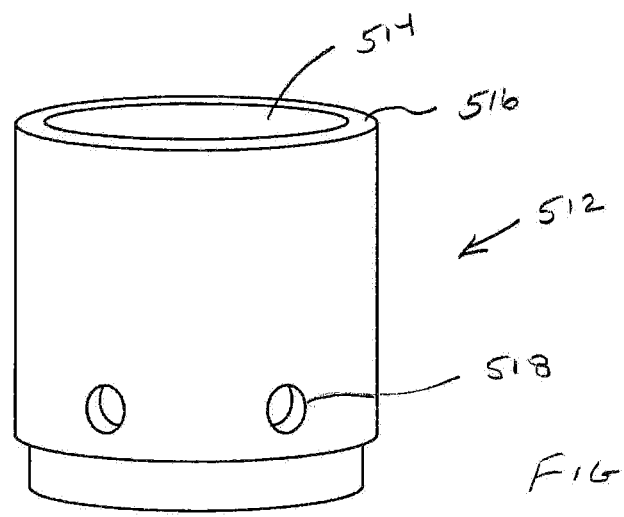
FIG. 62 is a top side perspective view of a spout of the manifold plumbing fitting of FIG. 58.

A spout 512 extends axially in the outlet end portion 500 of the interior area 496. The exemplary spout 512 includes an interior passage 514. The interior passage 514 extends in fluid connection with the central funnel opening 504. The interior passage 514 extends toward the body outlet 488. As shown in FIG. 62 the exemplary spout 512 includes an annular spout wall 516. A plurality of spout openings 518 extend in angularly spaced relation radially through the spout wall. The spout openings 518 place the outlet end portion 500 of the interior area in fluid connection with the spout interior passage 514 and the body outlet 488 for purposes that are later discussed.

In the exemplary arrangement body 484 further includes a lower portion 520. The outlet end portion 500 of the interior area within the lower portion 520 is bounded at its lower axial end by an annularly tapered wall surface 522. The annularly tapered wall surface 522 is configured so that in the operative position of the plumbing fitting 482, surface 522 extends closer to the axis 490 with downward movement along the axis. The exemplary wall surface 522 further extends vertically below and underlies all of the of air gap openings 510.

The exemplary body lower portion 520 further includes an annular cylindrical portion 524. In the operative position of the plumbing fitting 482 the cylindrical portion 524 extends upward from the annually tapered wall surface 522.

An annularly tapered guide surface 526 bounds the cylindrical portion 524 within the outlet end portion 500 of the body interior area. The exemplary guide surface 526 is annularly tapered to be closer to the axis with downward movement along the axis when the plumbing fitting is in the operative position, and also to be closer to the axis with increasing proximity to the annularly tapered wall surface 522. As shown in FIG. 59 the exemplary guide surface 526 intersects with the annually tapered wall surface 522. Further in the exemplary arrangement the cylindrical portion 524 in the operative position of the plumbing fitting, extends to a top surface 534 that is above at least a portion of the annular funnel wall 506. In the exemplary arrangement this configuration helps to assure that water or other fluids that pass out of the air gap openings 510 are captured within the outlet end portion 500 of the interior area bounded by the guide surface 526 and the annularly tapered wall surface 522.

In the exemplary arrangement the annularly tapered wall surface 522 engages the annular spout wall 516 at an annular joint 528. In the exemplary arrangement the spout openings 518 are disposed somewhat vertically above the annular joint 528 when the plumbing fitting 482 is in its operative position. This enables water or other fluid to pass between the spout interior passage 514 and the outlet end portion 500 of the interior area of the body.

The exemplary body 484 includes at least one outer air gap 530 therethrough. In the exemplary arrangement the outer air gap 530 is a continuous annular air gap that extends circumferentially about body 484. In the exemplary arrangement the outer air gap vertically spans space 532 which in the operative position of the plumbing fitting extends between the upper end of the cylindrical portion 524 and the top of the annular funnel wall 506. As can be appreciated this circumferential annular air gap of the exemplary arrangement provides a large surface area for the overflow of liquid that may move upwardly into the fitting through the body outlet 488 as a result of backflow or in the event that the drain line below the body becomes plugged. Further in the exemplary arrangement the vertical size of space 532 of the outer air gap reduces the risk that back flowing liquid rising into the interior area of the fitting 482 can ever reach the drain openings 494 or the lines to the water discharge devices which are connected thereto.

As can be appreciated, in the exemplary arrangement of the plumbing fitting 482 water and other fluids are received into the upper portion 492 of the body 484 through the drain openings 494 that are connected to water discharge devices. The drain openings 494 that are not in fluid connection with water discharge devices are closed by a plug of the type previously discussed. In operation generally the body inlet 486 will be open to atmosphere to enable air to pass therethrough and into or out of the inlet end portion 498 of the body interior area. As previously discussed air may enter the body inlet 486 in the exemplary arrangement through suitable air admittance or check valves or other openings. Alternatively in some system configurations air and water may enter the body inlet 486 from the drain of a sink that is disposed vertically above the plumbing fitting 482.

In the exemplary arrangement water and other fluids are received into the inlet end portion 498 of the interior area 496 through the drain openings 494. The received water and other fluids pass downwardly in the inlet end portion through engagement with the annular tapered funnel surface 502 and into the central funnel opening 504. Because in the exemplary arrangement the air gap openings 510 are disposed angularly between immediately adjacent drain openings 494, the water and other fluids received through the drain openings will generally tend to flow to the central funnel opening 504 rather than out through one of the air gap openings 510. However in the event that any fluid from one of the drain openings 494 does pass out through one of the air gap openings, such fluid will be captured within the lower portion 520 of the fitting body and passed through the spout openings 518 to the body outlet 488.

The central funnel opening 504 is in connection with the interior passage 514 of the spout 512. The interior passage 514 of the exemplary spout is in fluid connection with the body outlet 488. As a result water and other fluid that reaches the central funnel opening 504 is conducted through the spout interior passage 514 and outwardly through the body outlet 488 to the connected drain line and trap.

In the event that water other fluid that enters the inlet end portion 498 of the interior area through the drain openings 494, passes outwardly through one of the air gap openings 510, the fluid will be guided downwardly and radially inwardly by the lower funnel wall surface toward the outer surface of the spout wall 516. The liquid may then flow downwardly on the spout wall to the area of the spout openings. Any liquid that falls downwardly from one of the air gap openings 510 will be engaged by the guide surface 526 of the cylindrical portion 524 and/or the annularly tapered wall surface 522. Such liquid will be guided in engagement with such surfaces toward the spout openings 518 which extend through the spout wall 516. The liquid that collects adjacent to the spout openings will then pass through the openings 518 and downwardly out of the body 484 through the body outlet 488.

In the event that the drain line or trap to which the plumbing fitting 482 is connected becomes blocked or experiences a backflow condition, the liquid in the line may begin to rise into the interior area of the body of the plumbing fitting 482. In such event the back flowing liquid entering through the body outlet 488 will pass outwardly through the spout openings 518 in the spout and be confined within the spout interior passage 514 and the annular area bounded by the spout wall 516 and the annularly tapered wall surface 522 and the guide surface 526 of the cylindrical portion 524.

In the event that the back flowing water rises above the top surface 534 of the cylindrical portion 524, the back flowing water will be expelled through the outer air gap 530. Because the exemplary outer air gap 530 extends circumferentially about the entire fitting body, a large area for water discharge is provided. This large area which extends between the lower funnel surface 508 and the top surface 534 of the cylindrical portion will enable the flow of a large volume of water out of the fitting body so that the risk of back flowing water reaching the inlet end portion 498 in the interior area 496 of the upper portion 492 is small.

However in the event that back flowing water in the interior area of the fitting body is somehow able to reach within the inlet end portion 498, the inflowing water will be drained through the plurality of air gap openings 510. The plurality of air gap openings and the surface area for draining water therefrom which is provided by having a number of angularly spaced openings, enables flow at a high volume rate out of the inlet end portion. Further because the space 532 that is provided in the exemplary arrangement between the lower funnel surface 508 and the top surface 534 of the cylindrical portion 524 includes a relatively wide vertical gap that extends about the entire circumference of the body 484, a relatively large amount of water can be exhausted from the fitting at a high rate through the exemplary outer air gap. In addition, the position of the air gap openings 510 through the annular tapered funnel surface keeps the water level well below the drain openings 494 to further reduce the risk that any back flowing water will reach the drain openings or the fitting connections to the water discharge devices connected thereto.

While the exemplary arrangement described effectively reduces the risk of back flowing water reaching any of the water discharge devices, it should be understood that the configuration shown is exemplary and other arrangements may be produced by those having skill in the art which utilize the principles described herein. For example it should be understood that while the generally cylindrical construction of the exemplary arrangement that has been described performs satisfactorily, other arrangements with other configurations may be utilized. Further while the exemplary arrangement has a cylindrical body that is generally the same diameter in the upper and lower portions, other arrangements may have different sizes and relationships. For example in some arrangements the area in the lower portion in which back flowing water may be captured before it overflows out of the plumbing fitting, may be larger and/or may extend higher so as to house more water therein before it overflows into the environment. Further different exemplary arrangements may include a bounding surface for the water holding area that extends further upwardly in the operative position of the plumbing fitting. Further in some exemplary arrangements the cylindrical portion or other structure which bounds the area for capture of water which flows out of the air gap openings and/or the spout openings may be larger and extend further upwardly so as to capture any leakage from the fittings that are connected to the drain openings. Of course these approaches are exemplary and other arrangements other approaches may be used.

Of course, it should be appreciated that the numerous different system configurations shown herein are exemplary. The system configurations shown may be used in connection with the exemplary arrangements, and numerous other system types, configurations and arrangements may be utilized in connection with fittings having the properties that are discussed herein. Further, it should be appreciated that although in the exemplary arrangements the fitting structures have been used in connection with drains for water or other discarded liquids, fittings having the features described herein may be used for other functions and purposes that may be useful in providing different types of fluid conduit flows.

Although numerous configurations have been described herein based on certain exemplary arrangements, a wide array of modifications, variations and alternative constructions are also within the spirit and scope of the principles described herein. A number of arrangements for systems and manifold fittings have been described with reference to particular components, features, properties, attributes, relationships and methods. However, it should be understood that other arrangements may include other components, features, properties, attributes, relationships and/or methods which provide similar or other capabilities and functionalities.

It will also be readily understood that the features of exemplary arrangements as generally described and illustrated in the Figures can be arranged and designed in a wide array of different configurations. That is features, structures and/or characteristics of arrangements described herein may be combined in any suitable manner in one or other arrangements. Thus, the detailed description of the exemplary arrangements are of the apparatus, methods and articles as represented in the Figures. It is not intended to limit the scope of the arrangements as claimed, but are merely representative of selected exemplary arrangements that implement the principles described herein.

In the foregoing description, certain terms have been used to describe example arrangements for purposes of brevity, clarity and understanding. However, for example, certain terms, such as "upward," "downward," "higher," "lower," "left," "right," "outer," "inner," "front," "rear," "top," and "bottom" may have been used. However, no unnecessary limitations are to be implied therefrom, because such terms have been used for descriptive purposes and are intended to be broadly construed. Such terms shall not be construed as limitations on the scope of the claims hereof. Moreover, the descriptions and illustrations herein are by way of examples and the inventive teachings are not limited to the specific details that have been shown and described.

The exemplary structures and arrangements, along with the methods of preparing and using such structures and arrangements, achieve at least some desirable objectives, eliminate difficulties encountered in the use of prior devices and systems, solve problems and attain the desirable results described herein.

In the following claims, any feature described as a means for performing a function shall be construed as encompassing any means capable of performing the recited function and shall not be deemed limited to the particular means used for performing the function in the foregoing description or mere equivalence thereof.

Having described the features, discoveries and principles of the exemplary arrangements, the manner in which they are constructed and operated, and the advantages and useful results attained, the new and useful structures, devices, elements, arrangements, parts, combinations, systems, equipment, operations, methods, processes and relationships are set forth in the appended claims.

The invention claimed is:

1. Apparatus comprising:
   a manifold plumbing fitting configured to be positioned in intermediate fluid connection between a sink drain and above a drain trap associated with the sink drain, wherein the plumbing fitting includes:
   an annular body, wherein the body includes an interior area, wherein in an operative position of the plumbing fitting the body is configured to extend along a generally vertical body axis,
   a body inlet, wherein the body inlet
   is configured to be in direct fluid connection with the sink drain, and
   is coaxial with the body axis and is configured to enable air and water to enter the interior area,
   a body outlet, wherein the body outlet is coaxial with the body axis and is configured to enable water to pass out of the interior area toward the drain trap,
   wherein the interior area extends symmetrically annularly and radially outward relative to the body axis beyond the body inlet and the body outlet,
   wherein the interior area includes an inlet end portion, wherein the inlet end portion of the interior area is bounded within the body by an axially symmetric annular tapered inlet end funnel surface,
   wherein the inlet end funnel surface includes an axially centered body inlet funnel opening therein that is directly fluidly connected to the body inlet, and is configured such that in the operative position of the plumbing fitting the inlet end funnel surface is disposed vertically higher with closer proximity along the body axis to the body inlet funnel opening, wherein the interior area further includes an outlet end portion, wherein the outlet end portion is bounded within the body by an axially symmetric annular tapered outlet end funnel surface, wherein the outlet end funnel surface includes an axially centered body outlet funnel opening therein that is directly fluidly connected to the body outlet, and is configured such that in the operative position of the plumbing fitting the outlet end funnel surface is disposed vertically lower with closer proximity along the body axis to the body outlet funnel opening, wherein the interior area is further bounded by a symmetric axially centered cylindrical sidewall surface, wherein in the operative position of the plumbing fitting the cylindrical sidewall surface extends continuously and generally vertically intermediate of the inlet end funnel surface and the outlet end funnel surface, wherein the interior area includes only open space axially intermediate of the inlet funnel surface and the outlet funnel surface and diametrically across an interior area portion bounded by cylindrical sidewall surface, wherein the body includes a plurality of drain fitting openings that extend through the body and the inlet end funnel surface to the interior area, wherein each of the plurality of drain fitting openings is disposed radially outwardly away from the body inlet funnel opening and axially away from the outlet end funnel surface, wherein in the operative position of the plumbing fitting each drain fitting opening extends in vertically overlying relation above the outlet end funnel surface, wherein each of the plurality of drain fitting openings is configured to receive either a drain fitting operatively fluidly connected to a water discharge device, or a plug, wherein the plug blocks the respective drain fitting opening.

2. The apparatus according to claim 1
wherein the plurality of drain fitting openings are uniformly angularly spaced on the body.

3. The apparatus according to claim 1
wherein each of the drain fitting openings extends along a respective drain fitting axis,
wherein each respective drain fitting axis intersects and extends at an acute angle to the body axis.

4. The apparatus according to claim 1
wherein each of the drain fitting openings extends along a respective drain fitting axis,
wherein each respective drain fitting axis intersects with the outlet funnel opening.

5. The apparatus according to claim 1
wherein the body inlet and the body inlet funnel opening have a common inlet diameter.

6. The apparatus according to claim 1
wherein the body outlet and the body outlet funnel opening have a common outlet diameter.

7. The apparatus according to claim 1
wherein the body inlet and the body inlet funnel opening have a common inlet diameter,
wherein the body outlet and the body outlet funnel opening have a common outlet diameter,
wherein the body inlet diameter and the body outlet diameter are the same.

8. The apparatus according to claim 1
wherein the body inlet funnel opening has an inlet diameter,
wherein the interior area diametrically across the cylindrical sidewall surface has a sidewall diameter,
wherein the sidewall diameter is at least 1.5 times the inlet diameter.

9. The apparatus according to claim 1
wherein the body inlet has a body inlet diameter, and
wherein the body outlet has a body outlet diameter,
wherein the body inlet diameter and the body outlet diameter are the same.

10. The apparatus according to claim 1
wherein the body inlet has a body inlet diameter,
wherein the interior area diametrically across the cylindrical sidewall surface has a sidewall diameter,
wherein the sidewall diameter is at least 1.5 times the body inlet diameter.

11. The apparatus according to claim 1
wherein the manifold plumbing fitting includes at least four uniformly angularly spaced drain fitting openings.

12. The apparatus according to claim 1
wherein the annular body includes an inlet piece that is separate from an outlet piece,
wherein in the operative position of the plumbing fitting the inlet piece and the outlet piece are in fixed engaged relation.

13. The apparatus according to claim 1
wherein the annular body includes
an inlet piece, wherein the inlet piece includes the body inlet and the plurality of drain fitting openings, and
an outlet piece, wherein the outlet piece is a separate piece from the inlet piece and includes the body outlet,
wherein in the operative position of the plumbing fitting the inlet piece and the outlet piece are in fixed engaged relation.

14. The apparatus according to claim 1
wherein the annular body includes an inlet piece and an outlet piece,
wherein the inlet piece is a separate piece from the outlet piece
wherein in the operative position of the plumbing fitting the inlet piece and the outlet piece are in fixed engaged relation,
wherein the outlet piece includes an annular lip, wherein in the operative position of the plumbing fitting the annular lip radially outwardly overlies an annular outer wall of the inlet piece and the cylindrical sidewall surface.

15. The apparatus according to claim 1
wherein the annular body includes an inlet piece and an outlet piece,
wherein the inlet piece is a separate piece from the outlet piece,
wherein in the operative position of the plumbing fitting the inlet piece and the outlet piece are in fixed engaged relation,
wherein the outlet piece includes an annular lip, wherein in the operative position of the plumbing fitting the annular lip radially outwardly overlies an annular outer wall of the inlet piece and the cylindrical sidewall surface, wherein in the operative position of the plumbing fitting the cylindrical sidewall surface is disposed radially inward from a radially outermost periphery of the outlet end funnel surface and vertically above the outlet end funnel surface.

16. Apparatus comprising:
a manifold plumbing fitting configured to be positioned in intermediate fluid connection between a sink drain and above a drain trap associated with the sink drain, wherein the plumbing fitting includes:
  a body, wherein the body bounds an interior area, wherein in an operative position of the plumbing fitting the body is configured to extend along a generally vertical body axis,
  a body inlet, wherein the body inlet
    is configured to be in direct fluid connection with the sink drain, and
    is coaxial with the body axis and is configured to enable air and water to enter the interior area,
  a body outlet, wherein the body outlet is coaxial with the body axis and is configured to enable water to pass out of the interior area toward the drain trap,
  wherein the interior area extends symmetrically radially outward relative to the body axis in all directions beyond the body inlet and the body outlet,
  wherein the interior area includes an inlet end portion, wherein the inlet end portion is bounded within the body by an axially symmetric a radially extending inlet end surface,
    wherein the inlet end surface includes an axially centered body inlet end surface opening therein that is directly fluidly connected to the body inlet,
  wherein the interior area further includes an outlet end portion, wherein the outlet end portion is bounded within the body by an axially symmetric annular tapered outlet end funnel surface,
    wherein the outlet end funnel surface includes an axially centered body outlet funnel opening therein that is directly fluidly connected to the body outlet, and is configured such that in the operative position of the plumbing fitting the outlet end funnel surface is disposed vertically lower with closer proximity along the body axis to the body outlet funnel opening,
  wherein the interior area is further bounded by a closed axially symmetric annular sidewall surface, wherein in the operative position of the plumbing fitting the sidewall surface extends continuously and generally vertically intermediate of the body inlet end surface and the outlet end funnel surface,
  wherein the interior area includes only open space in all radially extending directions across an interior area portion bounded by the sidewall surface between the body axis and the sidewall surface,
  wherein the body includes a plurality of drain fitting openings that extend through the body and the inlet end surface to the interior area,
    wherein each of the plurality of drain fitting openings is disposed radially outwardly away from the body inlet end surface opening,
    wherein in the operative position of the plumbing fitting each drain fitting opening extends in vertically overlying relation above the outlet end funnel surface,
    wherein each of the plurality of drain fitting openings is configured to receive either
      a drain fitting operatively fluidly connected to a water discharge device, or
      a plug, wherein the plug blocks the respective drain fitting opening.

17. The apparatus according to claim 16
wherein the body inlet end surface opening has an inlet diameter, and
wherein the sum of co-linear radial distances from the axis to the sidewall surface in all co-linear radial directions is at least 1.5 times the inlet diameter.

18. The apparatus according to claim 17
wherein each of the drain fitting openings extends along a respective drain fitting axis,
wherein each respective drain fitting axis intersects and extends at an acute angle to the body axis.

19. The apparatus according to claim 17
wherein the sidewall surface bounding the interior area comprises a cylindrical sidewall surface, wherein the cylindrical sidewall surface extends continuously intermediate of the inlet end surface and the outlet end funnel surface, and wherein in the operative position of the plumbing fitting the cylindrical sidewall surface extends generally vertically.

20. The apparatus according to claim 19
wherein the inlet end surface comprises an inlet end funnel surface that is configured such that in the operative position of the plumbing fitting the inlet end funnel surface is disposed vertically higher with closer proximity along the body axis to the body inlet end surface opening.

21. The apparatus according to claim 16
wherein each of the drain fitting openings extends along a respective drain fitting axis,
wherein each respective drain fitting axis intersects with the outlet funnel opening.

22. The apparatus according to claim 16
wherein the body includes an inlet piece that is a separate piece from an outlet piece,
wherein in the operative position of the plumbing fitting the inlet piece and the outlet piece are in fixed engaged relation,
wherein the outlet piece includes an annular lip, wherein in the operative position of the plumbing fitting the annular lip radially outwardly overlies an annular outer wall of the inlet piece and the sidewall surface.

23. The apparatus according to claim 16
wherein the body includes an inlet piece that is a separate piece from an outlet piece,
wherein in the operative position of the plumbing fitting the inlet piece and the outlet piece are in fixed engaged relation,
wherein the outlet piece includes an annular lip, wherein in the operative position of the plumbing fitting the annular lip radially outwardly overlies an annular outer wall of the inlet piece and the sidewall surface,
wherein in the operative position of the plumbing fitting the sidewall surface is disposed radially inward from a radially outermost periphery of the outlet end funnel surface and vertically above the outlet end funnel surface.

24. The apparatus according to claim 16
wherein each of
  the body inlet,
  the body inlet end surface opening,
  the body outlet funnel opening, and
  the body outlet
have a common diameter.

25. Apparatus comprising:
a manifold plumbing fitting configured to be positioned in intermediate fluid connection between a sink drain and above a drain trap associated with the sink drain, wherein the plumbing fitting includes:
an annular body, wherein the body includes an interior area, wherein in an operative position of the plumbing fitting the body is configured to extend along a generally vertical body axis,
a body inlet, wherein the body inlet
is configured to be in direct fluid connection with the sink drain, and
is coaxial with the body axis and is configured to enable air and water to enter the interior area,
a body outlet, wherein the body outlet is coaxial with the body axis and is configured to enable water to pass out of the interior area toward the drain trap,
wherein the interior area extends symmetrically annularly and radially outward relative to the body axis beyond the body inlet and the body outlet,
wherein the interior area includes an inlet end portion, wherein the inlet end portion of the interior area is bounded within the body by a symmetric annular tapered inlet end funnel surface,
wherein the inlet end funnel surface includes an axially centered body inlet funnel opening therein that is directly fluidly connected to the body inlet, and is configured such that in the operative position of the plumbing fitting the inlet end funnel surface is disposed vertically higher with closer proximity along the body axis to the body inlet funnel opening,
wherein the interior area further includes an outlet end portion, wherein the outlet end portion is bounded within the body by a symmetric annular tapered outlet end funnel surface,
wherein the outlet end funnel surface includes an axially centered body outlet funnel opening therein that is directly fluidly connected to the body outlet, and is configured such that in the operative position of the plumbing fitting the outlet end funnel surface is disposed vertically lower with closer proximity along the body axis to the body outlet funnel opening,
wherein the interior area is further bounded by a symmetric axially centered cylindrical sidewall surface, wherein in the operative position of the plumbing fitting the cylindrical sidewall surface extends continuously and generally vertically intermediate of the inlet end funnel surface and the outlet end funnel surface,
wherein the interior area includes only open space in a portion of the interior area that is axially intermediate of the inlet funnel surface and the outlet funnel surface and diametrically across the interior area bounded by cylindrical sidewall surface,
wherein the body includes a plurality of drain fitting openings that extend through the body and the inlet end funnel surface to the interior area,
wherein each of the plurality of drain fitting openings is disposed radially outwardly away from the body inlet funnel opening and in the operative position of the plumbing fitting each drain fitting opening extends vertically above the outlet end funnel surface,
wherein each of the plurality of drain fitting openings is configured to receive either
a drain fitting operatively fluidly connected to a water discharge device, or
a plug, wherein the plug blocks the respective drain fitting opening.

26. The apparatus according to claim 25
wherein in the operative position each respective drain fitting openings is configured to extend in vertically overlying relation of the outlet end funnel surface.

27. The apparatus according to claim 25
wherein each of the drain fitting openings extends along a respective drain fitting axis,
wherein each respective drain fitting axis intersects with the axis and the outlet funnel opening.

28. The apparatus according to claim 25
wherein the body inlet has a body inlet diameter,
wherein the interior area diametrically across the cylindrical side wall surface has a side wall diameter,
wherein the side wall diameter is at least 1.5 times the body inlet diameter.

* * * * *